(12) United States Patent
Ichinose et al.

(10) Patent No.: US 9,608,539 B2
(45) Date of Patent: *Mar. 28, 2017

(54) POWER SUPPLY DEVICE

(71) Applicants: CENTRAL JAPAN RAILWAY COMPANY, Aichi (JP); FUJI ELECTRIC CO., LTD., Kanagawa (JP)

(72) Inventors: Ayako Ichinose, Tokyo (JP); Michio Tamate, Tokyo (JP); Koji Maruyama, Tokyo (JP); Tomotaka Nishijima, Hyogo (JP)

(73) Assignees: CENTRAL JAPAN RAILWAY COMPANY, Nagoya-Shi, Aichi (JP); FUJI ELECTRIC CO., LTD., Kawasaki-Shi, Kanagawa (JP)

(*) Notice: Subject to any disclaimer, the term of this patent is extended or adjusted under 35 U.S.C. 154(b) by 466 days.

This patent is subject to a terminal disclaimer.

(21) Appl. No.: 14/200,790

(22) Filed: Mar. 7, 2014

(65) Prior Publication Data

US 2014/0292092 A1 Oct. 2, 2014

(30) Foreign Application Priority Data

Mar. 29, 2013 (JP) .................. 2013-071432

(51) Int. Cl.
*H01F 38/14* (2006.01)
*H02J 5/00* (2016.01)
(Continued)

(52) U.S. Cl.
CPC ............ *H02M 7/219* (2013.01); *H01F 38/14* (2013.01); *H02J 5/005* (2013.01); *H02J 50/12* (2016.02); *H02M 2001/0058* (2013.01)

(58) Field of Classification Search
CPC .. B60L 5/005; B60L 11/1809; B60L 11/1811; B60L 11/1812; B60L 11/1816;
(Continued)

(56) References Cited

U.S. PATENT DOCUMENTS 5,581,171 A * 12/1996 Kerfoot ............... B60L 11/1811
320/137
6,160,374 A * 12/2000 Hayes ..................... H02J 7/025
320/108
(Continued)

FOREIGN PATENT DOCUMENTS

JP 2002-354711 A 12/2002
JP 2012-019603 A 1/2012
(Continued)

OTHER PUBLICATIONS

U.S. Appl. No. 14/300,822, Murai et al.
U.S. Appl. No. 14/322,188, Sawada et al.

*Primary Examiner* — Levi Gannon
(74) *Attorney, Agent, or Firm* — Rabin & Berdo, P.C.

(57) ABSTRACT

In a power supply device the bridge circuit is configured such that a plurality of series circuits of two inverse parallel connection circuits of a semiconductor switch and a diode are connected in parallel. The power supply device includes a control unit configured to control the semiconductor switch such that a voltage between AC terminals of the bridge circuit becomes a zero voltage only during a prescribed time period before and after two zero crossing points in one cycle of the input current and such that the voltage becomes a positive-negative voltage in which the output voltage is a peak current value during other time periods. Consequently, a power factor of the power receiving circuit is improved and a loss of an entire device is inhibited, and a size and a cost of the entire device may be reduced.

17 Claims, 44 Drawing Sheets

(51) Int. Cl.
*H02M 7/219* (2006.01)
*H02M 1/00* (2006.01)

(58) Field of Classification Search
CPC ... B60L 11/182; B60L 11/1829; B60L 11/1831; H01F 38/14; H02J 5/00; H02J 5/005; H02J 7/025; H02J 17/00; H02M 7/219; H04B 5/0037; H04B 5/0075; H04B 5/0081; H04B 5/0087; H04B 5/0093; Y02T 90/10; Y02T 90/122
USPC .......................................................... 307/104
See application file for complete search history.

(56) References Cited

U.S. PATENT DOCUMENTS

| | | | |
|---|---|---|---|
| 6,934,167 | B2 | 8/2005 | Jang et al. |
| 8,446,134 | B2 | 5/2013 | Manor et al. |
| 2004/0264089 | A1 | 12/2004 | Furuya et al. |
| 2006/0267523 | A1 | 11/2006 | Seelig et al. |
| 2011/0254379 | A1* | 10/2011 | Madawala ............ H02J 5/005 307/104 |
| 2011/0285211 | A1 | 11/2011 | Endo et al. |
| 2012/0026755 | A1 | 2/2012 | Wu et al. |
| 2012/0032633 | A1* | 2/2012 | Cordes ............... B60L 11/1803 320/108 |
| 2012/0127765 | A1 | 5/2012 | Maruyama et al. |
| 2012/0326515 | A1 | 12/2012 | Murai et al. |
| 2013/0154382 | A1 | 6/2013 | Kurata et al. |
| 2013/0272044 | A1* | 10/2013 | Boys ...................... H02J 5/005 363/126 |
| 2013/0336013 | A1 | 12/2013 | Mueller |
| 2014/0117937 | A1* | 5/2014 | Cho ...................... H02J 7/0068 320/128 |
| 2014/0191818 | A1 | 7/2014 | Waffenschmidt et al. |
| 2014/0292092 | A1 | 10/2014 | Ichinose et al. |
| 2014/0344601 | A1* | 11/2014 | Huang ................... H02J 7/025 713/323 |
| 2014/0372780 | A1 | 12/2014 | Murai et al. |
| 2015/0001958 | A1* | 1/2015 | Abe ....................... H02J 5/005 307/104 |
| 2015/0023079 | A1 | 1/2015 | Sawada et al. |
| 2015/0244176 | A1* | 8/2015 | Van Den Brink ...... H02J 5/005 307/104 |

FOREIGN PATENT DOCUMENTS

| | | |
|---|---|---|
| JP | 2012-125138 A | 6/2012 |
| JP | 2012-143135 A | 7/2012 |
| JP | 2012-253964 A | 12/2012 |
| JP | 2014-241698 A | 12/2014 |
| JP | 2015-023658 A | 2/2015 |
| WO | WO 2013-024396 A1 | 2/2013 |

* cited by examiner

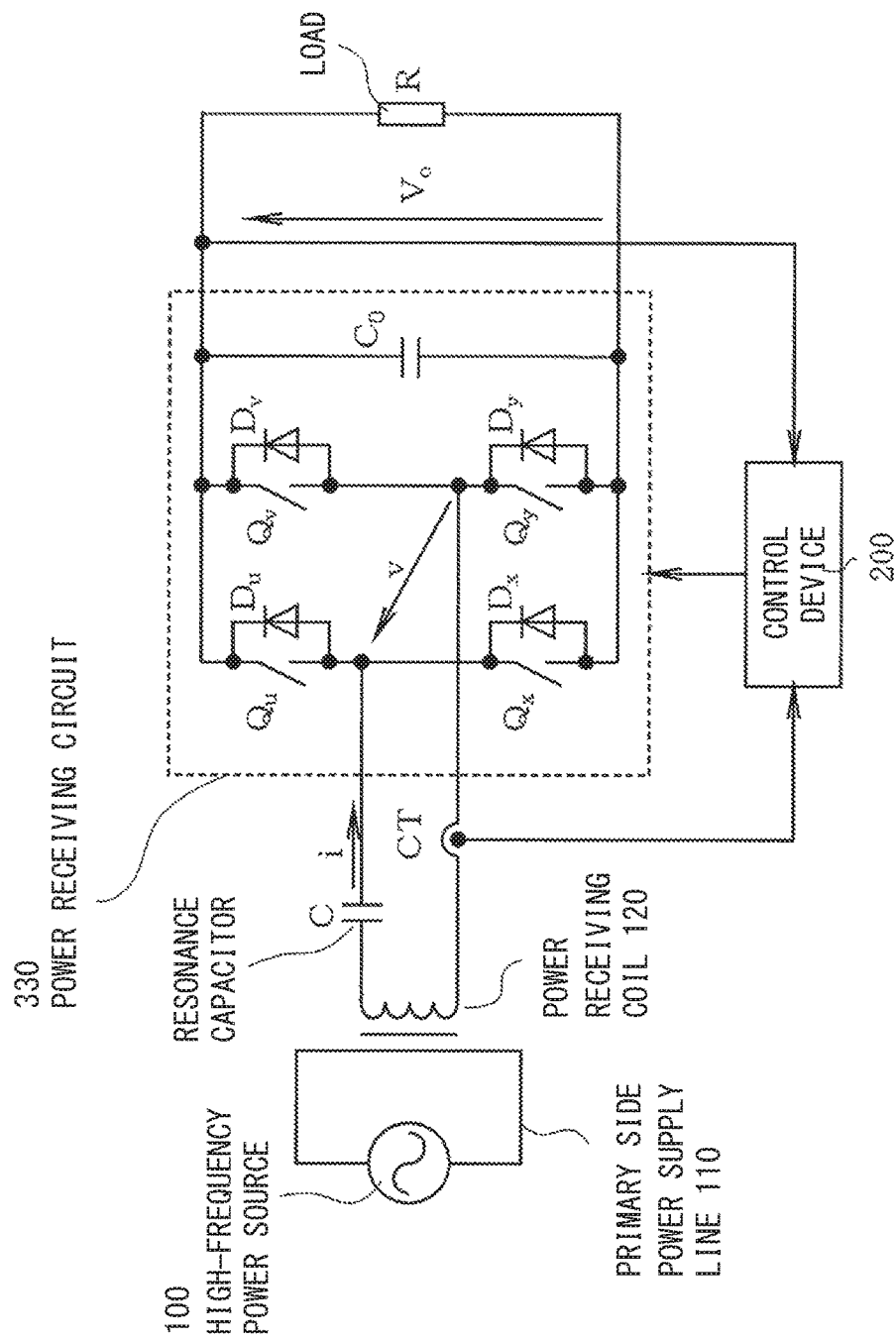
F I G. 1

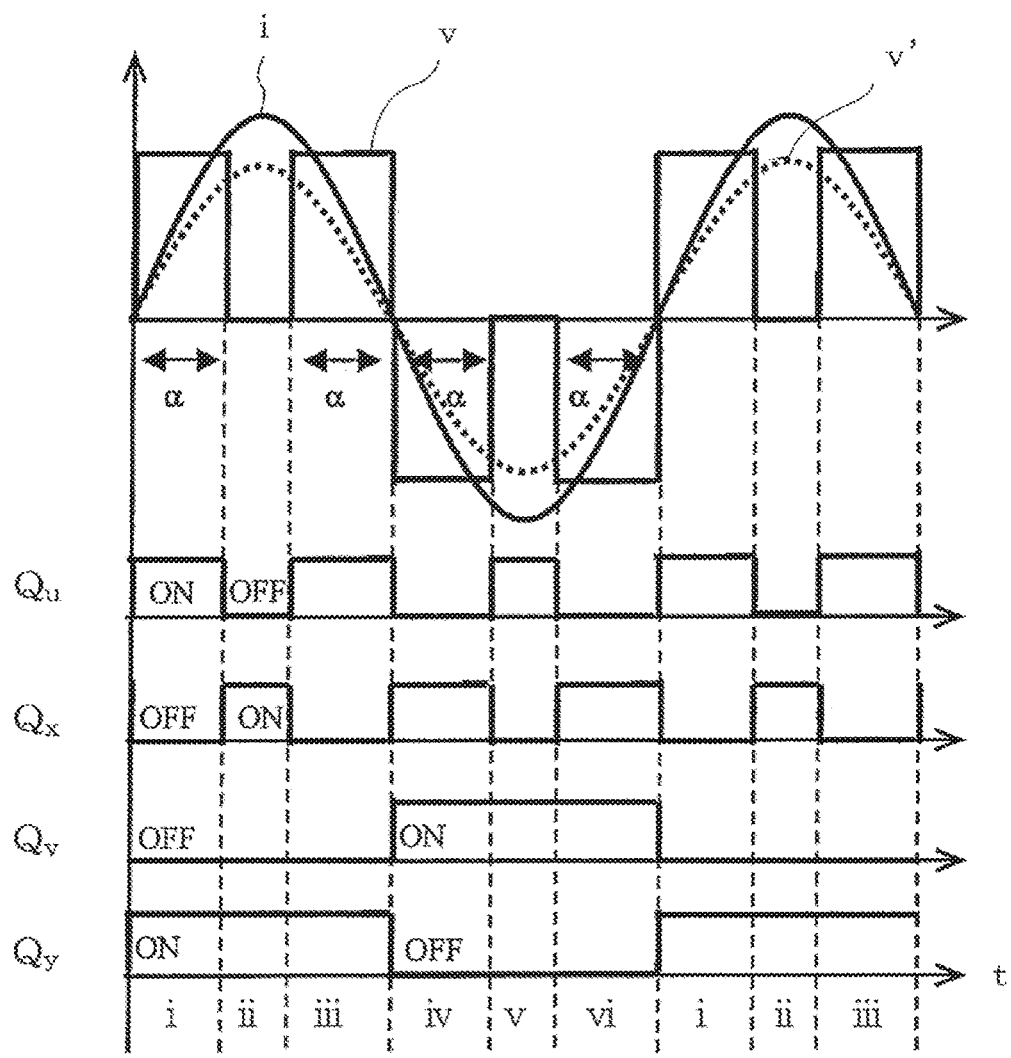
F I G. 4

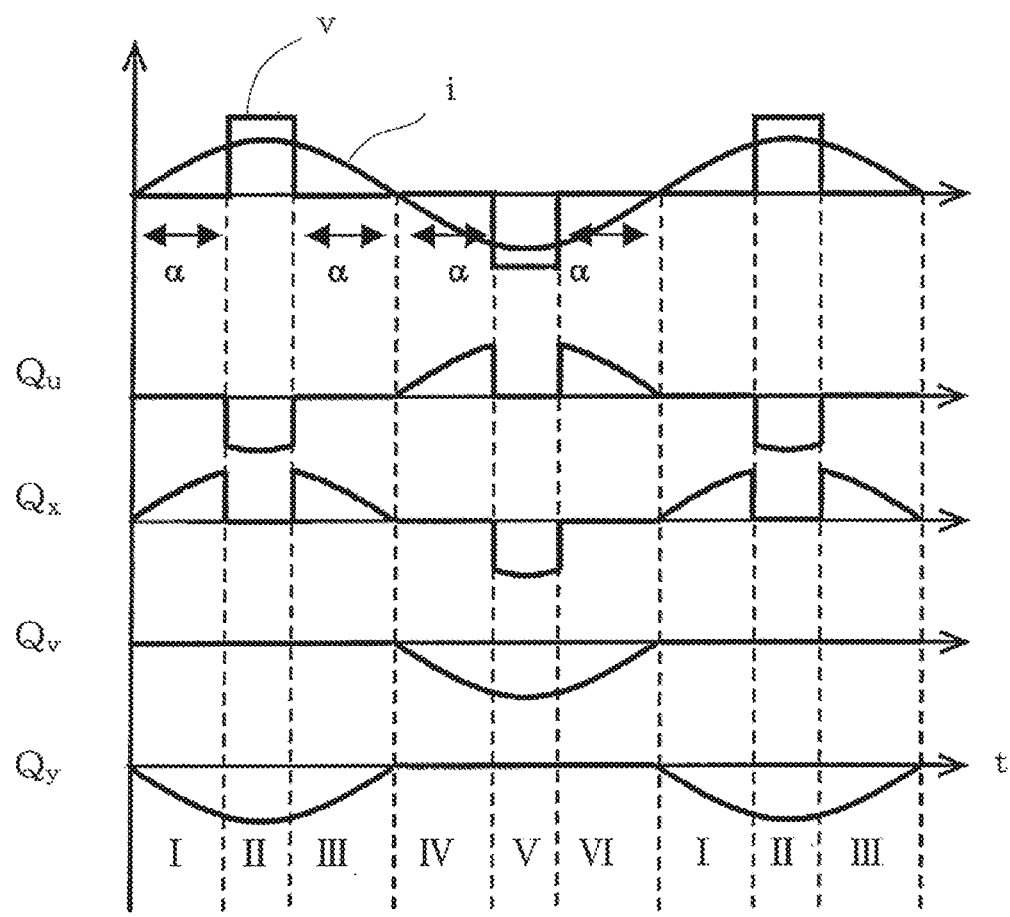
F I G. 6

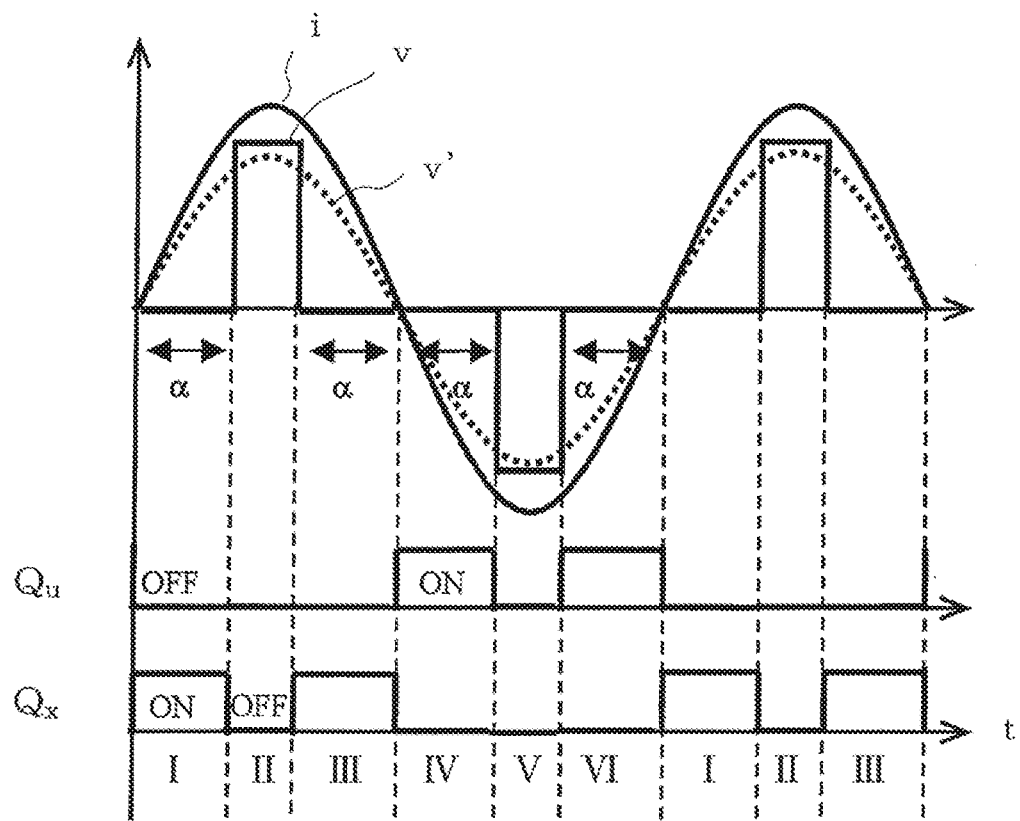
F I G. 1 2

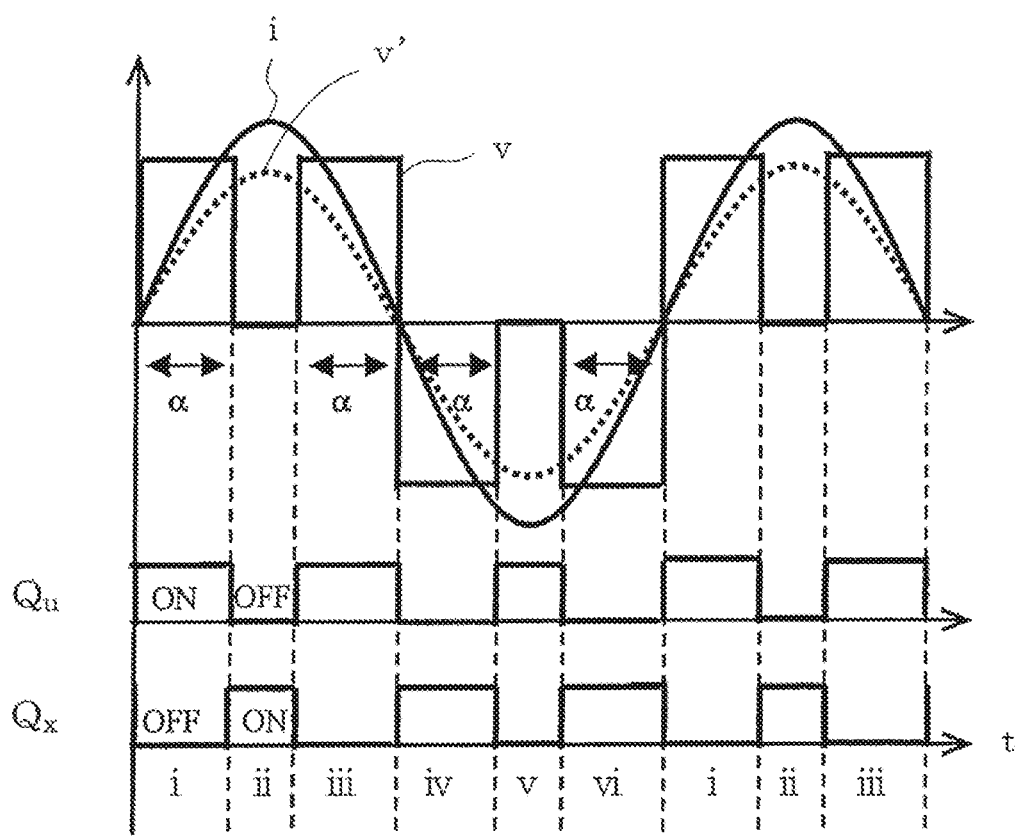
F I G. 1 3

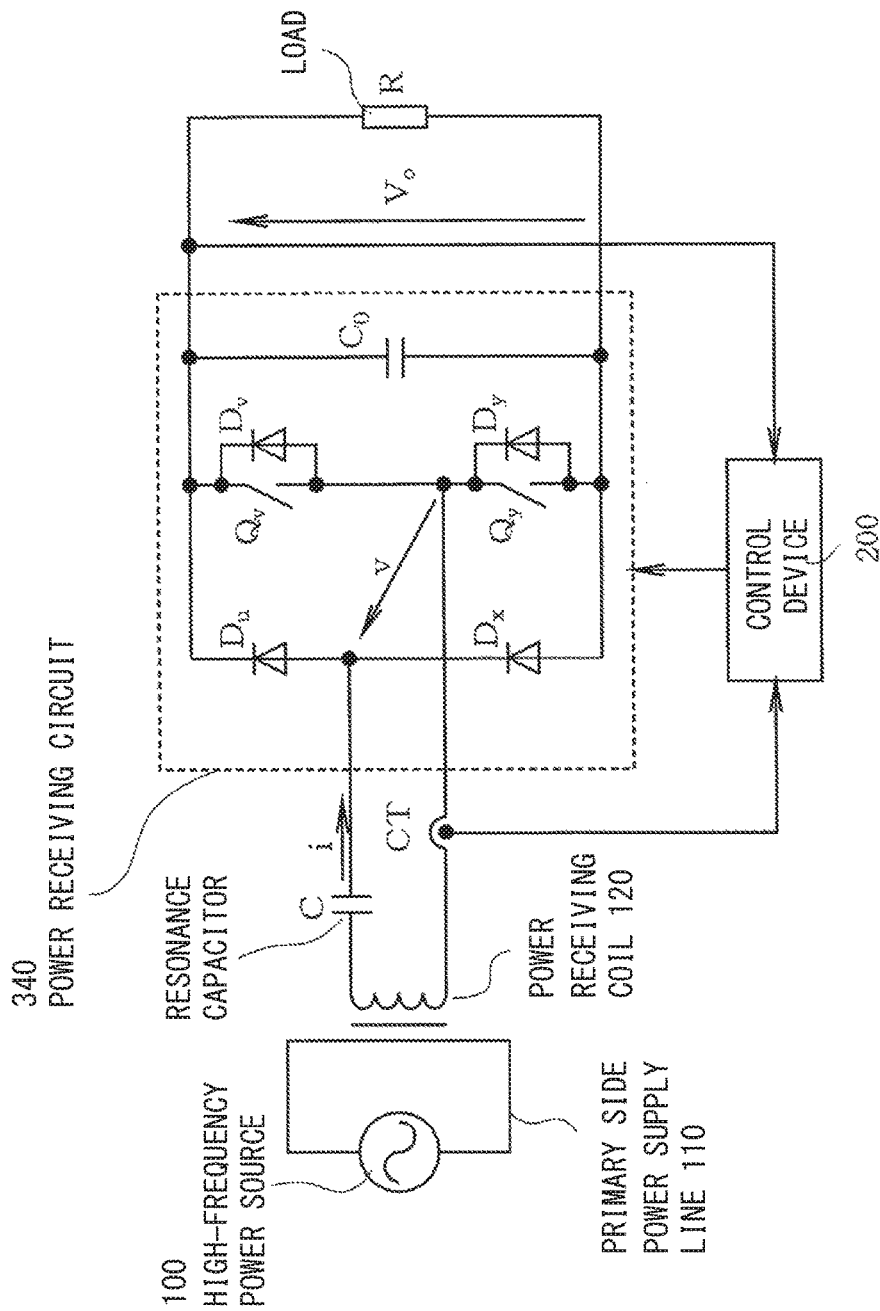
F I G. 17

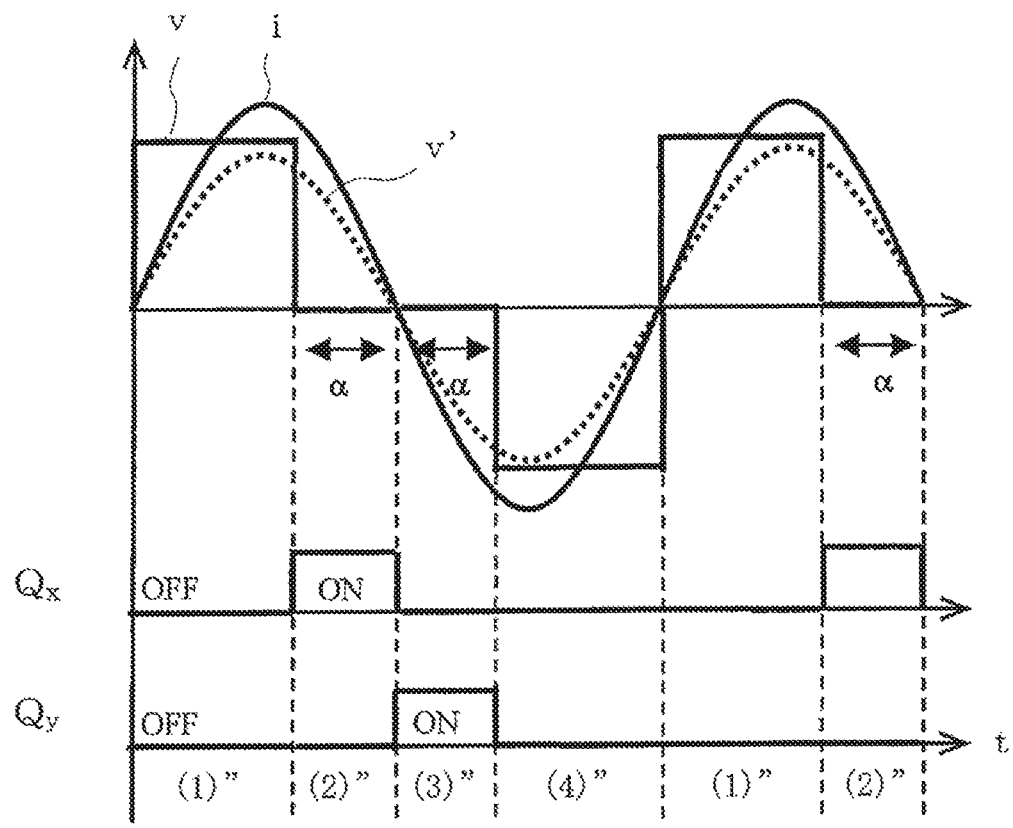
F I G. 2 4

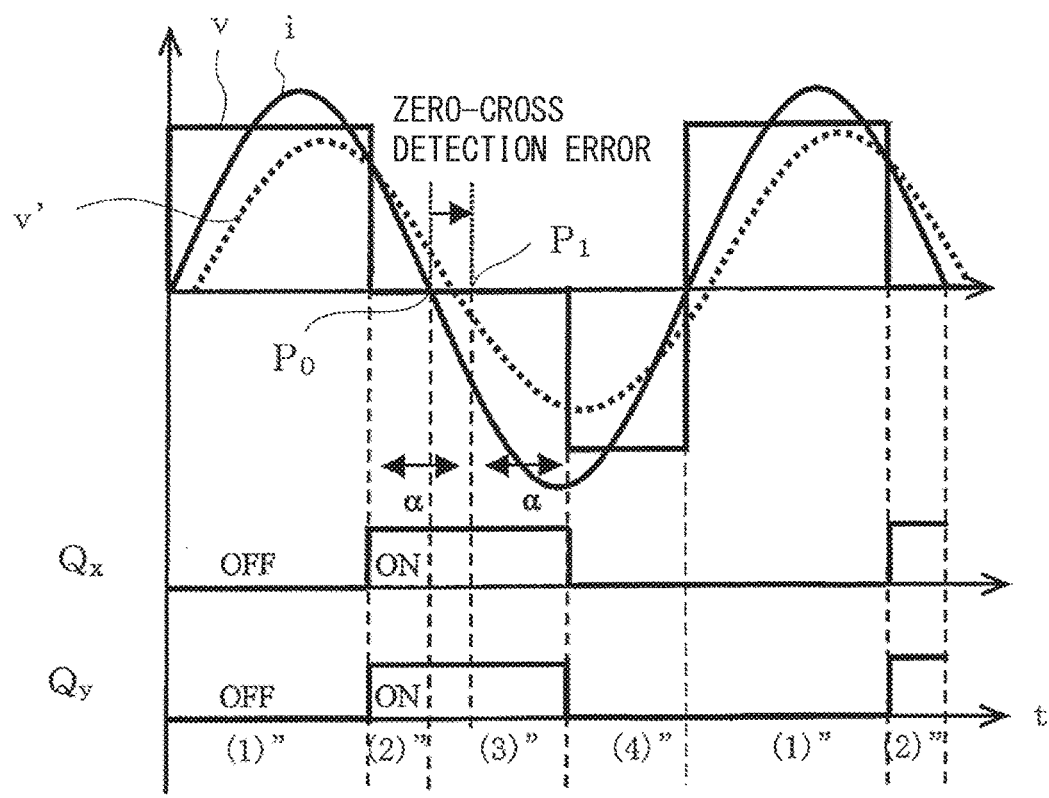
F I G. 3 4

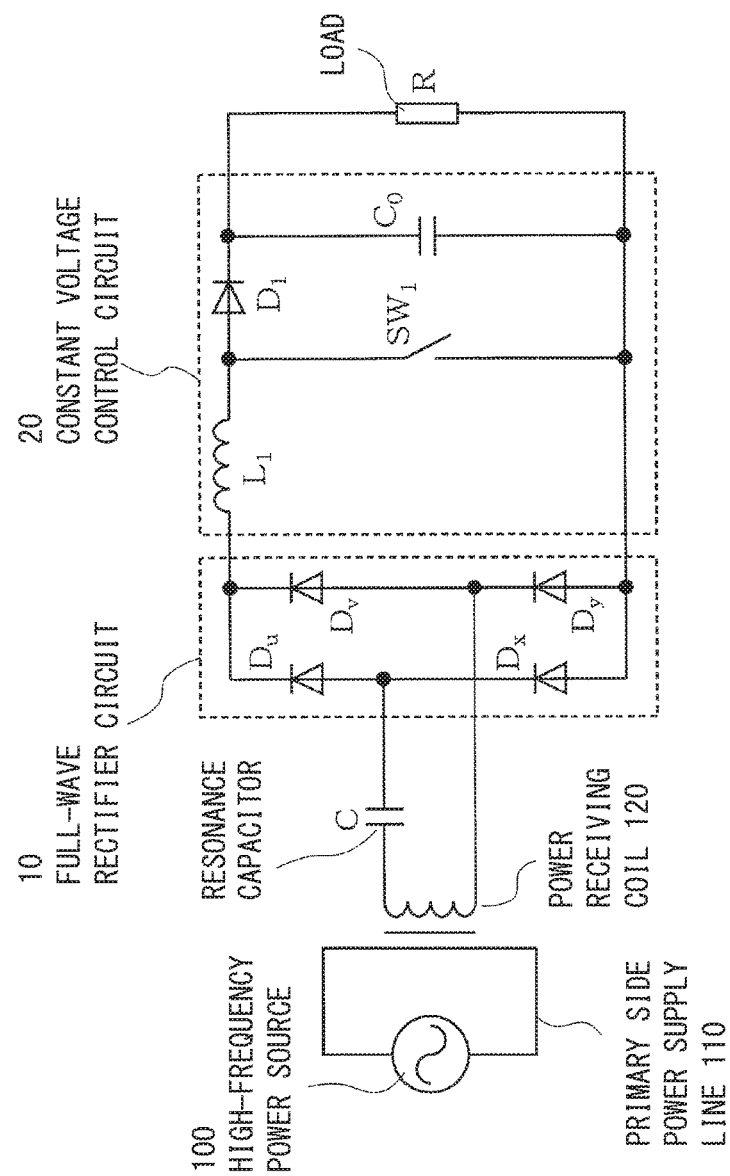
FIG. 41 —RELATED ART—

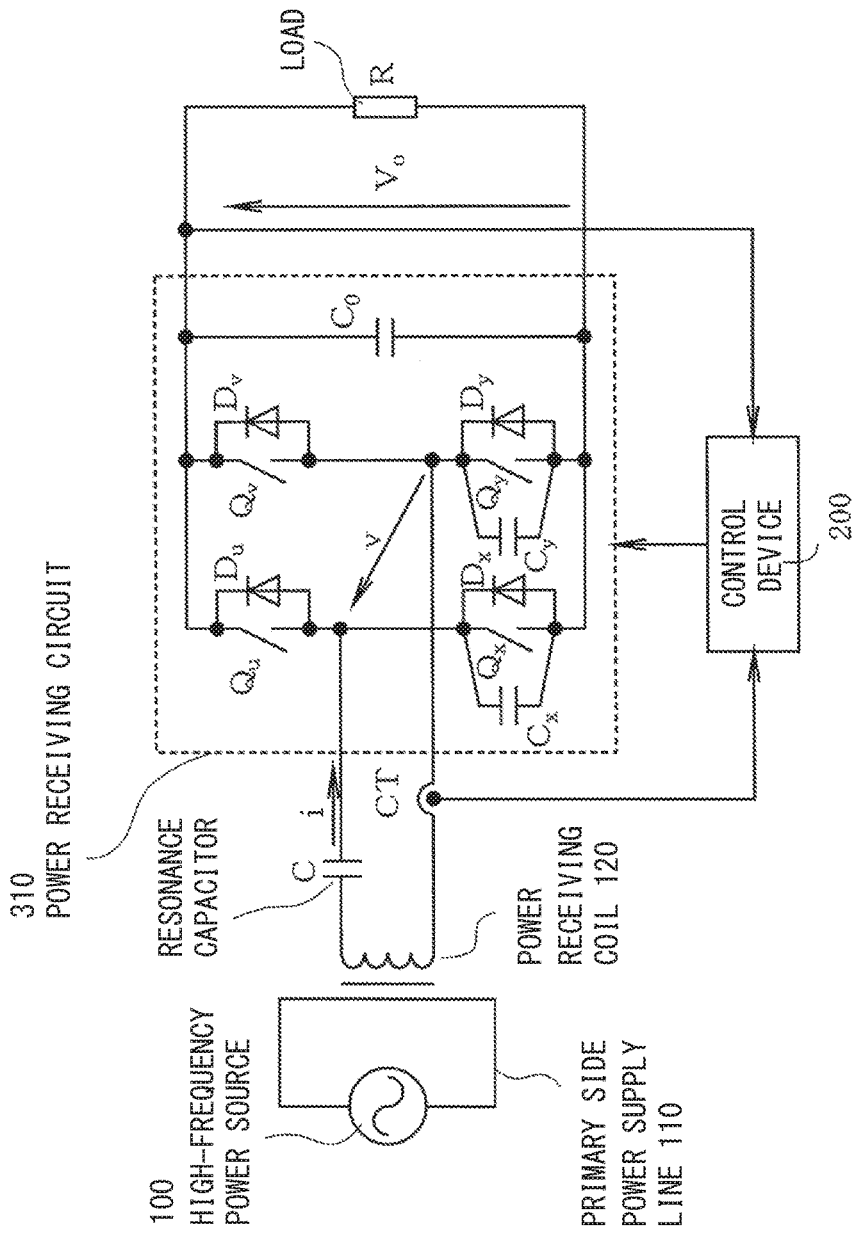
FIG. 42 —RELATED ART—

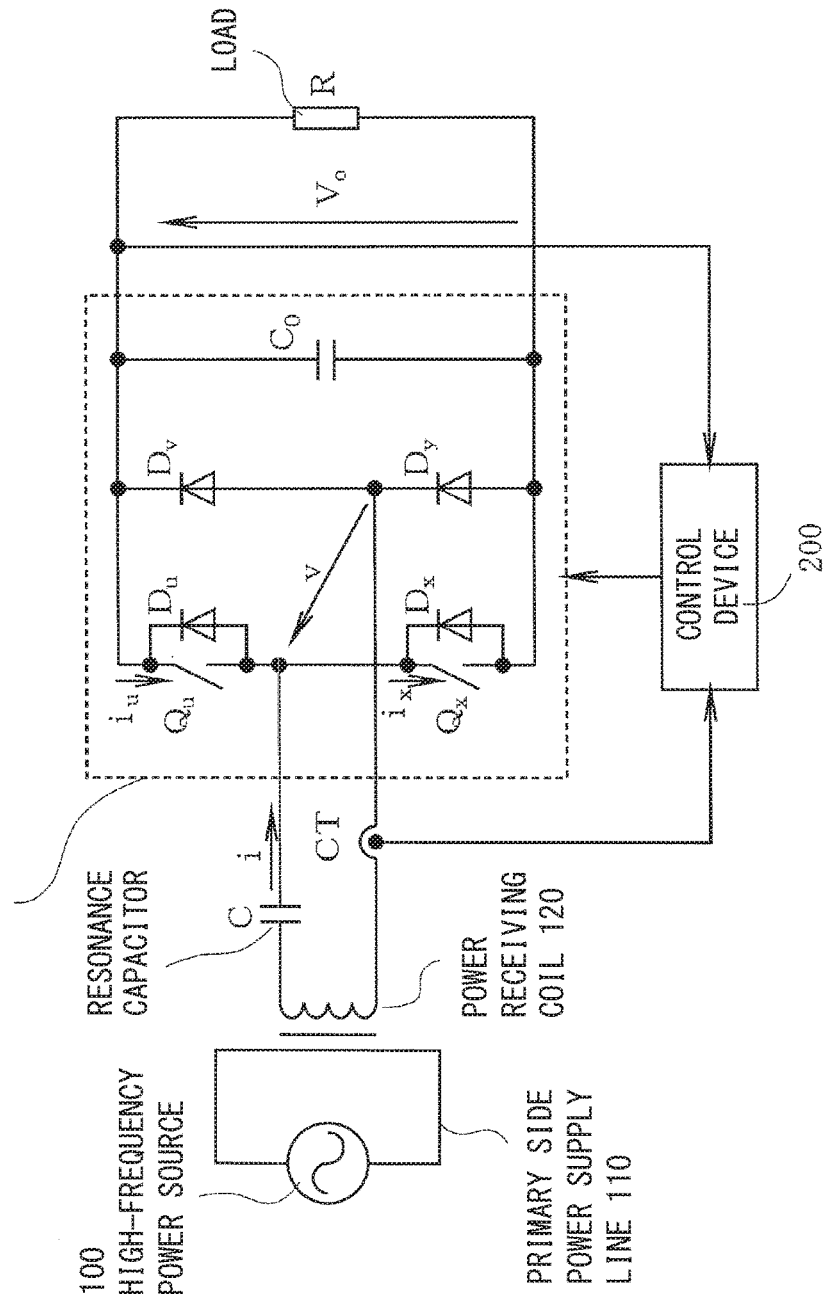
FIG. 43 —RELATED ART—

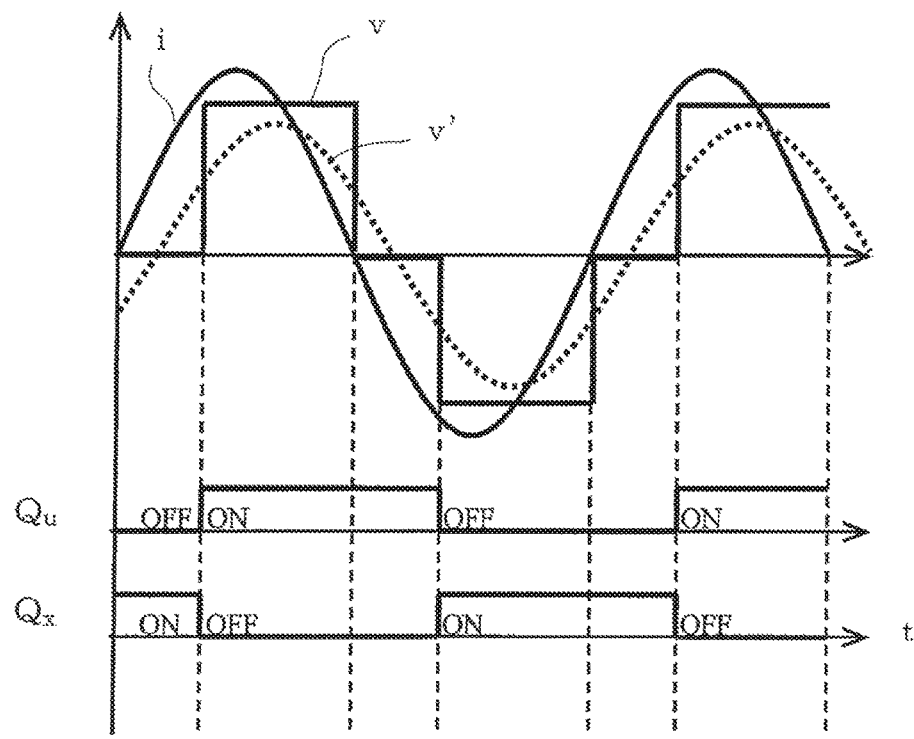
F I G. 4 4    —RELATED ART—

POWER SUPPLY DEVICE

CROSS-REFERENCE TO RELATED APPLICATION

This application is based upon and claims the benefit of priority from prior Japanese Patent Application No. 2013-071432, filed Mar. 29, 2013, the entire contents of which are incorporated herein by this reference.

BACKGROUND OF THE INVENTION

Field of the Invention

The present invention relates to a power supply device which supplies power to a load by utilizing a magnetic coupling between coils.

Description of the Related Art

As a method for supplying power to a load by utilizing a magnetic coupling between coils by electromagnetic induction, a non-contact power supply is given as an example. The principle thereof is forming a sort of a transformer by magnetically coupling a plurality of coils via a space, utilizing the electromagnetic induction between the coils, thereby exchanging power.

For example, the method includes arranging a primary side coil which corresponds to a power supply source as a power supply line in a rail shape, integrating a secondary side coil with a power receiving circuit to configure a mobile object, and at the same time, making the primary side coil and the secondary side coil be opposed to each other. With this, it is possible to conduct a non-contact power supply to a mobile object which moves along the power supply line.

Here, FIG. 41 illustrates a non-contact power supply device described in Japanese Laid-open Patent Publication No. 2002-354711. In FIG. 41, to both ends of a high-frequency power source 100, a primary side power supply line 110 is connected as a coil. To the primary side power supply line 110, a power receiving coil 120 is magnetically coupled, and the primary side power supply line 110 and the power receiving coil 120 form a sort of a transformer.

Both ends of the power receiving coil 120 are connected to a pair of AC (alternating-current) terminals of a full-wave rectifier circuit 10 through a resonance capacitor C. The power receiving coil 120 and the resonance capacitor C configure a series resonance circuits.

The full-wave rectifier circuit 10 is configured by bridge-connecting diodes $D_u$, $D_v$, $D_x$, and $D_y$.

To a pair of DC (direct-current) terminals of the full-wave rectifier circuit 10, a constant voltage control circuit 20 is connected which controls a DC output voltage of the full-wave rectifier circuit 10 so that the DC output voltage is to be a reference voltage value. The constant voltage control circuit 20 is configured of a step-up chopper circuit which is formed, for example, of a reactor $L_1$, a diode $D_1$, a smoothing capacitor $C_0$, and a semiconductor switch $SW_1$. Further, to both ends of the smoothing capacitor $C_0$, a load R is connected.

In FIG. 41, a control device for switching a semiconductor switch $SW_1$ is omitted.

In the conventional technology disclosed in FIG. 41, a high-frequency current is applied to the primary side power supply line 110 by a high-frequency power source 100 and the high-frequency current supplied through the power receiving coil 120 is input into the full-wave rectifier circuit 10 to convert it into a direct current.

Generally, in this type of a non-contact power supply device, due to a change in a gap length between the primary side power supply line 110 and the power receiving coil 120, a change in a position gap of both, or the like, a voltage induced in the power receiving coil 120 changes. With this, the DC output voltage of the full-wave rectifier circuit 10 changes. Further, characteristics of the load R also cause the DC output voltage of the full-wave rectifier circuit 10 to change.

Accordingly, in the conventional technology disclosed in FIG. 41, the DC output voltage of the full-wave rectifier circuit 10 is controlled to have a constant value by the constant voltage control circuit 20.

In the non-contact power supply device, the higher the frequency of the current supplied through a coil is, the smaller excitation inductance necessary for transmitting a power may become, and a size of a coil or a core arranged at a periphery of the coil may be made to be small. However, in the power converter which configures a high frequency power device or a power receiving circuit, the higher the frequency of the current flowing through the circuit is, the larger an increase in a switching loss of a semiconductor switch becomes, and a power supply efficiency lowers. Accordingly, it is common to set the frequency of the power supplied in a non-contact state as several [kHz] to several tens of [kHz].

The non-contact power supply device disclosed in FIG. 41, and in particular, the power receiving circuit in a subsequent stage of the resonance capacitor C, has the following problems.

(1) Since a power receiving circuit is configured by a full-wave rectifier circuit 10 and a constant voltage control circuit 20, a size of an entire circuit becomes large and it causes an increase in installation space or cost.

(2) Since losses occur not only in diodes $D_u$, $D_v$, $D_x$, and $D_y$ of the full-wave rectifier circuit 10 but also in a reactor $L_1$, a semiconductor switch $SW_1$, and diode $D_1$ of the constant voltage control circuit 20, these losses cause a reduction in a power supply efficiency.

In view of the above mentioned points, inventors have proposed a non-contact power supply device and a method for controlling the same (hereafter called a prior application invention) as described in Japanese Laid-open Patent Publication No. 2012-125138 (hereafter called a prior application). According to this, a small sized and inexpensive power supply device may be obtained and a highly efficient and stable power supply may become available.

FIG. 42 illustrates a first non-contact power supply device according to the above mentioned prior application.

In FIG. 42, 310 is a power receiving circuit. The power receiving circuit 310 includes bridge-connected semiconductor switches $Q_u$, $Q_x$, $Q_v$, and $Q_y$, diodes $D_u$, $D_x$, $D_v$, and $D_y$, capacitors $C_x$ and $C_y$, and a smoothing capacitor $C_0$. Diodes $D_u$, $D_x$, $D_v$, and $D_y$ are connected in inverse parallel with each of the switches $Q_u$, $Q_x$, $Q_v$, and $Q_y$, respectively. Capacitors $C_x$ and $C_y$ are connected in parallel with each of the switches $Q_x$ and $Q_y$ of a lower arm, respectively. A smoothing capacitor $C_0$ is connected between DC terminals of a bridge circuit (full-bridge inverter) being formed of these elements. A series circuit of a resonance capacitor C and a power receiving coil 120 are connected between AC terminals of a bridge circuit, and a load R is connected at both ends of a smoothing capacitor $C_0$.

200 is a control device which generates a driving signal for switching semiconductor switches $Q_u$, $Q_x$, $Q_v$, and $Q_y$. The control device 200 generates the above mentioned driving signal on the basis of a current i of the power receiving coil 120 detected by a current detection unit CT and a DC output voltage (voltage between DC terminals) $V_O$ of the power receiving circuit 310.

In the non-contact power supply device, by controlling semiconductor switches $Q_u$, $Q_x$, $Q_v$, and $Q_y$, an AC voltage v of a bridge circuit is controlled to a positive-negative voltage in which a DC output voltage $V_O$ is set as a peak value. A power supplied from the primary side power supply line 110 to the power receiving circuit 310 is a product of a current i of a power receiving coil 120 and an AC voltage v of a bridge circuit. As the control device 200 adjusts a phase of driving signals of semiconductor switches $Q_u$, $Q_x$, $Q_v$, and $Q_y$ on the basis of a DC output voltage $V_O$, a control of the supplied power, that is, a constant control of a DC output voltage $V_O$, becomes available.

Further, by configuring the power receiving circuit 310 using a bridge circuit which is formed of switches $Q_u$, $Q_x$, $Q_v$, and $Q_y$ and diodes $D_u$, $D_x$, $D_v$, and $D_y$, an operation of keeping the power constant is available even when a load R is a regenerative load.

According to this non-contact power supply device, a DC output voltage $V_O$ may be controlled in a constant state by a phase control of driving signals of semiconductor switches $Q_u$, $Q_x$, $Q_v$, and $Q_y$ without using a constant voltage control circuit as in the prior technology of FIG. 41. In addition, the power receiving circuit 310 may be configured only of a bridge circuit and a smoothing capacitor $C_0$. Therefore, a circuit configuration may be simplified, the size and the cost thereof may be reduced, and further, losses may be reduced by reducing the number of components, and consequently, a highly efficient and stable non-contact power supply may become available.

In addition, by a charging/discharging operation of capacitors $C_x$ and $C_v$, a so-called soft-switching is made to be conducted to reduce switching losses, thereby allowing a further higher efficiency.

FIG. 43 illustrates a second non-contact power supply device according to the above mentioned prior application.

In the non-contact power supply device of FIG. 42, since four semiconductor switches are necessary, there is a concern that a size and a cost of the device will increase if considered a cooling unit. Therefore, the non-contact power supply device of FIG. 43 intends to further reduce the size and the cost by not corresponding to a regenerative load but by corresponding only to a power load.

In FIG. 43, the power receiving circuit 320 has a switching arm series circuit wherein an arm in which a diode $D_u$ is connected in inverse parallel with a semiconductor switch $Q_u$ and an arm in which a diode $D_x$ is connected in inverse parallel with a semiconductor switch $Q_x$ are connected in series. Together with this, the power receiving circuit 320 has a diode series circuit in which diodes $D_v$ and $D_y$ are connected in series. These switching arm series circuit and diode series circuit are connected in parallel, and a smoothing capacitor $C_0$ is connected at both ends of the diode series circuit. The configurations of components other than the power receiving circuit 320 are similar to those illustrated in FIG. 42.

FIG. 44 illustrates an explanatory view for an operation of a non-contact power supply device illustrated in FIG. 43.

In the non-contact power supply device of FIG. 43, the voltage v between AC terminals is controlled to a positive-negative voltage in which a DC output voltage $V_O$ is set as a peak value, by controlling semiconductor switches $Q_u$ and $Q_x$. A power supplied from the primary side power supply line 110 to the power receiving circuit 320 is a product of a current i and a voltage v in FIG. 44. Accordingly, as the control device 200 adjusts a phase of driving signals of semiconductor switches $Q_u$ and $Q_x$ on the basis of a DC output voltage $V_O$, a control of the supplied power, that is, a constant control of a DC output voltage $V_O$, becomes available.

According to the non-contact power supply device of FIG. 43, since semiconductor switches for two out of four elements which configure a bridge circuit become unnecessary, a switching loss may be reduced to a large extent. Together with this, a size of a cooling fin for the bridge circuit may be reduced, and thereby be capable of further reducing the size and cost of an entire device.

Therefore, according to the invention of the prior application, compared with prior technology related to Japanese Laid-open Patent Publication No. 2002-354711, a loss may be reduced to a large extent, and a size and cost of the device may be reduced as well.

However, according to the prior application invention, as illustrated in FIG. 44, a current i becomes a leading phase to a fundamental wave component v'. Therefore, a problem of a reduced power factor of the non-contact power supply device occurs and the problem invites an increase in a loss in the entire device and causes obstructions in further reducing the size of the entire device.

SUMMARY OF THE INVENTION

Therefore, the problem to be solved by the present invention is to provide a power supply device which improves a power factor further than the invention of the prior application to inhibit a loss in the entire device and realize a reduced size and cost of the entire device.

In order to solve the above problem, a power supply device according to claims 1 to 3 of the present invention includes
   a coil configured to exchange power by an external magnetic coupling,
   a bridge circuit in which one end of the coil is connected to one AC terminal through a resonance capacitor and another end of the coil is connected to another AC terminal, and
   a smoothing capacitor configured to be connected between DC terminals of the bridge circuit, a load being connected at both ends of the smoothing capacitor, and the bridge circuit being configured such that a plurality of switching arm series circuits in which two inverse parallel connection circuits of a semiconductor switch and a diode are connected in series are connected in parallel, wherein the power supply device includes each of the following configurations.
   a current detection unit configured to detect a current which flows through the coil as an input current; and
   a voltage detection unit configured to detect a voltage between the DC terminals as an output voltage.

Claim 1 further includes a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive-negative voltage in which the output voltage is a peak value during other time periods.

Claim 2 includes a control unit configured to switch the semiconductor switch at a constant cycle such that a voltage between the AC terminals of the bridge circuit becomes a positive-negative voltage in which the output voltage is a peak value only during a prescribed time period before and after two zero crossing points in one cycle of the input current and such that the voltage becomes a zero voltage during other time periods.

Claim 3 includes a control unit configured to switch the semiconductor switch at a constant cycle such that a voltage between the AC terminals of the bridge circuit becomes a zero only during a prescribed time period before and after one of two zero crossing points in one cycle of the input current and such that the voltage becomes a positive-negative voltage in which the output voltage is a peak value during other time periods.

A power supply device according to claims 4 to 6 includes
a coil configured to exchange power by an external magnetic coupling,
a bridge circuit in which one end of the coil is connected to one AC terminal through a resonance capacitor and another end of the coil is connected to another AC terminal, and
a smoothing capacitor configured to be connected between DC terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, wherein the power supply device includes each of the following configurations.
a current detection unit configured to detect a current which flows through the coil as an input current; and
a voltage detection unit configured to detect a voltage between the DC terminals as an output voltage.

Claim 4 further includes a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive-negative voltage in which the output voltage is a peak value during other time periods.

Claim 5 includes a control unit configured to switch the semiconductor switch at a constant cycle such that a voltage between the AC terminals of the bridge circuit becomes a positive-negative voltage in which the output voltage is a peak value only during a prescribed time period before and after two zero crossing points in one cycle of the input current and such that the voltage becomes a zero voltage during other time periods.

Claim 6 includes a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive-negative voltage in which the output voltage is a peak value during other time periods.

A power supply device according to claims 7 to 9 includes
a coil configured to exchange power by an external magnetic coupling,
a bridge circuit in which one end of the coil is connected to one AC terminal through a resonance capacitor and another end of the coil is connected to another AC terminal, and
a smoothing capacitor configured to be connected between DC terminals of the bridge circuit, a load being connected at both ends of the smoothing capacitor, and the bridge circuit being configured such that a plurality of DC circuits in which an inverse parallel connection circuit of a semiconductor switch and a diode is connected in series with a diode are connected in parallel, wherein the power supply device includes each of the following configurations.
a current detection unit configured to detect a current which flows through the coil as an input current; and
a voltage detection unit configured to detect a voltage between the DC terminals as an output voltage.

Claim 7 further includes a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive-negative voltage in which the output voltage is a peak value during other time periods.

Claim 8 includes a control unit configured to switch the semiconductor switch at a constant cycle such that a voltage between the AC terminals of the bridge circuit becomes a positive-negative voltage in which the output voltage is a peak value only during a prescribed time period before and after two zero crossing points in one cycle of the input current and such that the voltage becomes a zero voltage during other time periods.

Claim 9 includes a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive-negative voltage in which the output voltage is a peak value during other time periods.

In a power supply device according to claim 10, the control unit, when a detection error exists between the one zero crossing point and an original zero crossing point, makes an on-period of each semiconductor switch partially overlap so as to include the one zero crossing point and switches each semiconductor switch, in the power supply device recited in claim 9.

A power supply device according to claim 11 includes
a coil configured to exchange power by an external magnetic coupling,
a bridge circuit in which one end of the coil is connected to one AC terminal through a resonance capacitor and another end of the coil is connected to another AC terminal, and
a smoothing capacitor configured to be connected between DC terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, and such that another diode is connected between one DC terminal of the bridge circuit and one end of the smoothing capacitor, the another diode having the same polarity as that of the diode series circuit, wherein the power supply device includes each of the following configurations.
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive-negative voltage in which the output voltage is a peak value during other time periods.

The control unit, when a detection error exists between the one zero crossing point and an original zero crossing point, makes an on-period of each semiconductor switch partially overlap so as to include the one zero crossing point and switches each semiconductor switch.

In a power supply device according to claim 12, the control unit, when a detection error exists between the one zero crossing point and an original zero crossing point, switches each semiconductor switch so as to turn on each semiconductor switch simultaneously during a prescribed time period which includes the one zero crossing point, in the power supply device recited in claim 9.

A power supply device according to claim 13 includes
a coil configured to exchange power by an external magnetic coupling,
a bridge circuit in which one end of the coil is connected to one AC terminal through a resonance capacitor and another end of the coil is connected to another AC terminal, and
a smoothing capacitor configured to be connected between DC terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, and such that another diode is connected between one DC terminal of the bridge circuit and one end of the smoothing capacitor, the another diode having the same polarity as that of the diode series circuit, wherein the power supply device includes each of the following configurations.
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive-negative voltage in which the output voltage is a peak value during other time periods.

The control unit, when a detection error exists between the one zero crossing point and an original zero crossing point, switches each semiconductor switch so as to turn on each semiconductor switch simultaneously during a prescribed time period which includes the one zero crossing point.

In a power supply device according to claim 14, the control unit, when a detection error exists between the one zero crossing point and an original zero crossing point, makes an on-period of each semiconductor switch partially overlap so as to include the one zero crossing point and switches each semiconductor switch, in the power supply device recited in claim 3.

A power supply device according to claim 15 includes
a coil configured to exchange power by an external magnetic coupling,
a bridge circuit in which one end of the coil is connected to one AC terminal through a resonance capacitor and another end of the coil is connected to another AC terminal, and
a smoothing capacitor configured to be connected between DC terminals of the bridge circuit, a load being connected at both ends of the smoothing capacitor, and the bridge circuit being configured such that a plurality of switching arm series circuits in which two inverse parallel connection circuits of a semiconductor switch and diode are connected in series are connected in parallel and such that another diode is connected between one DC terminal of the bridge circuit and one end of the smoothing capacitor, the another diode having the same polarity as that of the diode series circuit in the switching arm series circuit, wherein the power supply device includes each of the following configurations.
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive-negative voltage in which the output voltage is a peak value during other time periods.

The control unit, when a detection error exists between the one zero crossing point and an original zero crossing point, makes an on-period of each semiconductor switch partially overlap so as to include the one zero crossing point and switches each semiconductor switch.

In a power supply device according to claim 16, the control unit, when a detection error exists between the one zero crossing point and an original zero crossing point, switches each semiconductor switch so as to turn on each semiconductor switch simultaneously during a prescribed time period so as to include the one zero crossing point, in the power supply device recited in claim 3.

A power supply device according to claim 17 includes
a coil configured to exchange power by an external magnetic coupling,
a bridge circuit in which one end of the coil is connected to one AC terminal through a resonance capacitor and another end of the coil is connected to another AC terminal, and
a smoothing capacitor configured to be connected between DC terminals of the bridge circuit, a load being connected at both ends of the smoothing capacitor, and the bridge circuit being configured such that a plurality of switching arm series circuits in which two inverse parallel connection circuits of a semiconductor switch and a diode are connected in series are connected in parallel and such that another diode is connected between one DC terminal of the bridge circuit and one end of the smoothing capacitor, the another diode having the same polarity as that of the diode series circuit in the switching arm series circuit, wherein the power supply device includes each of the following configurations.
a current detection unit configured to detect a current which flows through the coil as an input current;
a voltage detection unit configured to detect a voltage between the DC terminals as an output voltage; and a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive-negative voltage in which the output voltage is a peak value during other time periods.

The control unit, when a detection error exists between the one zero crossing point and an original zero crossing point, switches each semiconductor switch so as to turn on each semiconductor switch simultaneously during a prescribed time period which includes the one zero crossing point.

BRIEF DESCRIPTION OF THE DRAWINGS

The present invention will be more apparent from the following detailed description when the accompanying drawings are referenced.

FIG. 1 illustrates a circuit diagram which illustrates a first example of a power supply device according to the present invention.

FIG. 4 illustrates an operation waveform diagram according to a second embodiment of the present invention.

FIG. 6 illustrates a waveform diagram of a current and a voltage in the first embodiment of the present invention.

FIG. 12 illustrates an operation waveform diagram according to a fourth embodiment of the present invention.

FIG. 13 illustrates an operation waveform diagram according to a fifth embodiment of the present invention.

FIG. 17 illustrates a circuit diagram which illustrates a third example of a power supply device according to the present invention.

FIG. 24 illustrates an operation waveform diagram according to a ninth embodiment of the present invention.

FIG. 34 illustrates an operation waveform diagram according to a twelfth embodiment of the present invention.

FIG. 41 illustrates a circuit diagram of a prior technology described in Japanese Laid-open Patent Publication No. 2002-354711.

FIG. 42 illustrates a circuit diagram of a prior application invention.

FIG. 43 illustrates a circuit diagram of a prior application invention.

FIG. 44 illustrates an operation explanatory view of a prior application invention illustrated in FIG. 43.

DESCRIPTION OF THE EMBODIMENTS

Hereafter, explanations are given for embodiments of the present invention along with drawings.

FIG. 1 illustrates a circuit diagram which illustrates a first example of a power supply device to which first to third embodiments according to claims 1 to 3 are applied. Although the present invention is applicable to both a non-contact power supply device and a contact power supply device, in each of the following embodiments, explanations are given for when the present invention is applied to the non-contact power supply device.

In the non-contact power supply device of FIG. 1, a power receiving circuit 330 includes semiconductor switches (hereafter also simply called switches) $Q_u$, $Q_x$, $Q_v$ and $Q_y$, diodes $D_u$, $D_x$, $D_v$, and $D_y$, and a smoothing capacitor $C_0$. Switches $Q_u$, $Q_x$, $Q_v$, and $Q_y$ are bridge-connected. Diodes $D_u$, $D_x$, $D_v$, and $D_y$ are connected in inverse parallel with each of the switches $Q_u$, $Q_x$, $Q_v$, and $Q_y$, respectively. A smoothing capacitor $C_0$ is connected between a pair of DC terminals of a bridge circuit being formed of these elements. A series circuit of a resonance capacitor C and a power receiving coil 120 is connected between a pair of AC terminals of a bridge circuit, and a load R is connected at both ends of a smoothing capacitor $C_0$. Here, 100 is a high-frequency power source and 110 is a primary side power supply line.

On the other hand, a control device 200 generates driving signals of switches $Q_u$, $Q_x$, $Q_v$, and $Q_y$ on the basis of a DC output voltage $V_0$ and a current i of a power receiving coil 120 detected by a current detection unit CT and outputs the driving signal. Although it is not illustrated, a DC output voltage $V_0$ is detected by well-known voltage detection unit such as a DC voltage detector and the like.

Next, explanations are given for a first embodiment of the present invention, which corresponds to claim 1.

A circuit illustrated in FIG. 1 allows a bidirectional power supply between a power receiving coil 120 and a load R. Hereafter, explanations are given for two types of operations when power is supplied from the power receiving coil 120 to the load R, and when power is supplied from the load R to the power receiving coil 120.

First, explanations are given for an operation when power is supplied from the power receiving coil 120 to the load R.

Figure 2:
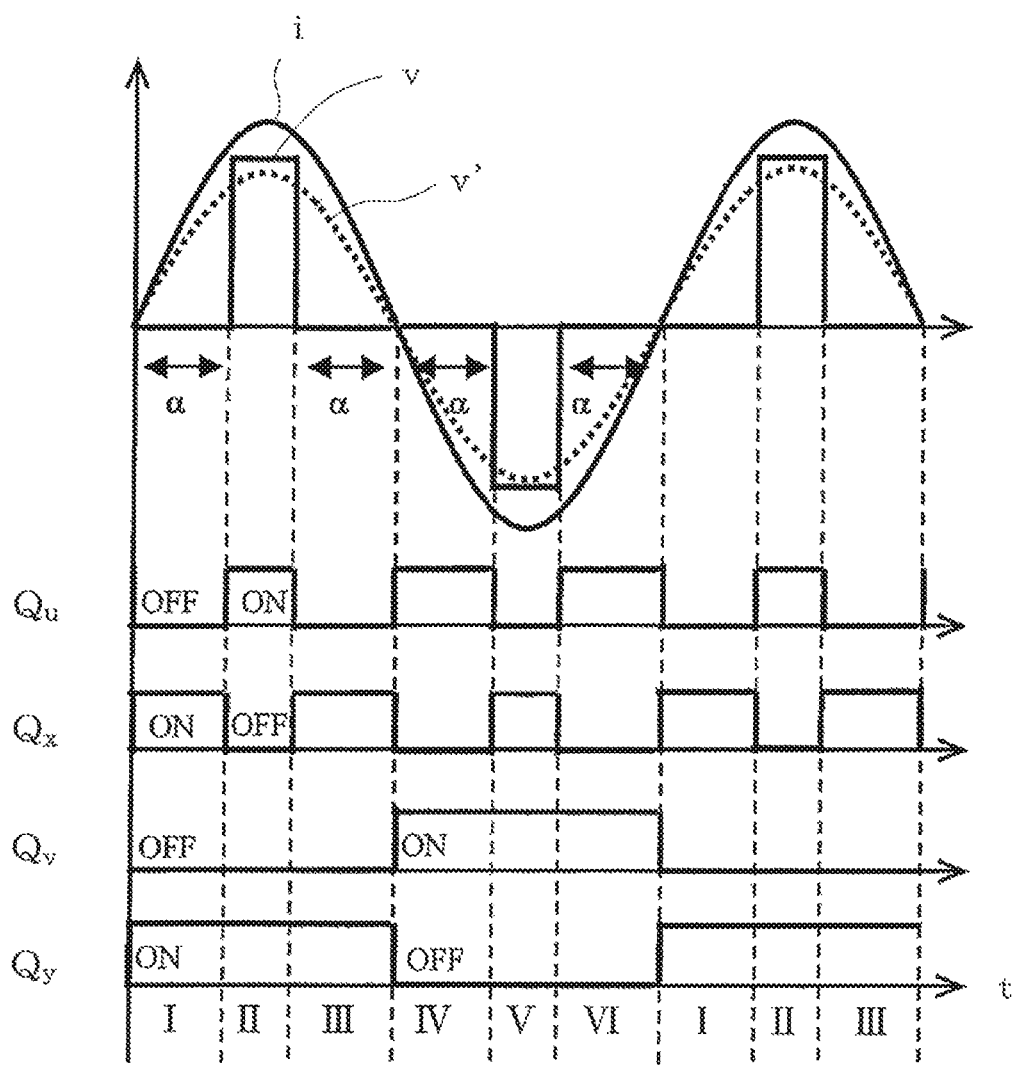
FIG. 2 illustrates an operation waveform diagram according to a first embodiment of the present invention.

FIG. 2 illustrates a current i which flows through the power receiving coil 120 of FIG. 1, a voltage v between AC terminals of the bridge circuit, a fundamental wave component v' of the voltage v, and driving signals of switches $Q_u$, $Q_x$, $Q_v$, and $Q_y$. As illustrated in FIG. 2, switches $Q_u$, $Q_x$, $Q_v$, and $Q_y$ perform a switching operation with a constant frequency synchronized with the current i. Hereafter, explanations are given for an operation in each time period I to VI of FIG. 2.

(1) Time period I (switches $Q_x$ and $Q_y$ are turned on): a current i flows with a route of a resonance capacitor C→a switch $Q_x$→a diode $D_y$→a power receiving coil 120. A voltage v becomes a zero voltage level as illustrated.

(2) Time period II (switches $Q_u$ and $Q_y$ are turned on): a current i flows with a route of a resonance capacitor C→a diode $D_u$→a smoothing capacitor $C_0$→a diode $D_y$→a power receiving coil 120. A voltage v becomes a positive voltage level which corresponds to a DC output voltage (voltage between DC terminals of a bridge circuit) $V_0$ as illustrated. During this time period, a smoothing capacitor $C_0$ is charged by the current i.

(3) Time period III (switches $Q_x$ and $Q_y$ are turned on): a current i flows with the same route as that of a time period I and a voltage v becomes a zero voltage level as illustrated.

(4) Time period IV (switches $Q_u$ and $Q_v$ are turned on): a current i flows with a route of a resonance capacitor C→a power receiving coil 120→a diode $D_v$→a switch $Q_u$. A voltage v becomes a zero voltage level as illustrated.

(5) Time period V (switches $Q_x$ and $Q_v$ are turned on): a current i flows with a route of a resonance capacitor C→a power receiving coil 120→a diode $D_v$→a smoothing capacitor $C_0$→a diode $D_x$. A voltage v becomes a negative voltage level which corresponds to a DC output voltage $V_0$ as illustrated. During this time period, a smoothing capacitor $C_0$ is charged by the current i.

(6) Time period VI (switches $Q_u$ and $Q_v$ are turned on): a current i flows with the same route as that of a time period IV and a voltage v becomes a zero voltage level as illustrated.

Hereafter, operations transition to a switching mode of a time period I and similar operations are repeated.

Next, explanations are given for when power is supplied from the load R to the power receiving coil 120.

Figure 3:
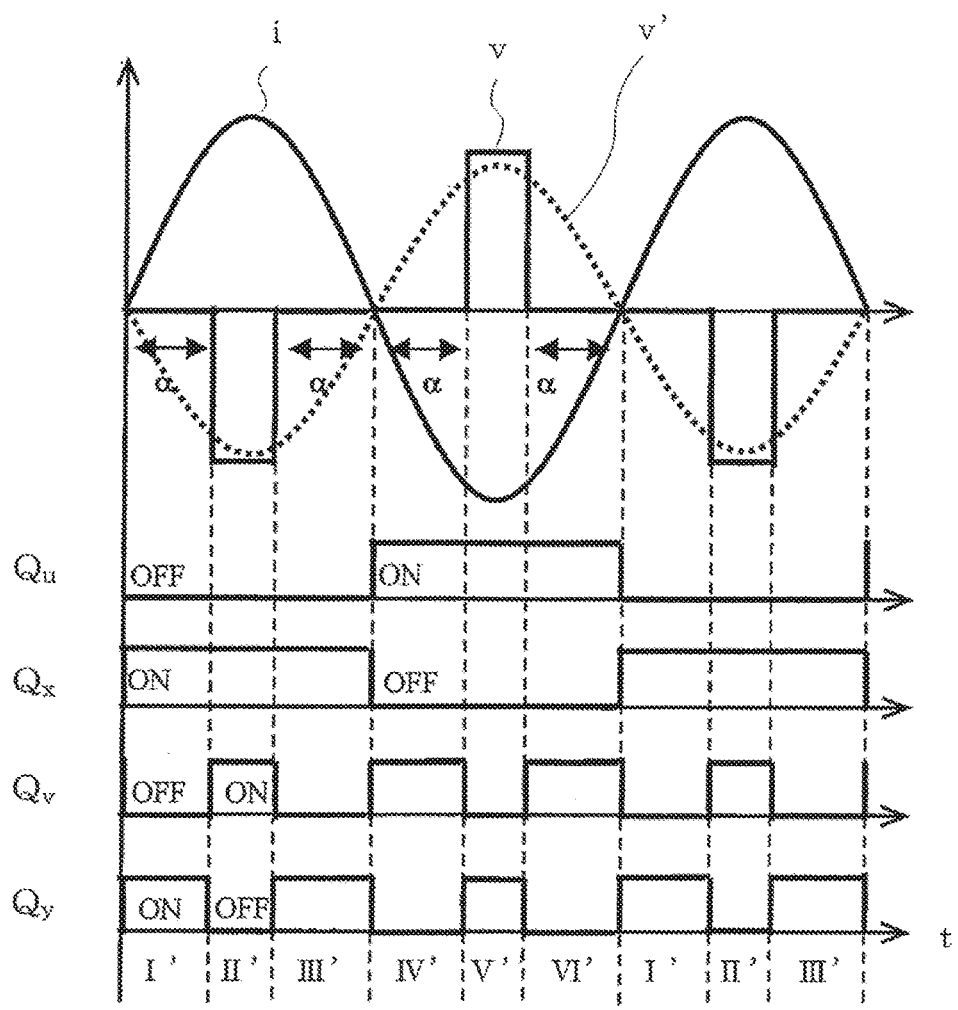
FIG. 3 illustrates an operation waveform diagram according to the first embodiment of the present invention.

Similarly to FIG. 2, FIG. 3 illustrates a current i, a voltage v between AC terminals of the bridge circuit, a fundamental wave component v' of the voltage v, and driving signals of switches $Q_u$, $Q_x$, $Q_v$, and $Q_y$. Switches $Q_u$, $Q_x$, $Q_v$, and $Q_y$ perform a switching operation with a constant frequency synchronized with the current i. Hereafter, explanations are given for operations in each time period I' to VI' of FIG. 3.

(1) Time period I' (switches $Q_x$ and $Q_y$ are turned on): a current i flows with a route of a resonance capacitor C→a switch $Q_x$→a diode $D_y$→a power receiving coil 120. A voltage v becomes a zero voltage level as illustrated. The operation at this time is the same as that in the time period I of FIG. 2.

(2) Time period II' (switches $Q_x$ and $Q_v$ are turned on): a current i flows with a route of a resonance capacitor C→a switch $Q_x$→a smoothing capacitor $C_0$→a switch $Q_v$→a power receiving coil 120. A voltage v becomes a negative voltage level which corresponds to a DC output voltage $V_0$ as illustrated. During this time period, a smoothing capacitor $C_0$ is discharged by the current i.

(3) Time period III' (switches $Q_x$ and $Q_y$ are turned on): a current i flows with the same route as that of a time period I' and a voltage v becomes a zero voltage level as illustrated.

(4) Time period IV' (switches $Q_u$ and $Q_v$ are turned on): a current i flows with a route of a resonance capacitor C→a power receiving coil 120→a diode $D_v$→a switch $Q_u$. A voltage v becomes a zero voltage level as illustrated. The operation at this time is the same as that in the time period IV of FIG. 2.

(5) Time period V' (switches $Q_u$ and $Q_y$ are turned on): a current i flows with a route of a resonance capacitor C→a power receiving coil 120→a switch $Q_y$→a smoothing capacitor $C_0$→a switch $Q_u$. A voltage v becomes a positive voltage level which corresponds to a DC output voltage $V_0$ as illustrated. During this time period, a smoothing capacitor $C_0$ is discharged by the current i.

(6) Time period VI' (switches $Q_u$ and $Q_v$ are turned on): a current i flows with the same route as that of a time period IV' and a voltage v becomes a zero voltage level as illustrated.

Hereafter, operations transition to a switching mode of a time period I' and similar operations are repeated.

As mentioned above, the control device 200 performs a switching control of semiconductor switches $Q_u$, $Q_x$, $Q_v$, and $Q_y$. Consequently, a voltage v between AC terminals of a bridge circuit is controlled such that the voltage v becomes a zero voltage only during a time period α before and after the zero crossing point of the current i which flows through the power receiving coil 120 and such that the voltage v becomes a positive-negative voltage in which a DC output voltage $V_0$ is set as a peak value during other time periods. A power supplied from the primary side power supply line 110 to the power receiving circuit 320 is a product of a current i and a voltage v as illustrated in FIG. 1. Accordingly, as the control device 200 adjusts driving signals of semiconductor switches $Q_u$, $Q_x$, $Q_v$, and $Q_y$, a control of the supplied power, that is, a constant control of a DC output voltage $V_0$, becomes available.

At this time, as illustrated in FIG. 2 and FIG. 3, since a phase difference between a current i which flows through a power receiving coil 120 and a fundamental wave component v' of a voltage v between the AC terminals of a bridge circuit becomes 0° or 180°, a power factor of the power receiving circuit 330 may be set as 1.

Next, explanations are given for a second embodiment of the present invention which corresponds to claim 2.

First, explanations are given for an operation when power is supplied from the power receiving coil 120 to the load R. Similarly to the above, FIG. 4 illustrates a current i, a voltage v between AC terminals of the bridge circuit, a fundamental wave component v' of the voltage v, and a driving signals of switches $Q_u$, $Q_x$, $Q_v$, and $Q_y$. Switches $Q_u$, $Q_x$, $Q_v$, and $Q_y$ perform a switching operation with a constant frequency synchronized with the current i. Hereafter, explanations are given for an operation in each of the time periods i to vi of FIG. 4.

(1) Time period i (switches $Q_u$ and $Q_y$ are turned on): a current i flows with a route of a resonance capacitor C→a diode $D_u$→a smoothing capacitor $C_0$→a diode $D_y$→a power receiving coil 120. A voltage v becomes a positive voltage level which corresponds to a DC output voltage $V_0$ as illustrated. During this time period, a smoothing capacitor $C_0$ is charged by the current i.

(2) Time period ii (switches $Q_x$ and $Q_y$ are turned on): a current i flows with a route of a resonance capacitor C→a switch $Q_x$→a diode $D_y$→a power receiving coil 120. A voltage v becomes a zero voltage level as illustrated.

(3) Time period iii (switches $Q_u$ and $Q_y$ are turned on): a current i flows with the same route as that of a time period i. A voltage v becomes a positive voltage level which corresponds to a DC output voltage $V_0$ as illustrated. During this time period, a smoothing capacitor $C_0$ is charged by the current i.

(4) Time period iv (switches $Q_x$ and $Q_v$ are turned on): a current i flows with a route of a resonance capacitor C→a power receiving coil 120→a diode $D_v$→a smoothing capacitor $C_0$→a diode $D_x$. A voltage v becomes a negative voltage level which corresponds to a DC output voltage $V_0$ as illustrated. During this time period, a smoothing capacitor $C_0$ is charged by the current i.

(5) Time period v (switches $Q_u$ and $Q_v$ are turned on): a current i flows with a route of a resonance capacitor C→a power receiving coil 120→a diode $D_v$→a switch $Q_u$. A voltage v becomes a zero voltage level as illustrated.

(6) Time period vi (switches $Q_x$ and $Q_v$ are turned on): a current i flows with the same route as that of a time period iv. A voltage v becomes a negative voltage level which corresponds to a DC output voltage $V_0$ as illustrated. During this time period, a smoothing capacitor $C_0$ is charged by the current i.

Hereafter, operations transition to a switching mode of a time period i and similar operations are repeated.

Next, explanations are given for an operation when power is supplied from the load R to the power receiving coil 120.

Figure 5:
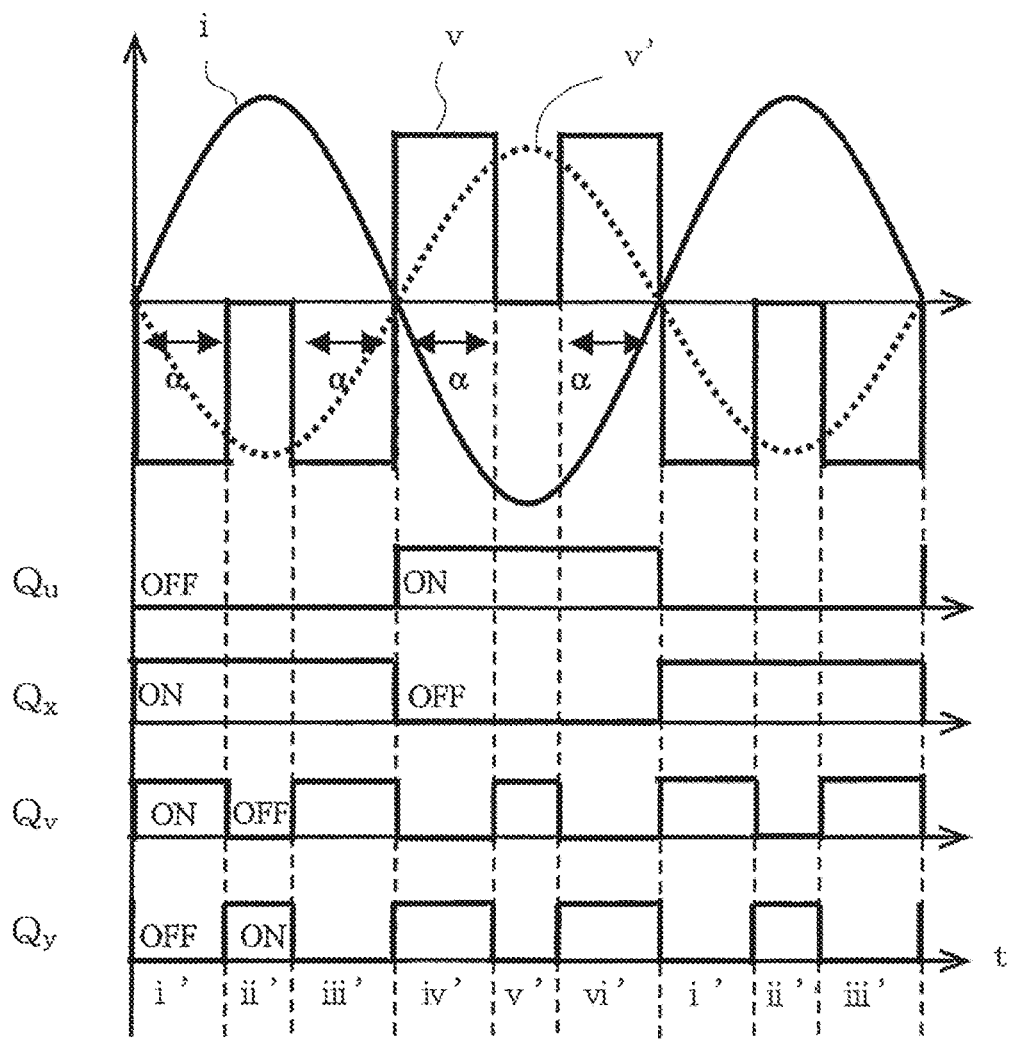
FIG. 5 illustrates an operation waveform diagram according to the second embodiment of the present invention.

Similarly to the above, FIG. 5 illustrates a current i, a voltage v between AC terminals of the bridge circuit, a fundamental wave component v' of the voltage v, and driving signals of switches $Q_u$, $Q_x$, $Q_v$, and $Q_y$. Switches $Q_u$, $Q_x$, $Q_v$, and $Q_y$ perform a switching operation with a constant frequency synchronized with the current i. Hereafter, explanations are given for an operation in each time period i' to vi' of FIG. 5.

(1) Time period i' (switches $Q_x$ and $Q_v$ are turned on): a current i flows with a route of a resonance capacitor C→a switch $Q_x$→a smoothing capacitor $C_0$→a switch $Q_v$→a power receiving coil 120. A voltage v becomes a negative voltage level which corresponds to a DC output voltage $V_0$ as illustrated. During this time period, a smoothing capacitor $C_0$ is discharged by the current i.

(2) Time period ii' (switches $Q_x$ and $Q_y$ are turned on): a current i flows with a route of a resonance capacitor C→a switch $Q_x$→a diode $D_y$→a power receiving coil 120. A voltage v becomes a zero voltage level as illustrated. The operation at this time is the same as that in the time period ii of FIG. 4.

(3) Time period iii' (switches $Q_x$ and $Q_v$ are turned on): a current i flows with the same route as that of a time period i'. A voltage v becomes a negative voltage level which corresponds to a DC output voltage $V_0$ as illustrated. During this time period, a smoothing capacitor $C_0$ is discharged by the current i.

(4) Time period iv' (switches $Q_u$ and $Q_y$ are turned on): a current i flows with a route of a resonance capacitor C→a power receiving coil 120→a switch $Q_y$→a smoothing capacitor $C_0$→a switch $Q_u$. A voltage v becomes a positive voltage level which corresponds to a DC output voltage $V_0$ as illustrated. During this time period, a smoothing capacitor $C_0$ is discharged by the current i.

(5) Time period v' (switches $Q_u$ and $Q_v$ are turned on): a current i flows with a route of a resonance capacitor C→a power receiving coil 120→a diode $D_v$→a switch $Q_u$. A voltage v becomes a zero voltage level as illustrated. The operation at this time is the same as that in the time period v of FIG. 4.

(6) Time period vi' (switches $Q_u$ and $Q_y$ are turned on): a current i flows with the same route as that of a time period iv'. A voltage v becomes a positive voltage level which corresponds to a DC output voltage $V_0$ as illustrated. During this time period, a smoothing capacitor $C_0$ is discharged by the current i.

Hereafter, operations transition to a switching mode of a time period i' and similar operations are repeated.

As mentioned above, the control device 200 performs a switching control of semiconductor switches $Q_u$, $Q_x$, $Q_v$, and $Q_y$. Consequently, a voltage v between AC terminals of a bridge circuit is controlled such that the voltage v becomes a positive-negative voltage in which a DC output voltage $V_0$ is set as a peak value only during a time period α before and after the zero crossing point of the current i which flows through the power receiving coil 120 and such that the voltage v becomes a zero voltage during other time periods. A power supplied from the primary side power supply line 110 to the power receiving circuit 320 is a product of a current i and a voltage v as illustrated in FIG. 1. Accordingly, as the control device 200 adjusts driving signals of switches $Q_u$, $Q_x$, $Q_v$, and $Q_y$ on the basis of a detected value of a DC output voltage $V_0$, a control of the supplied power, that is, a constant control of a DC output voltage $V_0$, becomes available.

At this time, as illustrated in FIG. 4 and FIG. 5, since a phase difference between a current i which flows through a power receiving coil 120 and a fundamental wave component v' of a voltage v between AC terminals of a bridge circuit becomes 0° or 180°, a power factor of the power receiving circuit 330 may be set as 1.

As mentioned above, according to the first and second embodiments of the present invention, a constant control for a DC output voltage $V_O$ is available in which a power factor of the power receiving circuit 330 is set as 1.

However, in these embodiments, the number of switching times is large and four switching losses occur in one cycle of the current i which flows through the power receiving coil 120. FIG. 6 illustrates, as an example, a current i which flows through a power receiving coil 120 of FIG. 1, a voltage v between AC terminals of a bridge circuit, and currents which flow through switches $Q_u$, $Q_x$, $Q_v$, and $Q_y$ when a power load is connected to the load R and the first embodiment is applied as a power supply device.

As is clear from FIG. 6, switching losses occur at a transition during the following time periods.

(1) From time period I to time period II
(2) From time period II to time period III
(3) From time period IV to time period V
(4) From time period V to time period VI Switching losses do not occur at a transition during the following time periods since the current i during these time periods is zero.

(5) From time period III to time period IV
(6) From time period VI to time period I Since switching losses possess most of the components of losses of semiconductor switches, when the number of times switching losses are generated is large, this becomes a factor inhibiting significant reduction in losses of semiconductor switches.

Hereafter, explanations are given for a third embodiment of the present invention, in which a power receiving circuit may be operated with a power factor 1 and the number of times switching losses are generated may be reduced. The third embodiment corresponds to claim 3.

First, explanations are given for an operation when power is supplied from the power receiving coil 120 of FIG. 1 to the load R.

Figure 7:
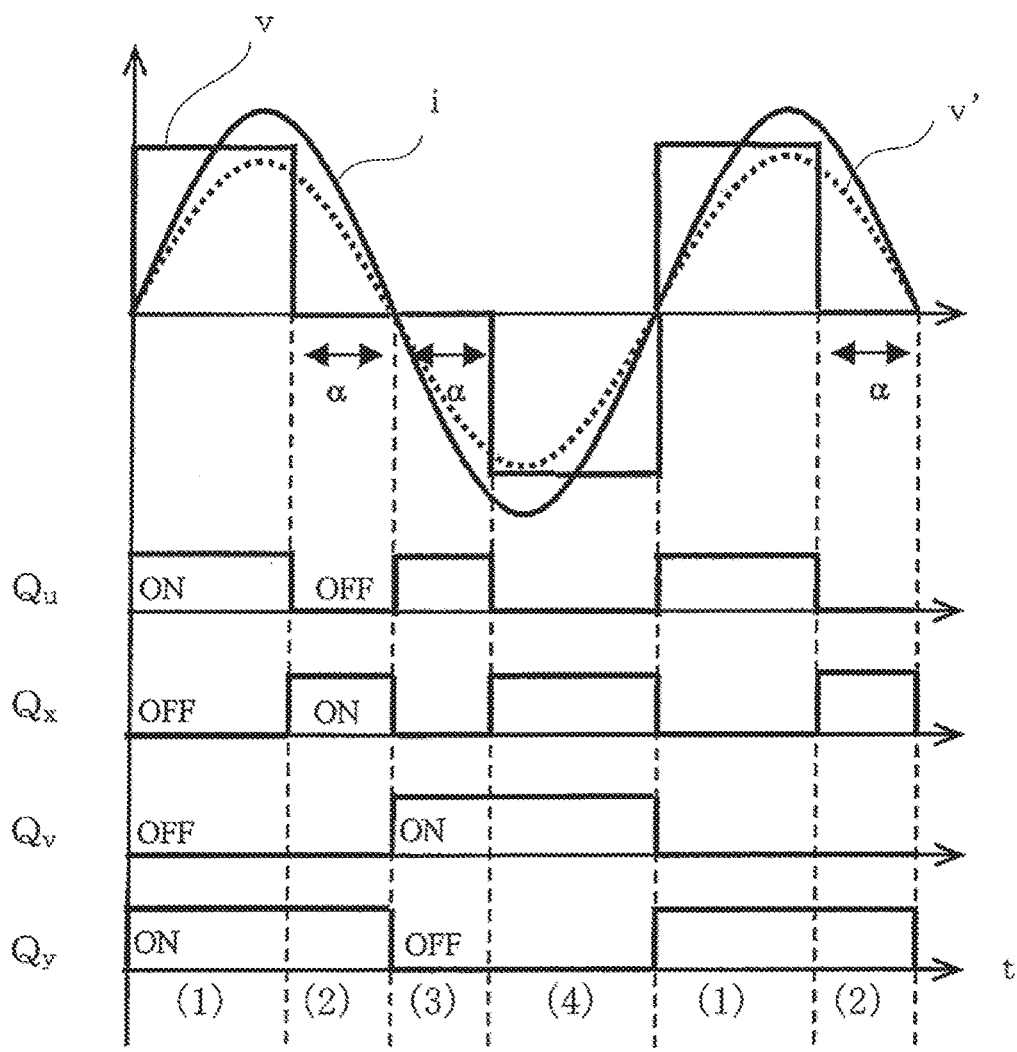
FIG. 7 illustrates an operation waveform diagram according to a third embodiment of the present invention.

Similarly to the above, FIG. 7 illustrates a current i, a voltage v between AC terminals of the bridge circuit, a fundamental wave component v' of the voltage v, and driving signals of switches $Q_u$, $Q_x$, $Q_v$, and $Q_y$. Switches $Q_u$, $Q_x$, $Q_v$, and $Q_y$ perform a switching operation with a constant frequency synchronized with the current i. Hereafter, explanations are given for an operation in each time period (1) to (4) of FIG. 7.

(1) Time period (1) (switches $Q_u$ and $Q_y$ are turned on): a current i flows with a route of a resonance capacitor C→a diode $D_u$→a smoothing capacitor $C_O$→a diode $D_y$→a power receiving coil 120. A voltage v becomes a positive voltage level which corresponds to a DC output voltage $V_O$ as illustrated. During this time period, a smoothing capacitor $C_O$ is charged by the current i.

(2) Time period (2) (switches $Q_x$ and $Q_y$ are turned on): a current i flows with a route of a resonance capacitor C→a switch $Q_x$→a diode $D_y$→a power receiving coil 120. A voltage v becomes a zero voltage level as illustrated.

(3) Time period (3) (switches $Q_u$ and $Q_v$ are turned on): a current i flows with a route of a resonance capacitor C→a power receiving coil 120→a diode $D_v$→a switch $Q_u$. A voltage v becomes a zero voltage level as illustrated.

(4) Time period (4) (switches $Q_x$ and $Q_v$ are turned on): a current i flows with a route of a resonance capacitor C→a power receiving coil 120→a diode $D_v$→a smoothing capacitor $C_O$→a diode $D_x$. A voltage v becomes a negative voltage level which corresponds to a DC output voltage $V_O$ as illustrated. During this time period, a smoothing capacitor $C_O$ is charged by the current i.

Hereafter, operations transition to a switching mode of a time period (1) and similar operations are repeated.

Next, explanations are given for when power is supplied from the load R to the power receiving coil 120.

Figure 8:
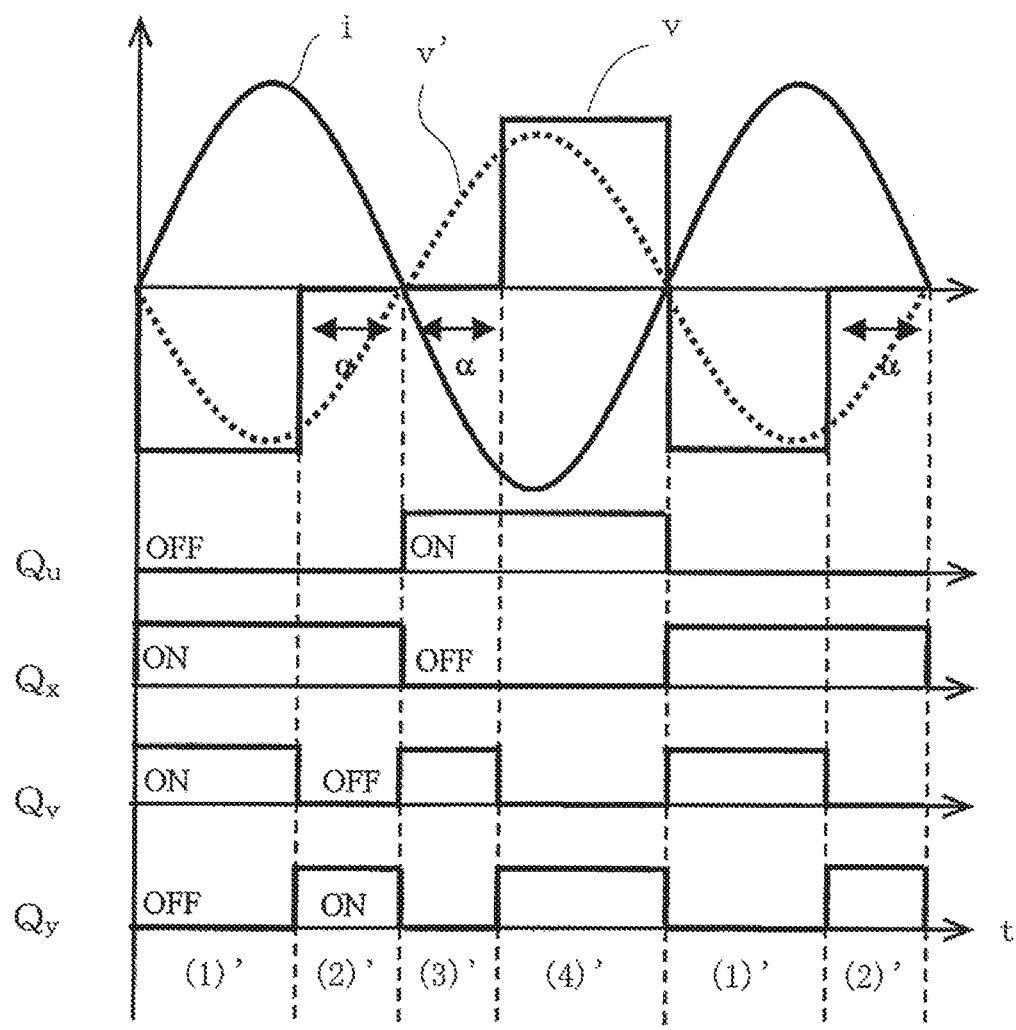
FIG. 8 illustrates an operation waveform diagram according to the third embodiment of the present invention.

Similarly to the above, FIG. 8 illustrates a current i, a voltage v between AC terminals of the bridge circuit, a fundamental wave component v' of the voltage v, and driving signals of switches $Q_u$, $Q_x$, $Q_v$, and $Q_y$. Switches $Q_u$, $Q_x$, $Q_v$, and $Q_y$ perform a switching operation with a constant frequency synchronized with the current i. Hereafter, explanations are given for operations in each time period (1)' to (4)' of FIG. 8.

(1) Time period (1)' (switches $Q_x$ and $Q_y$ are turned on): a current i flows with a route of a resonance capacitor C→a switch $Q_x$→a smoothing capacitor $C_O$→a switch $Q_y$→a power receiving coil 120. A voltage v becomes a negative voltage level which corresponds to a DC output voltage $V_O$ as illustrated. During this time period, a smoothing capacitor $C_O$ is discharged by the current i.

(2) Time period (2)' (switches $Q_x$ and $Q_y$ are turned on): a current i flows with a route of a resonance capacitor C→a switch $Q_x$→a diode $D_y$→a power receiving coil 120. A voltage v becomes a zero voltage level as illustrated. The operation at this time is the same as that in the time period (2) of FIG. 7.

(3) Time period (3)' (switches $Q_u$ and $Q_v$ are turned on): a current i flows with a route of a resonance capacitor C→a power receiving coil 120→a diode $D_v$→a switch $Q_u$. A voltage v becomes a zero voltage level as illustrated. The operation at this time is the same as that in the time period (3) of FIG. 7.

(4) Time period (4)' (switches $Q_u$ and $Q_y$ are turned on): a current i flows with a route of a resonance capacitor C→a power receiving coil 120→a switch $Q_y$→a smoothing capacitor $C_O$→a switch $Q_u$. A voltage v becomes a positive voltage level which corresponds to a DC output voltage $V_O$ as illustrated. During this time period, a smoothing capacitor $C_O$ is discharged by the current i.

Hereafter, operations transition to a switching mode of a time period (1)' and similar operations are repeated.

As mentioned above, the control device 200 performs a switching control of semiconductor switches $Q_u$, $Q_x$, $Q_v$, and $Q_y$. Consequently, a voltage v between AC terminals of a bridge circuit is controlled such that the voltage v becomes a zero voltage only during a time period α before and after the zero crossing point of the current i which flows through the power receiving coil 120 and such that the voltage v becomes a positive-negative voltage in which a DC output voltage $V_O$ is set as a peak value during other time periods. A power supplied from the primary side power supply line 110 to the power receiving circuit 330 is a product of a current i and a voltage v illustrated in FIG. 1. Accordingly, as the control device 200 adjusts driving signals of semiconductor switches $Q_u$, $Q_x$, $Q_v$, and $Q_y$ on the basis of a detected value of a DC output voltage $V_O$, a control of the supplied power, that is, a constant control of a DC output voltage $V_O$, becomes available.

At this time, as illustrated in FIG. 7 and FIG. 8, since a phase difference between a current i which flows through a power receiving coil 120 and a fundamental wave component v' of a voltage v between AC terminals of a bridge circuit becomes 0° or 180°, a power factor of the power receiving circuit 330 may be set as 1.

Figure 9:
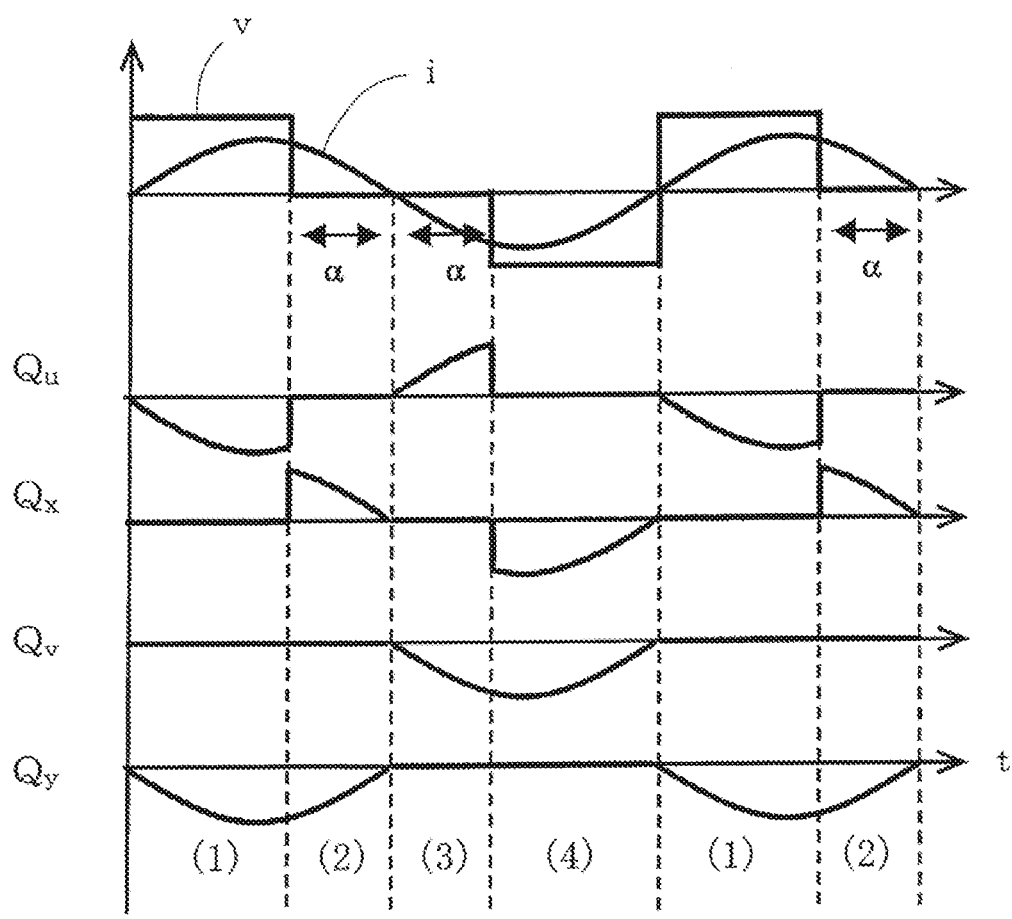
FIG. 9 illustrates a waveform diagram of a current and a voltage in the third embodiment of the present invention.

FIG. 9 illustrates a current i which flows through the power receiving coil 120 of FIG. 1 and a current which flows through switches $Q_u$, $Q_x$, $Q_v$, and $Q_y$ when a power load is connected as a load R and the second embodiment is applied as a power supply device. As illustrated in FIG. 9, switching losses occur at a transition during the following time periods.

(1) From time period (1) to time period (2)
(2) From time period (3) to time period (4)

Here, switching losses do not occur at a transition during the following time periods since the current i during these time periods is zero.

(3) From time period (2) to time period (3)
(4) From time period (4) to time period (1)

While the number of times switching losses are generated is four in the first and second embodiments, the number of times switching losses are generated is two in the third embodiment, as is clear from FIG. 9. Therefore, according to the third embodiment, a power receiving circuit 330 may be operated with a power factor 1 similarly to the first and second embodiments and the number of times switching losses are generated may be reduced as well.

In FIG. 7 and FIG. 8, a time period α during which a voltage v between AC terminals of the bridge circuit becomes a zero voltage is defined as a time period before and after the zero crossing point at which the current i of the power receiving coil 120 transitions from a positive value to a negative value. However, a similar effect may be obtained even when a time period during which a voltage v between AC terminals of the bridge circuit becomes a zero voltage is defined as a time period before and after the zero crossing point at which the current i transitions from a negative value to a positive value.

Here, in a non-contact power supply device of FIG. 1 according to first to third embodiments (a first example of a non-contact power supply device), a power receiving circuit 330 is configured by bridge-connecting switches $Q_u$, $Q_x$, $Q_v$, and $Q_y$. Consequently, a DC output voltage $V_O$ may be constantly controlled when either of a power load or a regenerative load is connected as a load R. However, since the power receiving circuit 330 requires four semiconductor switches, there is a concern that a size and cost of the device will increase in regard to a cooling unit or the like.

Further, in first to third embodiments, there is a mode in which a current flows only to a diode which is connected in inverse parallel, even when semiconductor switches are turned on, when a power load is connected. For example, in the case of the first embodiment, a current flows to a diode for each switch during the following time periods, even when switches are turned on, as illustrated in FIG. 2 and FIG. 6.

(1) $Q_u$: Time period II
(2) $Q_x$: Time period V
(3) $Q_v$: Time periods IV to VI
(4) $Q_y$: Time periods I to III As seen from the above, in switches $Q_v$ and $Q_y$, no current flows during the entire time period from the time periods I to VI. Accordingly, switching is not necessary for switches $Q_v$ and $Q_y$, and arms in which these switches are provided may be configured only of diodes $D_v$ and $D_y$.

Therefore, a similar effect to the first to third embodiments that are for a non-contact power supply device of FIG. 1 may be obtained when the non-contact power supply device does not correspond to a regenerative load but corresponds only to a power load. Further, in order to reduce a size and cost of the device, the first to third embodiments may be applied to a second example of a non-contact power supply device illustrated in FIG. 10.

Figure 10:
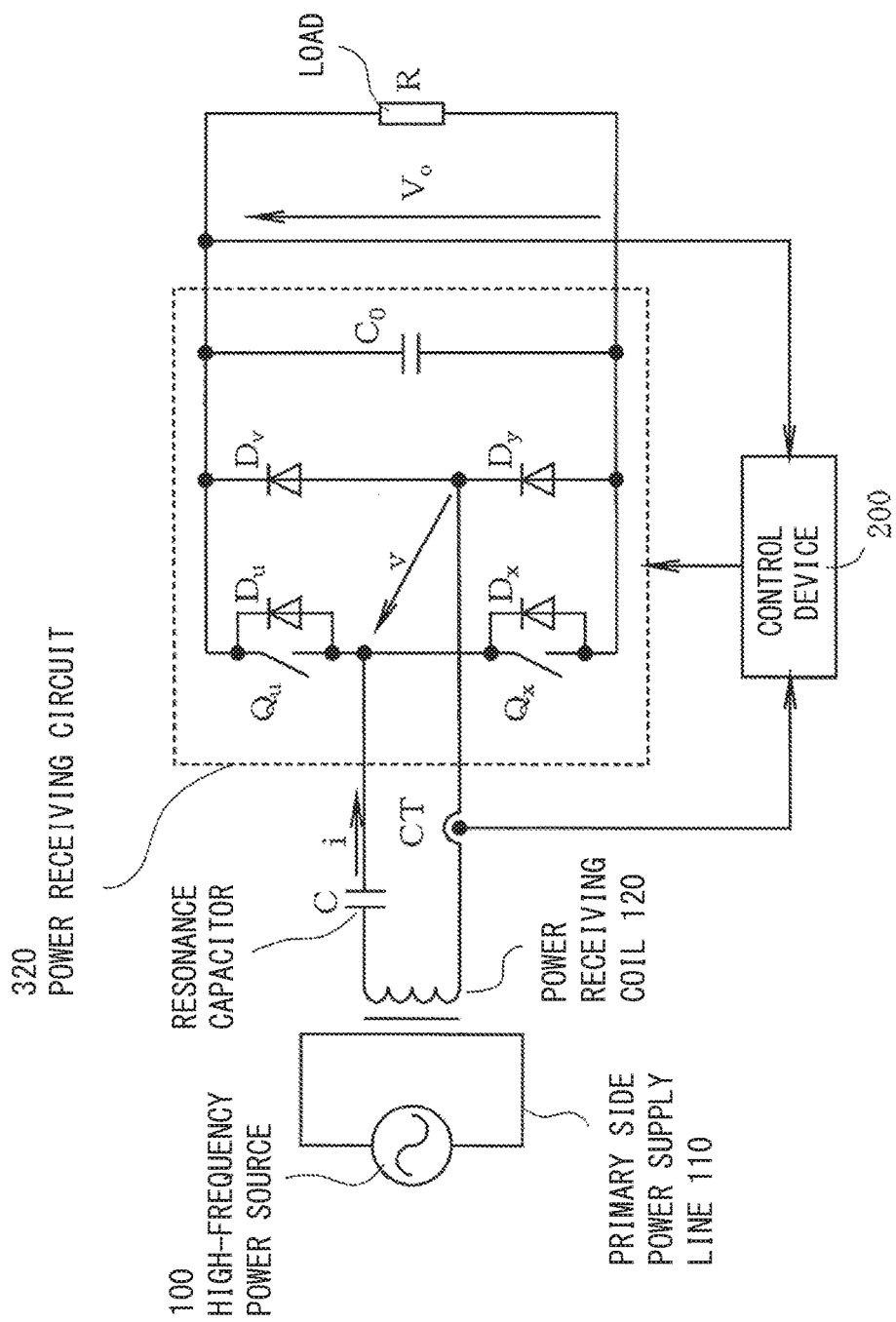
FIG. 10 illustrates a circuit diagram which illustrates a second example of a power supply device according to the present invention.

The power receiving circuit 320 of the non-contact power supply device of FIG. 10 has the same configuration as that of the above mentioned power receiving circuit of FIG. 43.

That is to say, the bridge circuit in the power receiving circuit 320 illustrated in FIG. 10 has a switching arm series circuit wherein a switching arm in which a diode $D_u$ is connected in inverse parallel with a semiconductor switch $Q_u$ and a switching arm in which a diode $D_x$ is connected in inverse parallel with a semiconductor switch $Q_x$ are connected in series. Together with this, the bridge circuit in the power receiving circuit 320 has a diode series circuit in which diodes $D_v$ and $D_y$ are connected in series and is configured such that these series circuits are connected in parallel. The other parts are similar to those of FIG. 1.

Figure 11:
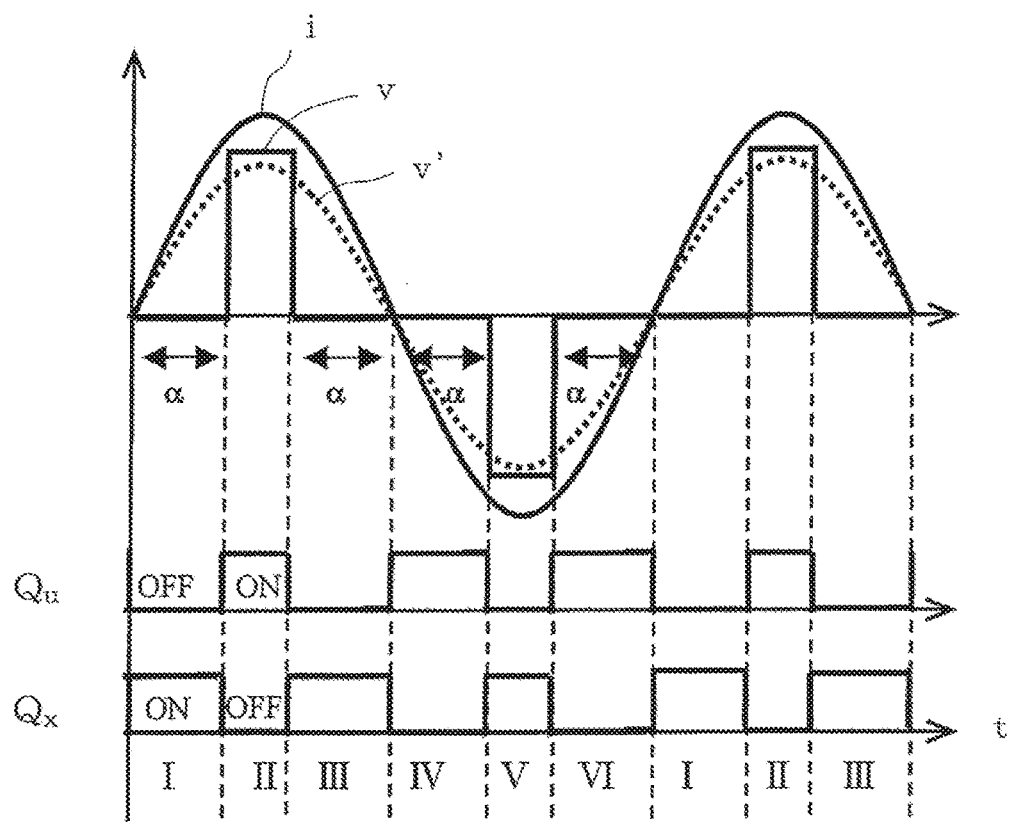
FIG. 11 illustrates an operation waveform diagram according to a fourth embodiment of the present invention.

Next, explanations are given for a fourth embodiment of the present invention, in reference to FIG. 11. The fourth embodiment corresponds to claim 4 in which a concept similar to that of the first embodiment is applied to the non-contact power supply device illustrated in FIG. 10.

FIG. 11 illustrates a current i which flows through the power receiving coil 120, a voltage v between AC terminals of the bridge circuit, a fundamental wave component v' of the voltage v, and driving signals of switches $Q_u$ and $Q_x$, and switches $Q_u$ and $Q_x$ perform a switching operation with a constant frequency synchronized with the current i.

Operations during the time periods I to VI of FIG. 11 are similar to the operations during the time periods I to VI of FIG. 2. Accordingly, in the fourth embodiment, which corresponds to one in which the first embodiment is applied to the non-contact power supply device of FIG. 10, operations and an effect similar to those of FIG. 2 may also be obtained. A similar effect may be obtained when driving signals as illustrated in FIG. 12 is used in which switches $Q_u$ and $Q_x$ are turned off during the time periods II and V in which the current flows only to diodes even when semiconductor switches are turned on.

Next, explanations are given for a fifth embodiment of the present invention in reference to FIG. 13. The fifth embodiment corresponds to claim 5 in which a concept similar to that of the second embodiment is applied to the non-contact power supply device illustrated in FIG. 10.

Similarly to FIG. 11, FIG. 13 illustrates a current i, a voltage v between AC terminals of the bridge circuit, a fundamental wave component v' of the voltage v, and driving signals of switches $Q_u$ and $Q_x$. Switches $Q_u$ and $Q_x$ perform a switching operation with a constant frequency synchronized with the current i.

Figure 14:
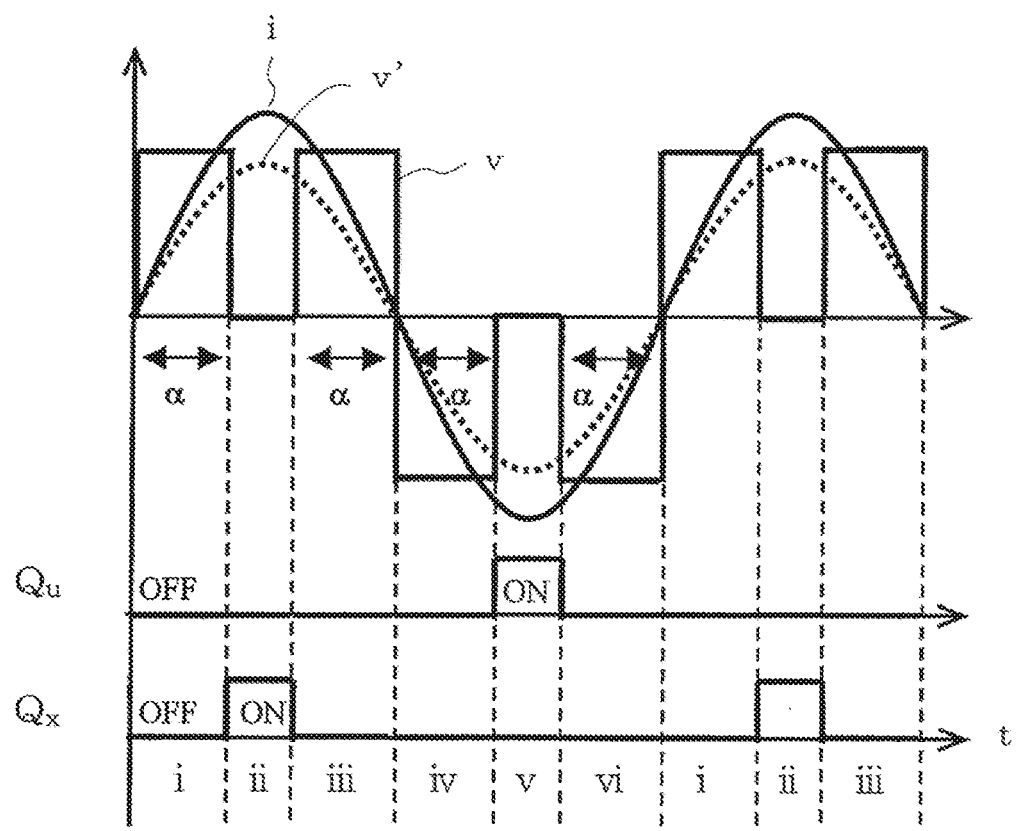
FIG. 14 illustrates an operation waveform diagram according to a fifth embodiment of the present invention.

Operations during the time periods i to vi of FIG. 13 are similar to the operations during the time periods i to vi of FIG. 4. Accordingly, in the fifth embodiment, which corresponds to one in which the second embodiment is applied to the non-contact power supply device of FIG. 10, operations and an effect similar to those of FIG. 4 may also be obtained. A similar effect may be obtained when driving signals as illustrated in FIG. 14 is used in which switches $Q_u$ and $Q_x$ are turned off during the time periods i, iii, iv, and vi in which the current flows only to diodes even when semiconductor switches $Q_u$ and $Q_x$ are turned on.

Figure 15:
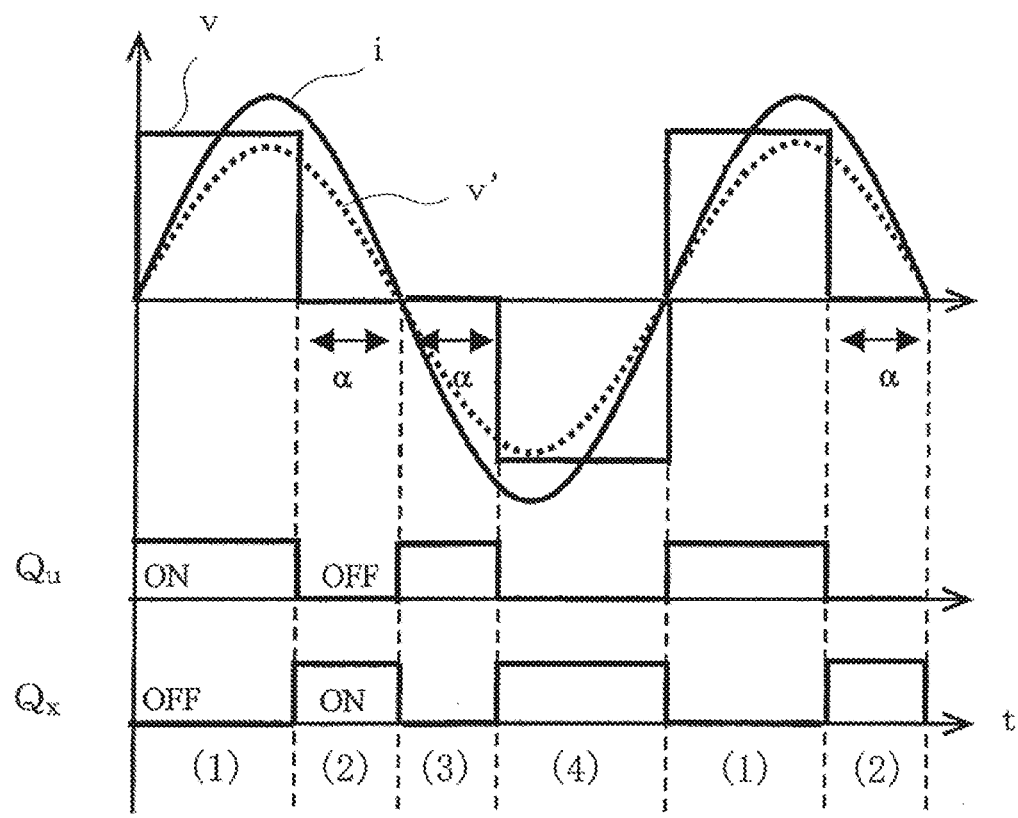
FIG. 15 illustrates an operation waveform diagram according to a sixth embodiment of the present invention.

Next, explanations are given for a sixth embodiment of the present invention in reference to FIG. 15. The sixth embodiment corresponds to claim 6 in which a concept similar to that of the third embodiment is applied to the non-contact power supply device illustrated in FIG. 10.

Similarly to FIG. 11, FIG. 15 illustrates a current i, a voltage v between AC terminals of the bridge circuit, a fundamental wave component v' of the voltage v, and driving signals of switches $Q_u$ and $Q_x$. Switches $Q_u$ and $Q_x$ perform a switching operation with a constant frequency synchronized with the current i.

Figure 16:
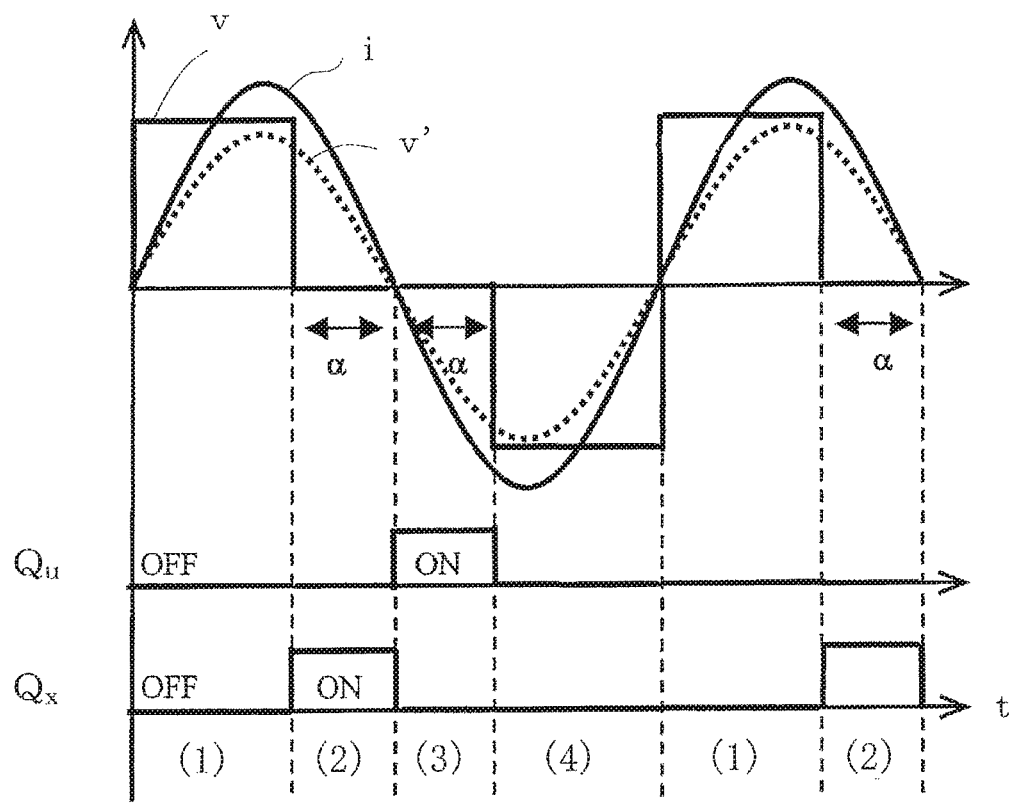
FIG. 16 illustrates an operation waveform diagram according to a sixth embodiment of the present invention.

Operations during the time periods (1) to (4) of FIG. 15 are similar to the operations during the time periods (1) to (4) of FIG. 7. Accordingly, in the sixth embodiment, which corresponds to one in which the third embodiment is applied to the non-contact power supply device of FIG. 10, operations and an effect similar to those of FIG. 7 may also be obtained. A similar effect may be obtained when driving signals as illustrated in FIG. 16 is used in which switches $Q_u$ and $Q_x$ are turned off during the time periods (1) and (4) in which the current flows only to diodes even when semiconductor switches $Q_u$ and $Q_x$ are turned on.

Similar operations and effects may also be obtained when the above fourth to sixth embodiments are applied to the third example of the non-contact power supply device illustrated FIG. 17, with a similar concept.

In the non-contact power supply device illustrated in FIG. 17, the bridge circuit in the power receiving circuit 340 has a switching arm series circuit wherein a switching arm in which a diode $D_v$ is connected in inverse parallel with a semiconductor switch $Q_v$ and a switching arm in which a diode $D_y$ is connected in inverse parallel with a semiconductor switch $Q_y$ are connected in series. Together with this, the bridge circuit in the power receiving circuit 340 has a diode series circuit in which diodes $D_u$ and $D_x$ are connected in series and is configured such that these series circuits are connected in parallel. The other parts are similar to those of FIG. 1.

Further, in the non-contact power supply device illustrated in FIG. 1, a similar effect may be obtained when the fourth to sixth embodiments are applied setting the semiconductor switches in the same positions as those of diodes $D_v$ and $D_y$ in FIG. 10 or diodes $D_u$ and $D_x$ in FIG. 17, being turned off during the entire time periods.

Figure 18:
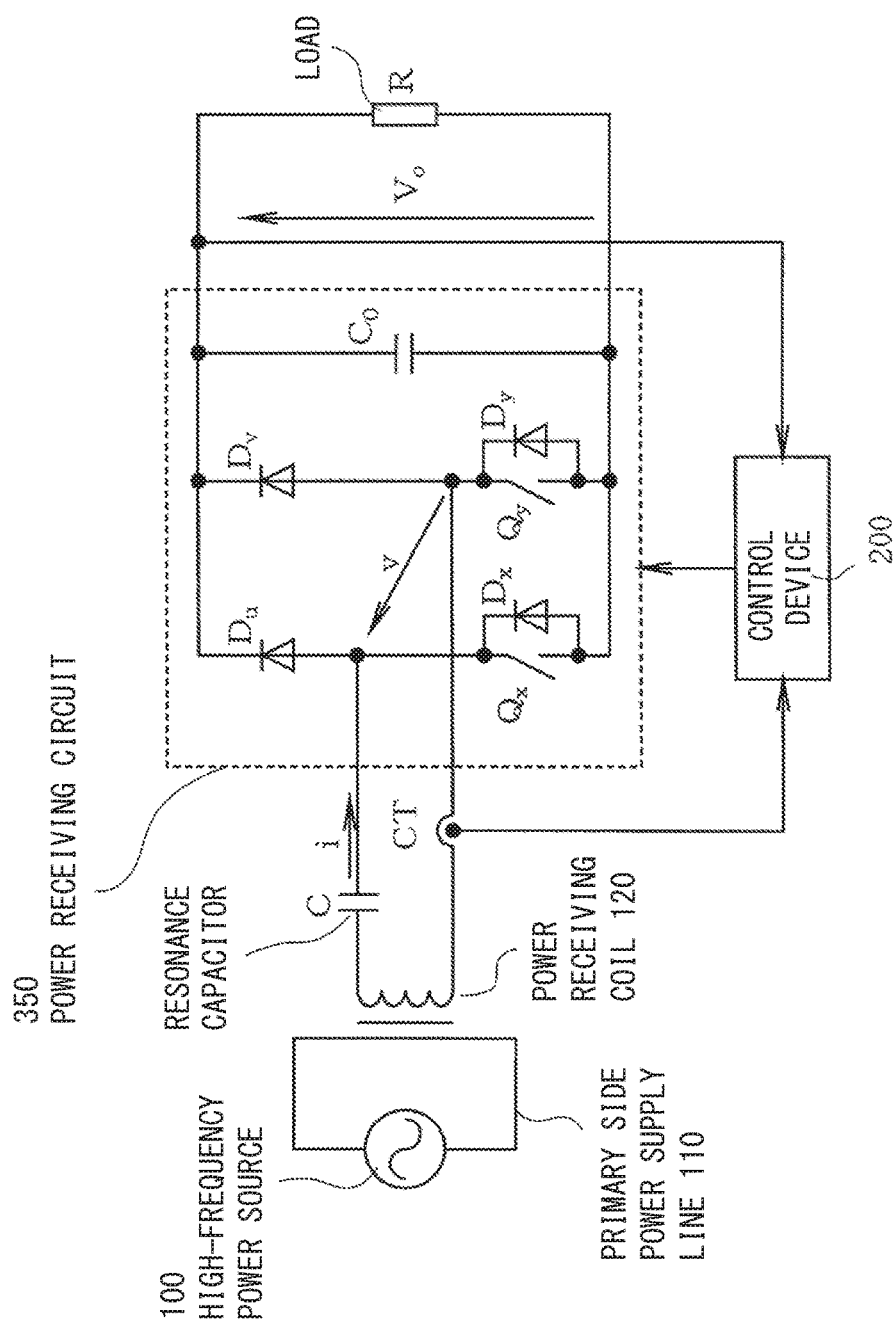
FIG. 18 illustrates a circuit diagram which illustrates a fourth example of a power supply device according to the present invention.

Further, a similar effect may be obtained when applying the first to third embodiments to the fourth example of a non-contact power supply device illustrated in FIG. 18, when it does not correspond to a regenerative load but corresponds only to a power load.

In the power receiving circuit 350 of the non-contact power supply device illustrated in FIG. 18, the bridge circuit has a series circuit wherein a switching arm in which a diode $D_x$ is connected in inverse parallel with a semiconductor switch $Q_x$ and a diode $D_u$ are connected in series and a series circuit wherein a switching arm in which a diode $D_y$ is connected in inverse parallel with a semiconductor switch $Q_y$ and a diode $D_v$ are connected in series. Together with this, the bridge circuit is configured to connect in parallel these series circuits. The other parts are similar to those of FIG. 1.

Figure 19:
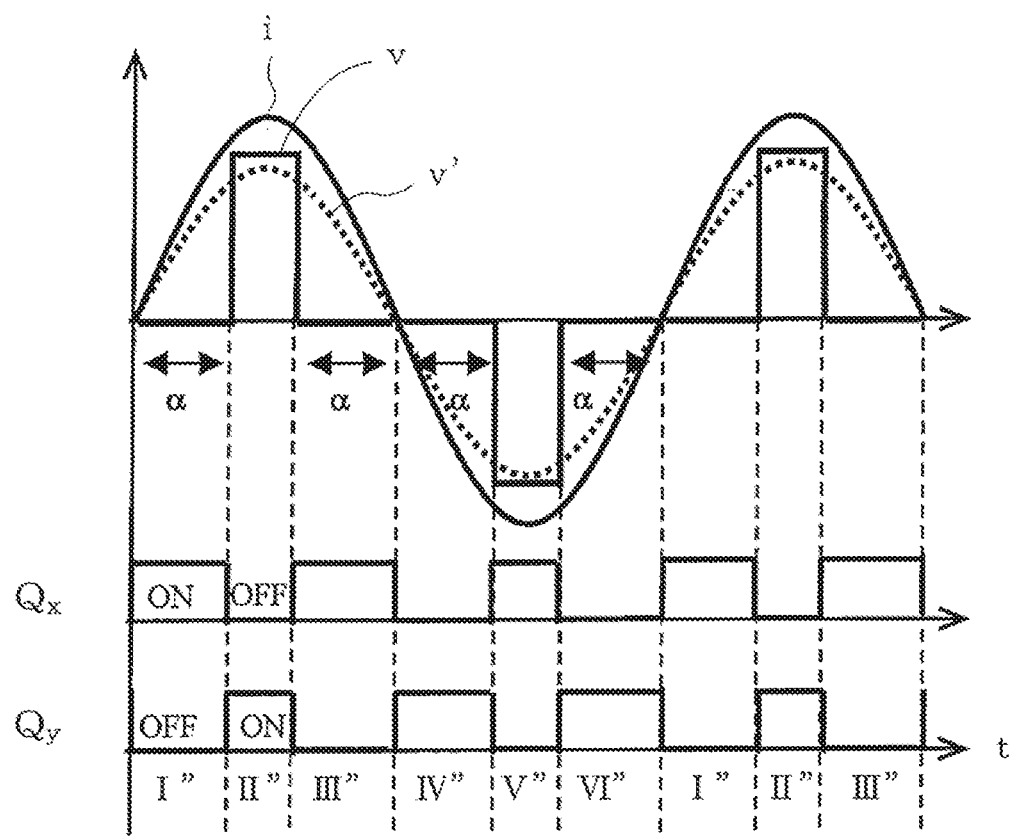
FIG. 19 illustrates an operation waveform diagram according to a seventh embodiment of the present invention.

Next, explanations are given for a seventh embodiment of the present invention in reference to FIG. 19. The seventh embodiment corresponds to claim 7 in which a concept similar to that of the first embodiment is applied to the non-contact power supply device illustrated in FIG. 18.

FIG. 19 illustrates a current i which flows through the power receiving coil 120, a voltage v between AC terminals of the bridge circuit, a fundamental wave component v' of the voltage v, and driving signals of switches $Q_x$ and $Q_y$. Switches $Q_x$ and $Q_y$ perform a switching operation with a constant frequency synchronized with the current i.

Hereafter, explanations are given for operations in each time period I" to VI". In the following explanations for (1) to (6), "similar" applies to a current i, a voltage v, a fundamental wave component v' of the voltage v, and a route of the current i, and on/off operations of switches $Q_x$ and $Q_y$ partly differ from those of FIG. 2.

(1) Time period I" (a switch $Q_x$ is turned on): similar to the time period I of FIG. 2

(2) Time period II" (a switch $Q_y$ is turned on): similar to the time period II of FIG. 2

(3) Time period III" (a switch $Q_x$ is turned on): similar to the time period III of FIG. 2

(4) Time period IV" (a switch $Q_y$ is turned on): a current i flows with a route of a resonance capacitor C→a power receiving coil 120→a switch $Q_y$→a diode $D_x$ of FIG. 18. A voltage v becomes a zero voltage level as illustrated in FIG. 19.

(5) Time period V" (a switch $Q_x$ is turned on): similar to the time period V of FIG. 2

(6) Time period VI" (a switch $Q_y$ is turned on): similar to the time period IV"

Hereafter, operations transition to a switching mode of a time period I" and similar operations are repeated.

Figure 20:
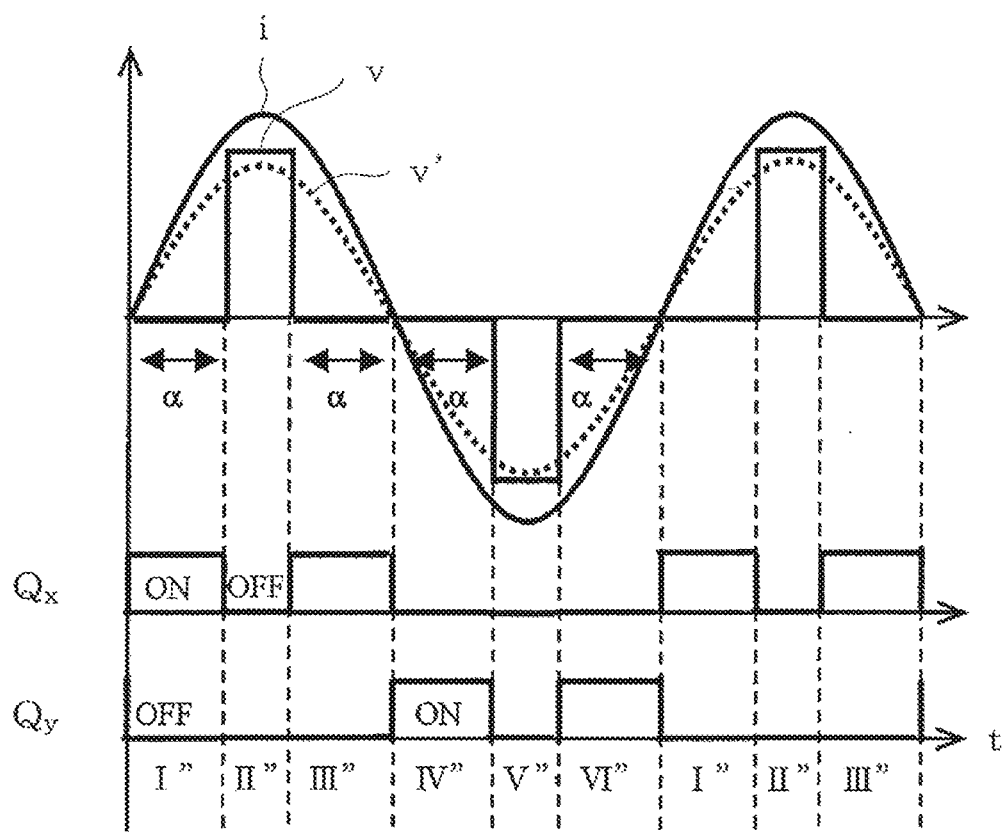
FIG. 20 illustrates an operation waveform diagram according to a seventh embodiment of the present invention.

Accordingly, in the seventh embodiment, which corresponds to one in which the first embodiment is applied to the non-contact power supply device of FIG. 18, operations and an effect similar to those of FIG. 2 may also be obtained. A similar effect may be obtained when driving signals as illustrated in FIG. 20 is used in which switches $Q_x$ and $Q_y$ are turned off during the time periods II" and V" in which the current flows only to diodes even when semiconductor switches $Q_u$ and $Q_x$ are turned on.

Figure 21:
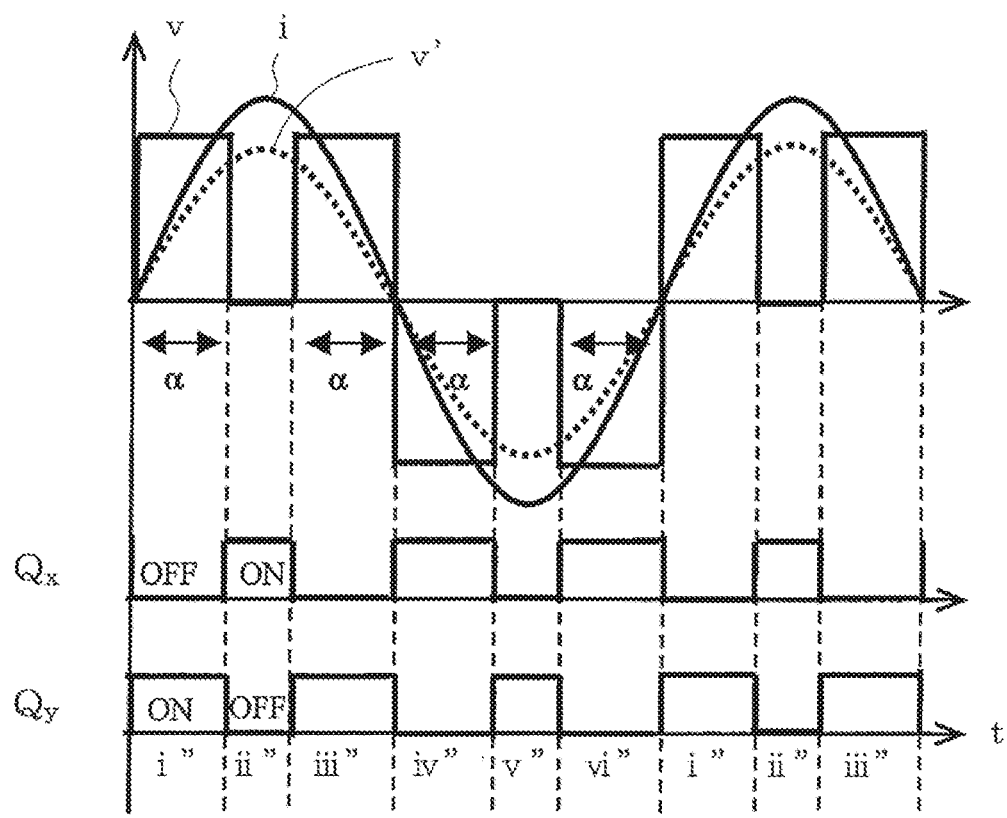
FIG. 21 illustrates an operation waveform diagram according to an eighth embodiment of the present invention.

Next, explanations are given for an eighth embodiment of the present invention in reference to FIG. 21. The eighth embodiment corresponds to claim 8 in which a concept similar to that of the second embodiment is applied to the non-contact power supply device illustrated in FIG. 18.

Similarly to FIG. 19, FIG. 21 illustrates a current i, a voltage v between AC terminals of the bridge circuit, a fundamental wave component v' of the voltage v, and driving signals of switches $Q_x$ and $Q_y$. Switches $Q_x$ and $Q_y$ perform a switching operation with a constant frequency synchronized with the current i.

Hereafter, explanations are given for operations in each time period i" to vi" of FIG. 21. In the following explanations for (1) to (6), "similar" applies to a current i, a voltage v, a fundamental wave component v' of the voltage v, and a route of the current i, and on/off operations of switches $Q_x$ and $Q_y$ partly differ from those of FIG. 4.

(1) Time period i" (a switch $Q_y$ is turned on): similar to the time period i of FIG. 4

(2) Time period ii" (a switch $Q_x$ is turned on): similar to the time period ii of FIG. 4

(3) Time period iii" (a switch $Q_y$ is turned on): similar to the time period iii of FIG. 4

(4) Time period iv" (a switch $Q_x$ is turned on): similar to the time period iv of FIG. 4

(5) Time period v" (a switch $Q_y$ is turned on): a current i flows with a route of a resonance capacitor C→a power receiving coil 120→a switch $Q_y$→a diode $D_x$. A voltage v becomes a zero voltage level as illustrated.

(6) Time period vi" (a switch $Q_x$ is turned on): similar to the time period vi" of FIG. 4

Hereafter, operations transition to a switching mode of a time period i" and similar operations are repeated.

Figure 22:
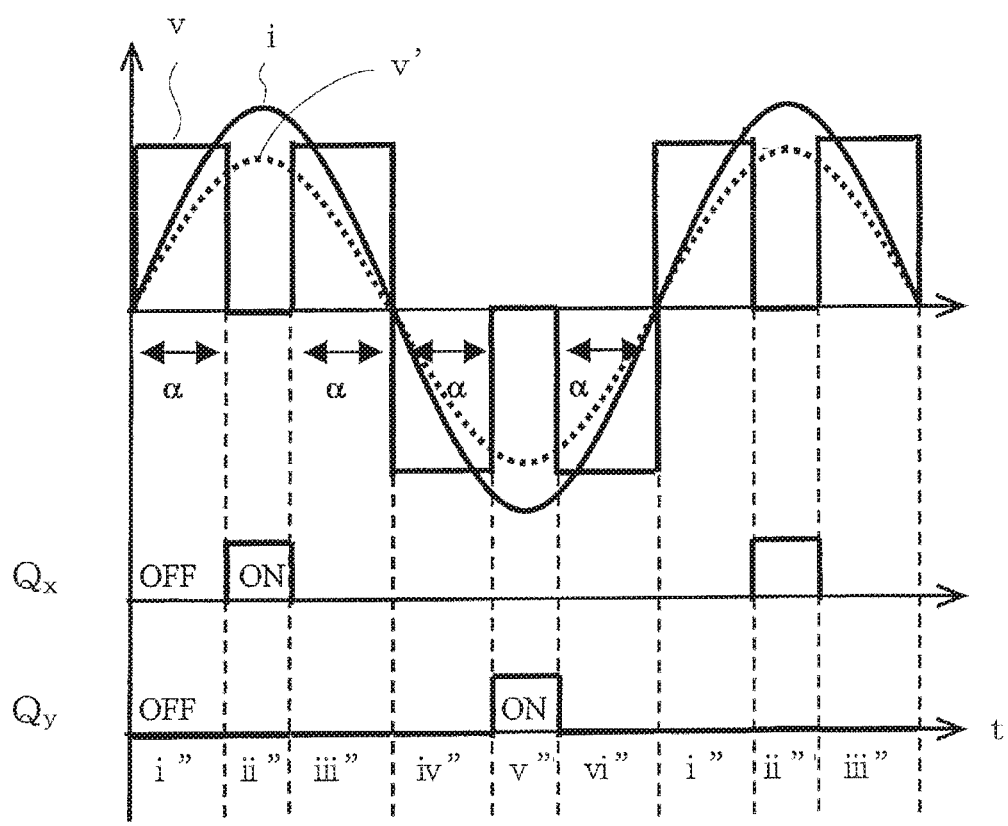
FIG. 22 illustrates an operation waveform diagram according to an eighth embodiment of the present invention.

Accordingly, in the eighth embodiment, which corresponds to one in which the second embodiment is applied to the non-contact power supply device of FIG. 18, operations and an effect similar to those of FIG. 4 may also be obtained. A similar effect may be obtained when driving signals as illustrated in FIG. 22 is used in which switches $Q_x$ and $Q_y$ are turned off during the time periods i", iii", iv", and vi" in which the current flows only to diodes even when semiconductor switches $Q_u$ and $Q_x$ are turned on.

Figure 23:
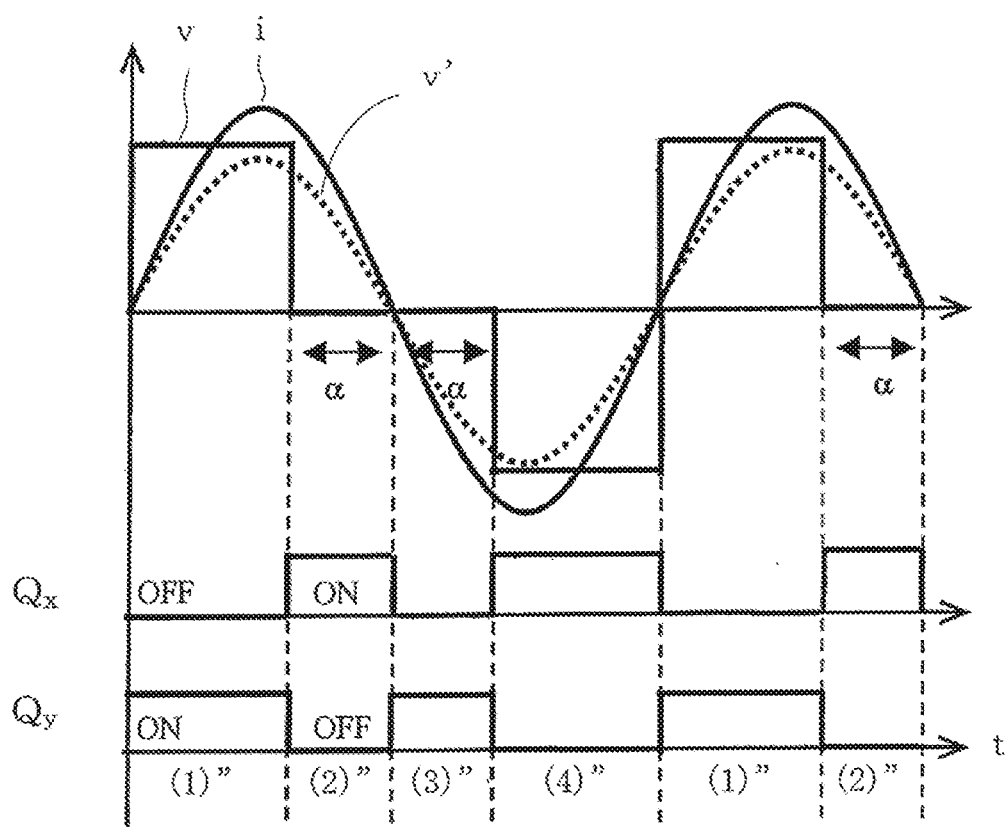
FIG. 23 illustrates an operation waveform diagram according to a ninth embodiment of the present invention.

Next, explanations are given for a ninth embodiment of the present invention in reference to FIG. 23. The ninth embodiment corresponds to claim 9 in which a concept similar to that of the third embodiment is applied to the non-contact power supply device illustrated in FIG. 18.

Similarly to FIG. 19, FIG. 23 illustrates a current i, a voltage v between AC terminals of the bridge circuit, a fundamental wave component v' of the voltage v, and driving signals of switches $Q_x$ and $Q_y$. Switches $Q_x$ and $Q_y$ perform a switching operation with a constant frequency synchronized with the current i.

Hereafter, explanations are given for operations in each time period (1)" to (4)". In the following explanations for (1) to (4), "similar" applies to a current i, a voltage v, a fundamental wave component v' of the voltage v, and a route of the current i, and on/off operations of switches $Q_x$ and $Q_y$ partly differ from those of FIG. 7.

(1) Time period (1)" (a switch $Q_y$ is turned on): similar to the time period (1) of FIG. 7

(2) Time period (2)" (a switch $Q_x$ is turned on): similar to the time period (2) of FIG. 7

(3) Time period (3)" (a switch $Q_y$ is turned on): a current i flows with a route of a resonance capacitor C→a power receiving coil 120→a switch $Q_y$→a diode $D_x$. A voltage v becomes a zero voltage level as illustrated.

(4) Time period (4)" (a switch $Q_x$ is turned on): similar to the time period (4) of FIG. 7

Hereafter, operations transition to a switching mode of a time period (1)" and similar operations are repeated.

Accordingly, in the ninth embodiment, which corresponds to one in which the third embodiment is applied to the non-contact power supply device of FIG. 18, a similar effect to that of FIG. 7 may also be obtained. A similar effect may be obtained when driving signals as illustrated in FIG. 24 is used in which switches $Q_x$ and $Q_y$ are turned off during the time periods (1)" and (4)" in which the current flows only to diodes even when semiconductor switches $Q_x$ and $Q_y$ are turned on.

Figure 25:
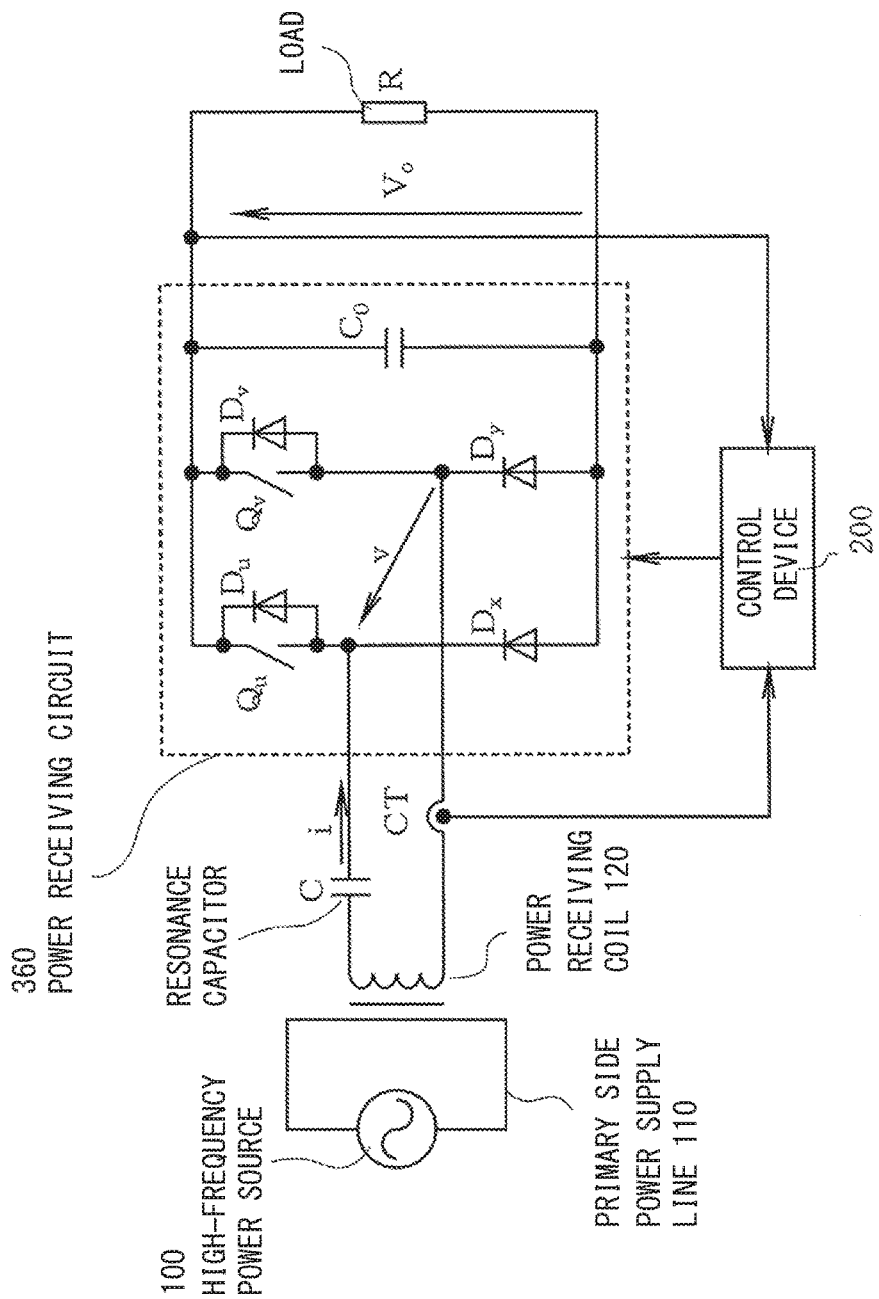
FIG. 25 illustrates a circuit diagram which illustrates a fifth example of a power supply device according to the present invention.

A similar effect may also be obtained when the above first to third embodiments are applied to the fifth example of the non-contact power supply device illustrated in FIG. 25, with a similar concept.

In the non-contact power supply device illustrated in FIG. 25, the bridge circuit in the power receiving circuit 360 connects a switching arm in which a diode $D_u$ is connected in inverse parallel with a semiconductor switch $Q_u$ and a diode $D_x$ in series. Together with this, the bridge circuit in the power receiving circuit 360 is configured to connect a switching arm in which a diode $D_v$ is connected in inverse parallel with a semiconductor switch $Q_v$ and a diode $D_x$ in series and to connect these series circuits in parallel. The other parts are similar to those of FIG. 1.

Further, in the non-contact power supply device illustrated in FIG. 1, a similar effect may be obtained when the first to third embodiments are applied setting the semiconductor switches in the same positions as those of diodes $D_u$ and $D_v$ in FIG. 18 or diodes $D_x$, and $D_y$ in FIG. 25, being turned off during the entire time period.

In any of the first to ninth embodiments, a zero crossing point of the current i which flows through the power receiving coil 120 is detected by a current detection unit CT and a control device 200, and on the basis of this zero crossing point, driving signals of semiconductor switches is determined. However, it is difficult to accurately detect the zero crossing point of the current i due to influences such as an error of a detector and the like, and in some cases, detection errors may occur.

Figure 26:
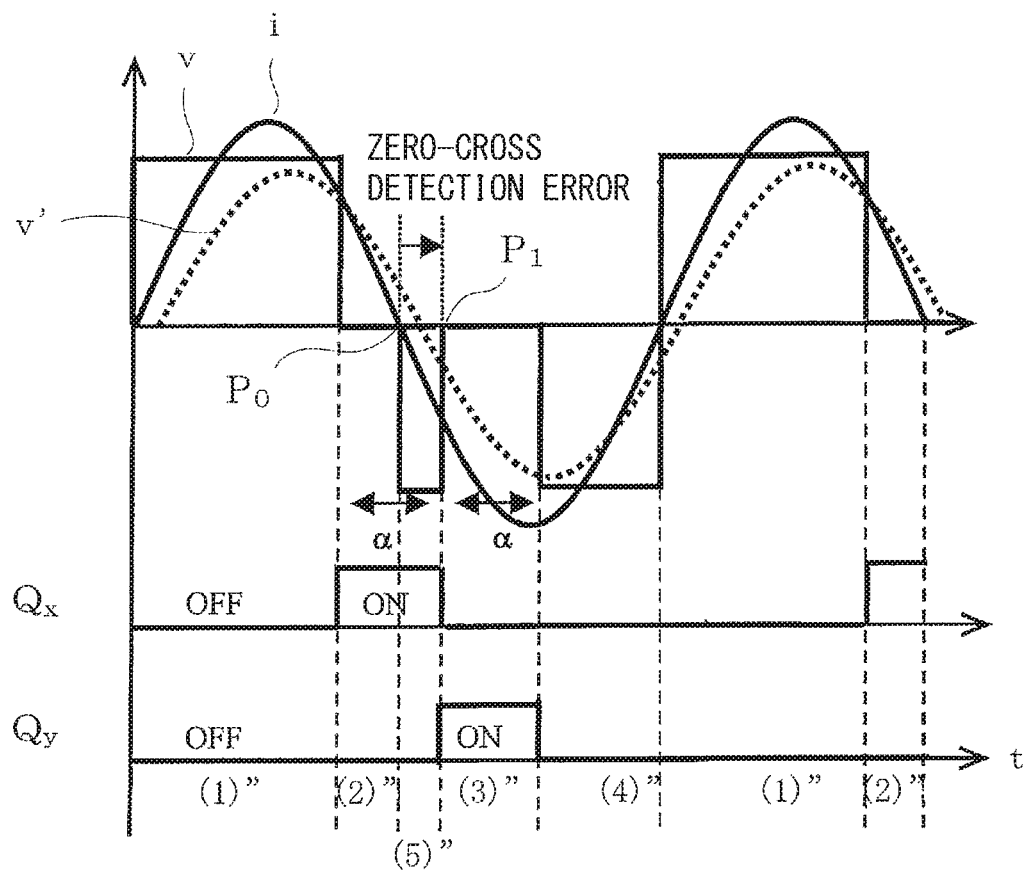
FIG. 26 illustrates an operation waveform diagram when there is a zero crossing point detection error of a current in FIG. 24.
Figure 27:
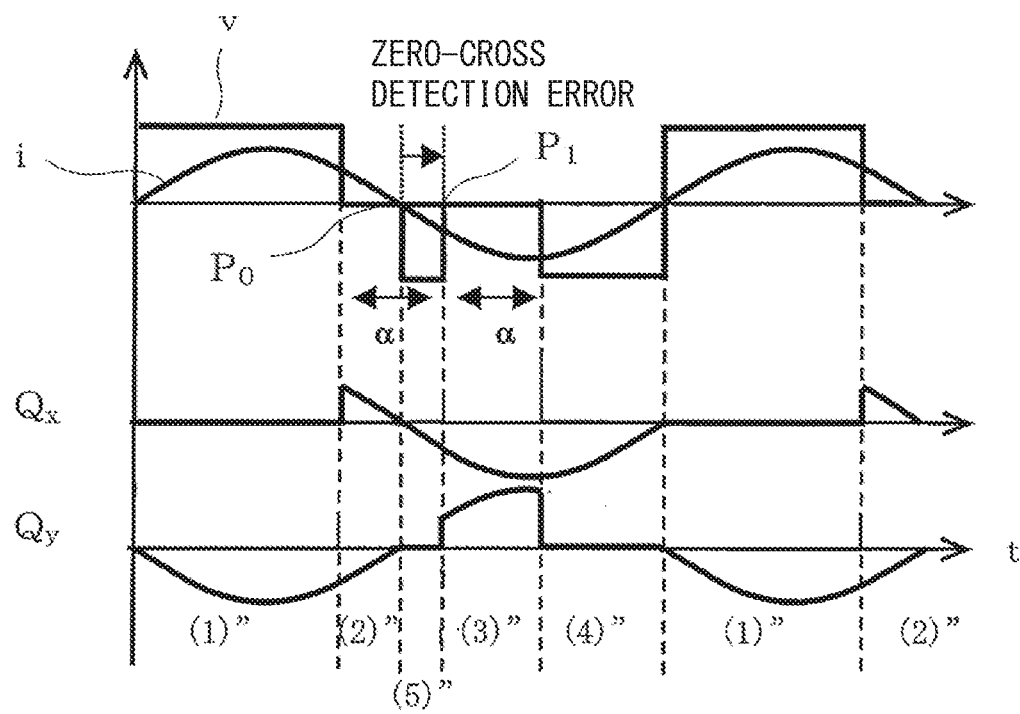
FIG. 27 illustrates an operation waveform diagram when there is a zero crossing point detection error of a current in FIG. 24.

FIG. 26 illustrates an operation waveform when detection errors occur at the zero crossing point of the current i of the power receiving coil 120 in the above mentioned FIG. 24, and also, FIG. 27 illustrates a voltage v between AC terminals of a bridge circuit, a current i, and a current which flows through switches $Q_x$ and $Q_y$ at this time. In FIG. 26, $P_0$ illustrates an original zero crossing point of the current i and $P_1$ illustrates a zero crossing point which has been erroneously detected due to a detector error and the like.

Further, a voltage v and a route of a current i in each of the time periods (1)" to (4)" in FIG. 26 and FIG. 27 are similar to those in each of the time periods (1)" to (4)" in FIG. 23. In the time period (5)" in FIG. 26 and FIG. 27, the current i flows with a route of a resonance capacitor C→a power receiving coil 120→a diode $D_v$→a smoothing capacitor $C_0$→a diode $D_x$ and a voltage v has a level that is similar to that of the voltage in the time period (4)".

As is clear from FIG. 27, switching losses occur at a transition during the following time periods.

(1) From time period (1)" to time period (2)"
(2) From time period (5)" to time period (3)"
(3) From time period (3)" to time period (4)"

Switching losses do not occur at a transition during the following time periods since the current i during these time periods is zero.

(4) From time period (2)" to time period (5)"
(5) From time period (4)" to time period (1)"

As mentioned above, the number of times switching losses are generated is three when detection errors of the zero crossing point of the current i occur. On the other hand, as illustrated in FIG. 9, the number of times switching losses are generated in FIG. 24 is two when detection errors of the zero crossing point do not occur, since the operations in FIG. 24 become similar to those in FIG. 7. That is to say, when detection errors of the zero crossing point of the current i occur, despite efforts in improving a power factor as described in the third, sixth, and ninth embodiments and reducing the number of times switching losses are generated, in reality, the number of times switching losses are generated increases. Further, since a switching from the time period (5)" to the time period (3)" is a switching in the vicinity of the zero crossing point of the current i, it may also cause an increased radiation noise.

Next, explanations are given for the following tenth to seventeenth embodiments as examples for not increasing the number of times switching losses are generated even when the detection errors occur in the zero crossing point of the current i.

Figure 28:
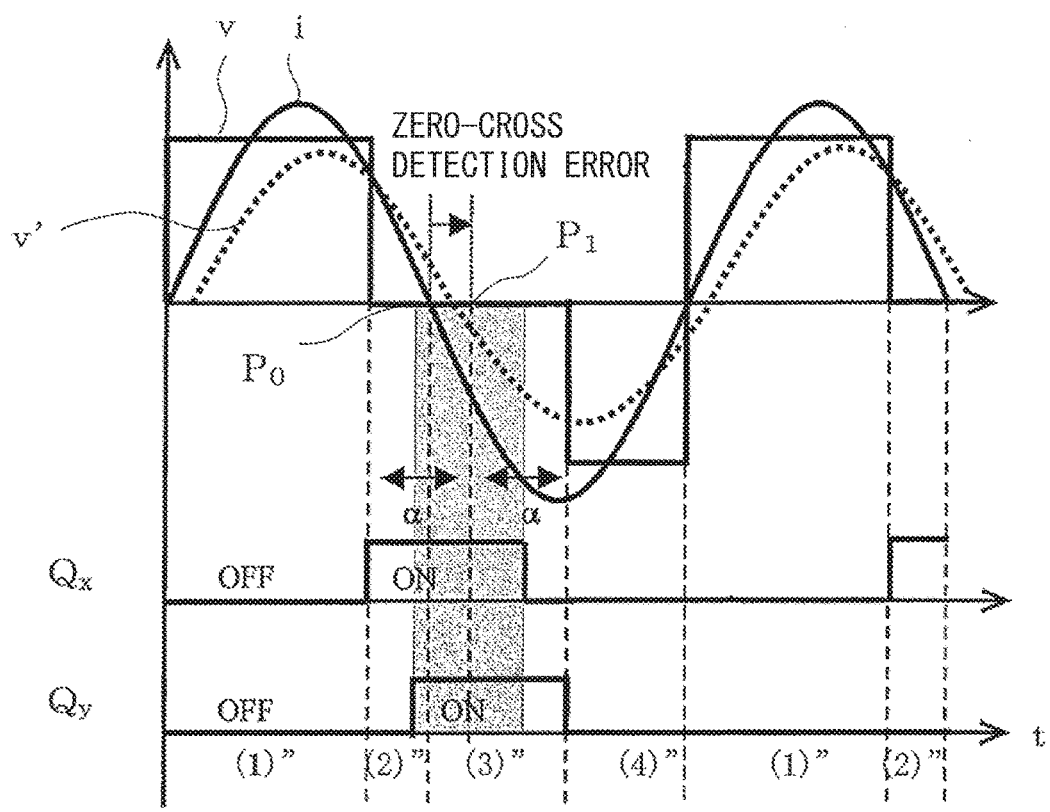
FIG. 28 illustrates an operation waveform diagram according to a tenth embodiment of the present invention.

First, explanations are given for the tenth embodiment, which corresponds to claim 10. FIG. 28 illustrates an operation waveform of the tenth embodiment for the non-contact power supply device illustrated in FIG. 18. Similarly to the above, FIG. 28 illustrates a current i which flows through the power receiving coil 120, a voltage v between AC terminals of the bridge circuit, a fundamental wave component v' of the voltage v, and driving signals of switches $Q_x$ and $Q_y$. Switches $Q_x$ and $Q_y$ perform a switching operation with a constant frequency synchronized with the current i.

Figure 29:
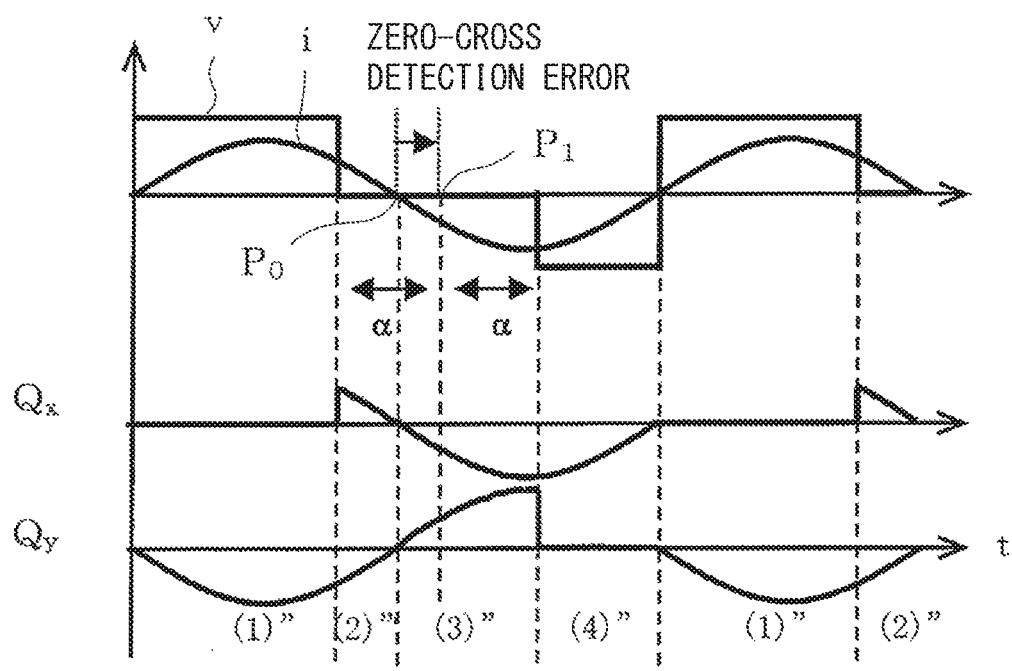
FIG. 29 illustrates an operation waveform diagram according to a tenth embodiment of the present invention.

Here, on-periods of driving signals of switches $Q_x$ and $Q_y$ are made to partially overlap as illustrated in a shaded area which includes the zero crossing point $P_1$ of the current i. FIG. 29 illustrates the current i at this time and the current which flows through switches $Q_x$ and $Q_y$.

A voltage v and a route of a current i in each of the time periods (1)" to (4)" in FIG. 28 and FIG. 29 are similar to those in each of the time periods (1)" to (4)" in FIG. 23.

In FIG. 29, switching losses occur at a transition during the following time periods.

(1) From time period (1)" to time period (2)"
(2) From time period (3)" to time period (4)"

Switching losses do not occur at a transition during the following time periods since the current i during these time periods is zero.

(3) From time period (2)" to time period (3)"
(4) From time period (4)" to time period (1)"

In other words, the number of times switching losses are generated is two, and it is the same number of times as in FIG. 9. Therefore, according to the tenth embodiment, an increase in the number of times switching losses are generated may be prevented even when detection errors occur at the zero crossing point of the current i which flows through the power receiving coil 120.

A similar effect may also be obtained when the tenth embodiment is applied to the fifth example of the non-contact power supply device illustrated in FIG. 25, with a similar concept.

Further, in the non-contact power supply device illustrated in FIG. 1, a similar effect may be obtained when the tenth embodiment is applied, setting the semiconductor switches in the same positions as those of diodes $D_u$ and $D_v$ in FIG. 18 or diodes $D_x$ and $D_y$ in FIG. 25, being turned off during the entire time periods.

Next, explanations are given for an eleventh embodiment of the present invention. The eleventh embodiment corresponds to claim 11 in which a concept similar to that of the tenth embodiment is applied to the sixth example of the non-contact power supply device illustrated in FIG. 30.

Figure 30:
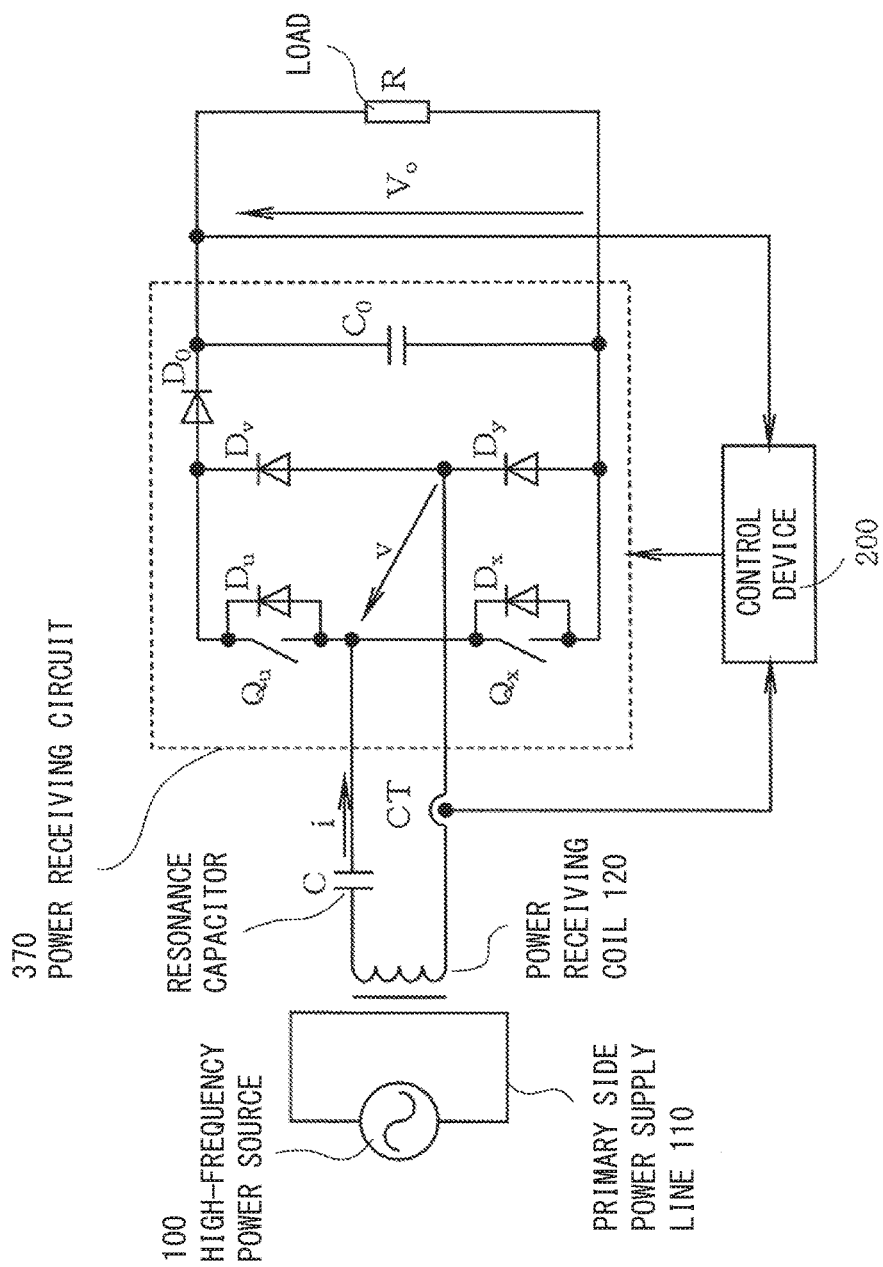
FIG. 30 illustrates a circuit diagram which illustrates a sixth example of a power supply device according to the present invention.

In the power receiving circuit 370 of the non-contact power supply device illustrated in FIG. 30, the bridge circuit has a switching arm series circuit wherein a switching arm in which a diode $D_u$ is connected in inverse parallel with a semiconductor switch $Q_u$ and a switching arm in which a diode $D_x$ is connected in inverse parallel with a semiconductor switch $Q_x$ are connected in series. Together with this, the bridge circuit is configured to have a diode series circuit in which diodes $D_v$ and $D_y$ are connected in series and configured to connect in parallel this switching arm series circuit and diode series circuit. A diode $D_0$ is connected between one of the DC terminals (positive-side DC terminal) of a bridge circuit and one end of a smoothing capacitor $C_0$, the diode $D_0$ having the same polarity as that of a series circuit of diodes $D_v$ and $D_y$ (series circuit of $D_u$ and $D_x$). The other parts are similar to those of FIG. 1.

Figure 31:
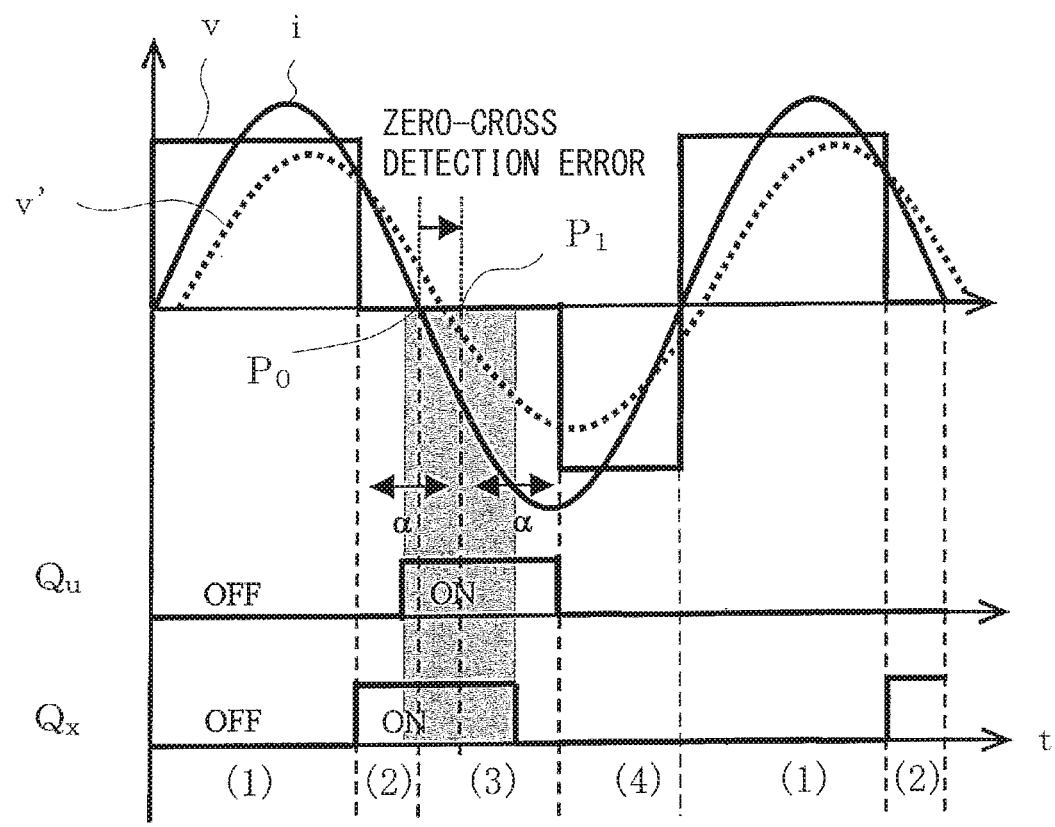
FIG. 31 illustrates an operation waveform diagram according to an eleventh embodiment of the present invention.

FIG. 31 illustrates an operation waveform of the eleventh embodiment for the non-contact power supply device illustrated in FIG. 30. FIG. 31 illustrates a current i which flows through the power receiving coil 120 of FIG. 30, a voltage v between AC terminals of the bridge circuit, a fundamental wave component v' of the voltage v, and driving signals of switches $Q_u$ and $Q_x$. Switches $Q_u$ and $Q_x$ perform a switching operation with a constant frequency synchronized with the current i. $P_0$ illustrates an original zero crossing point of the current i and $P_1$ illustrates a zero crossing point which has been erroneously detected by detector error and the like.

Figure 32:
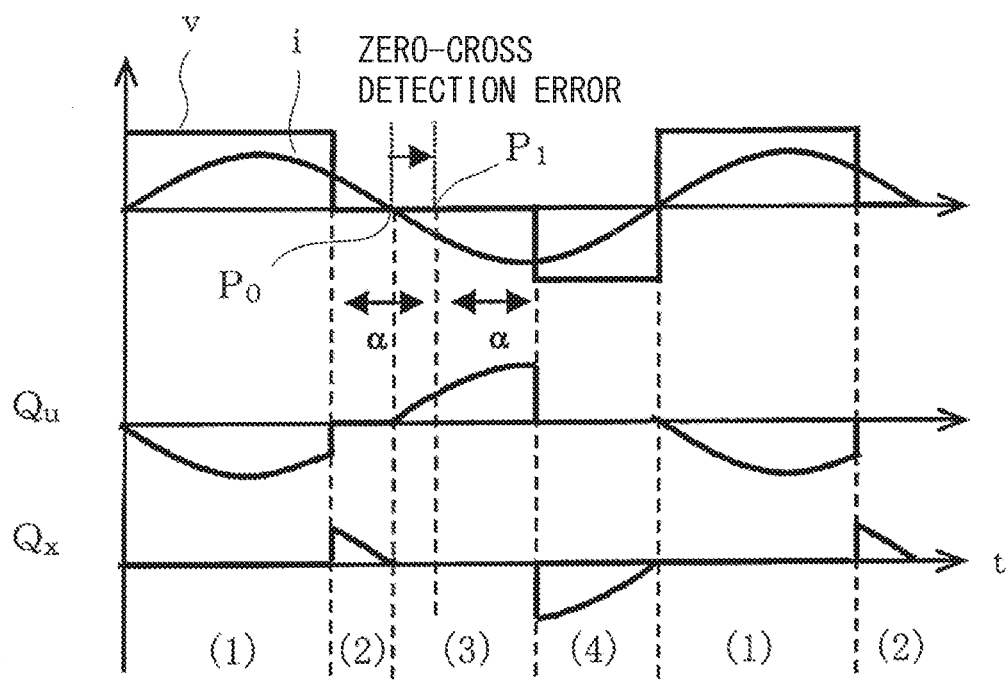
FIG. 32 illustrates an operation waveform diagram according to an eleventh embodiment of the present invention.

Here, on-periods of driving signals of switches $Q_u$ and $Q_x$ are made to partially overlap as illustrated in a shaded area which includes the zero crossing point $P_1$ of the current i. FIG. 32 illustrates the current i and the current which flows through switches $Q_u$ and $Q_x$ at this time.

A voltage v and a route of a current i in each of the time periods (1) to (4) in FIG. 31 and FIG. 32 are similar to those in each of the time periods (1) to (4) in FIG. 15.

In FIG. 32, switching losses occur at a transition during the following time periods.

(1) From time period (1) to time period (2)
(2) From time period (3) to time period (4)

Switching losses do not occur at a transition during the following time periods since the current i during these time periods is zero.

(3) From time period (2) to time period (3)
(4) From time period (4) to time period (1)

In other words, the number of times switching losses are generated is two, and therefore, according to the eleventh embodiment, an increase in the number of times switching losses are generated may be prevented when detection errors occur at the zero crossing point of the current i.

Figure 33:
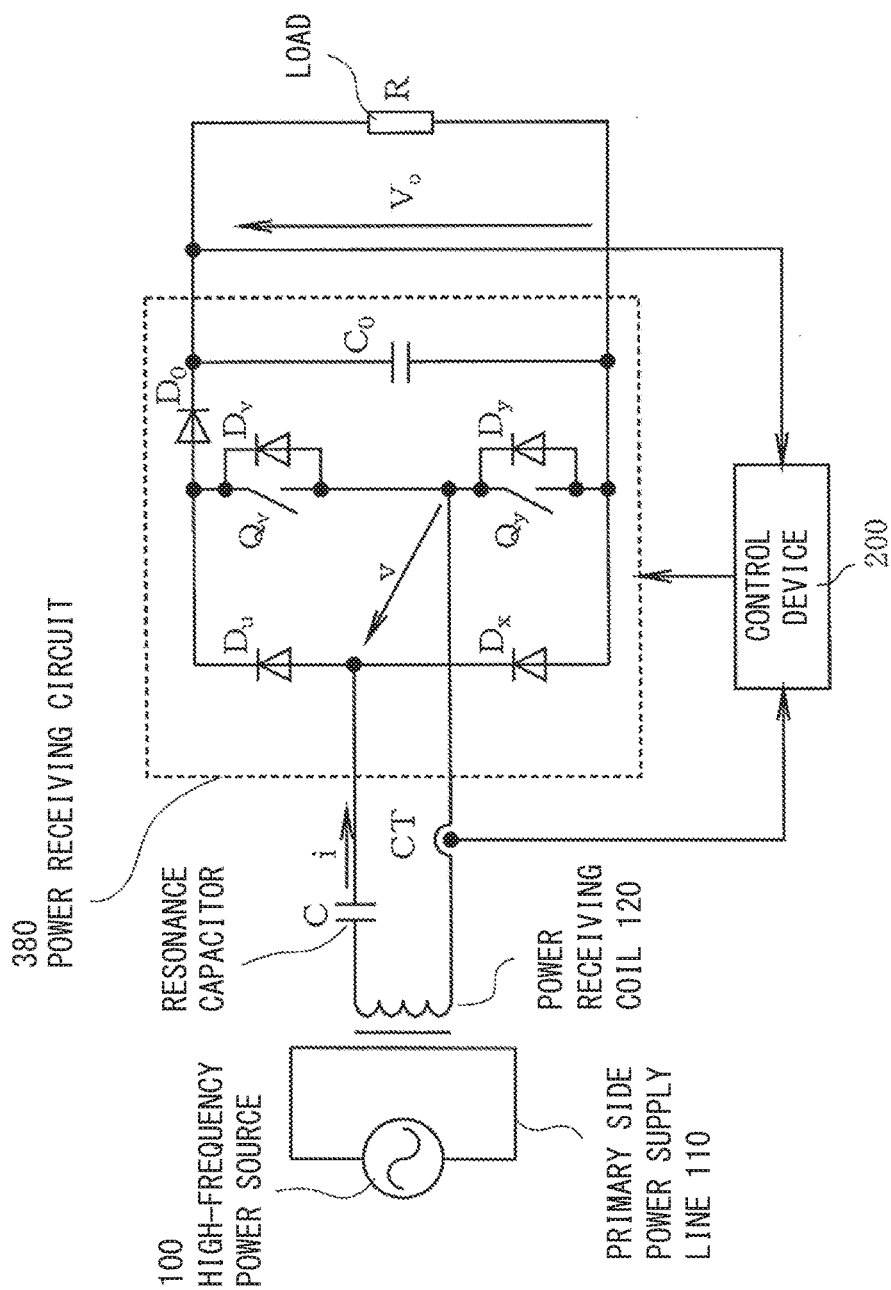
FIG. 33 illustrates a circuit diagram which illustrates a seventh example of a power supply device according to the present invention.

A similar effect may also be obtained when the eleventh embodiment is applied to the seventh example of the non-contact power supply device of FIG. 33, with a similar concept.

Further, in the non-contact power supply device illustrated in FIG. 1, a diode $D_0$ is connected between one of the DC terminals (positive-side DC terminal) of a bridge circuit and one end of a smoothing capacitor $C_0$, the diode $D_0$ having the same polarity as that of a series circuit of diodes $D_v$ and $D_y$ (series circuit of $D_u$ and $D_x$). Then, the eleventh embodiment may be applied setting the semiconductor switches in the same positions as those of diodes $D_v$ and $D_y$ in FIG. 30 or diodes $D_u$ and $D_x$ in FIG. 33, being turned off during the entire time period. With this configuration, a similar effect may be obtained.

Next, explanations are given for a twelfth embodiment of the present invention which corresponds to claim 12.

FIG. 34 illustrates an operation waveform of the twelfth embodiment for the non-contact power supply device illustrated in FIG. 18. FIG. 34 illustrates a current i which flows through the power receiving coil 120 of FIG. 18, a voltage v between AC terminals of the bridge circuit, a fundamental wave component v' of the voltage v, and driving signals of switches $Q_x$ and $Q_y$. Switches $Q_x$ and $Q_y$ perform a switching operation with a constant frequency synchronized with the current i. $P_0$ illustrates an original zero crossing point of the current i and $P_1$ illustrates a zero crossing point which has been erroneously detected by detector error and the like.

Here, on-periods of driving signals of switches $Q_x$ and $Q_y$ are defined as a time period α which substantially equals to a period before and after the zero crossing point $P_0$ of the current i and driving signals of switches $Q_x$ and $Q_y$ are defined as the same. A voltage v and a route of a current i in each of the time periods (1) "to (4)" in FIG. 34 is similar to that in each of the time periods (1) "to (4)" in FIG. 23. A current i which flows through the power receiving coil 120 and a current which flows through switches $Q_x$ and $Q_y$ at this time are similar to those illustrated in FIG. 29. Therefore, according to the twelfth embodiment, a similar effect to that of the tenth embodiment may be obtained by using a single driving signal.

A similar effect may also be obtained when the twelfth embodiment is applied to the non-contact power supply device of FIG. 25, with a similar concept. Further, in the non-contact power supply device illustrated in FIG. 1, a similar effect may also be obtained when the twelfth embodiment is applied setting the switches in the same positions as those of diodes $D_u$ and $D_v$ in FIG. 18 or diodes $D_x$ and $D_y$ in FIG. 25, being turned off during the entire time period.

Next, explanations are given for a thirteenth embodiment of the present invention, which corresponds to claim 13.

Figure 35:
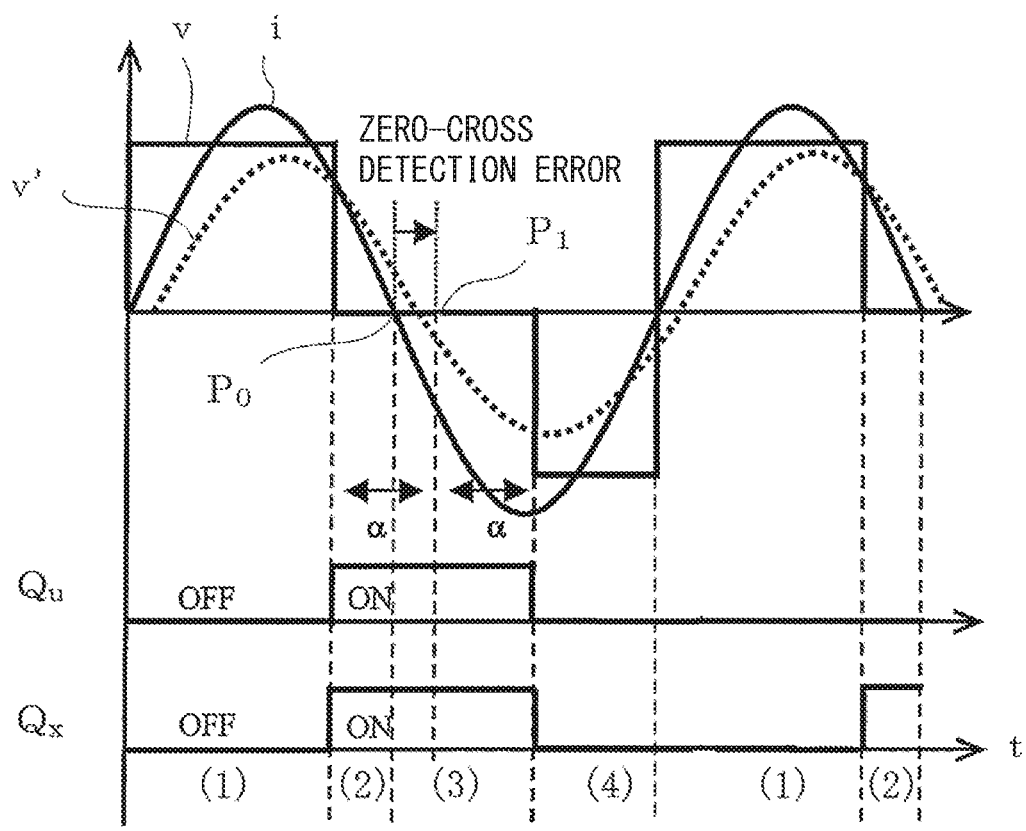
FIG. 35 illustrates an operation waveform diagram according to a thirteenth embodiment of the present invention.

FIG. 35 illustrates an operation waveform of the thirteenth embodiment for the non-contact power supply device illustrated in FIG. 30. FIG. 35 illustrates a current i which flows through the power receiving coil 120 of FIG. 30, a voltage v between AC terminals of the bridge circuit, a fundamental wave component v' of the voltage v, and driving signals of switches $Q_u$ and $Q_x$. Switches $Q_u$ and $Q_x$ perform a switching operation with a constant frequency synchronized with the current i. $P_0$ illustrates an original zero crossing point of the current i and $P_1$ illustrates a zero crossing point which has been erroneously detected due to detector error and the like.

Here, on-periods of driving signals of switches $Q_u$ and $Q_x$ are defined as a time period α which substantially equals to a period before and after the zero crossing point $P_0$ of the current i and driving signals of switches $Q_u$ and $Q_x$ are defined as the same. A voltage v and a route of a current i in each of the time periods (1) to (4) in FIG. 35 are similar to those in each of the time periods (1) to (4) in FIG. 15. A current i which flows through the power receiving coil 120 and a current which flows through switches $Q_u$ and $Q_x$ at this time are similar to those illustrated in FIG. 32. Therefore, according to the thirteenth embodiment, a similar effect to that of the eleventh embodiment may be obtained for switches $Q_u$ and $Q_x$ by using a single driving signal.

A similar effect may also be obtained when the thirteenth embodiment is applied to the non-contact power supply device of FIG. 33, with a similar concept.

Further, in the non-contact power supply device illustrated in FIG. 1, a diode $D_0$ is connected between one of the DC terminals (positive-side DC terminal) of a bridge circuit and one end of a smoothing capacitor $C_0$, the diode $D_0$ having the same polarity as that of a series circuit of diodes $D_v$ and $D_y$ (series circuit of $D_u$ and $D_x$). Then, the thirteenth embodiment may be applied setting the semiconductor switches in the same positions as those of diodes $D_v$ and $D_y$ in FIG. 30 or diodes $D_u$ and $D_x$ in FIG. 33, being turned off during the entire time period. With this configuration, a similar effect may be obtained.

Next, explanations are given for a fourteenth embodiment of the present invention which corresponds to claim 14. In the fourteenth embodiment, a concept similar to the tenth embodiment is applied to the non-contact power supply device illustrated in FIG. 1.

Figure 36:
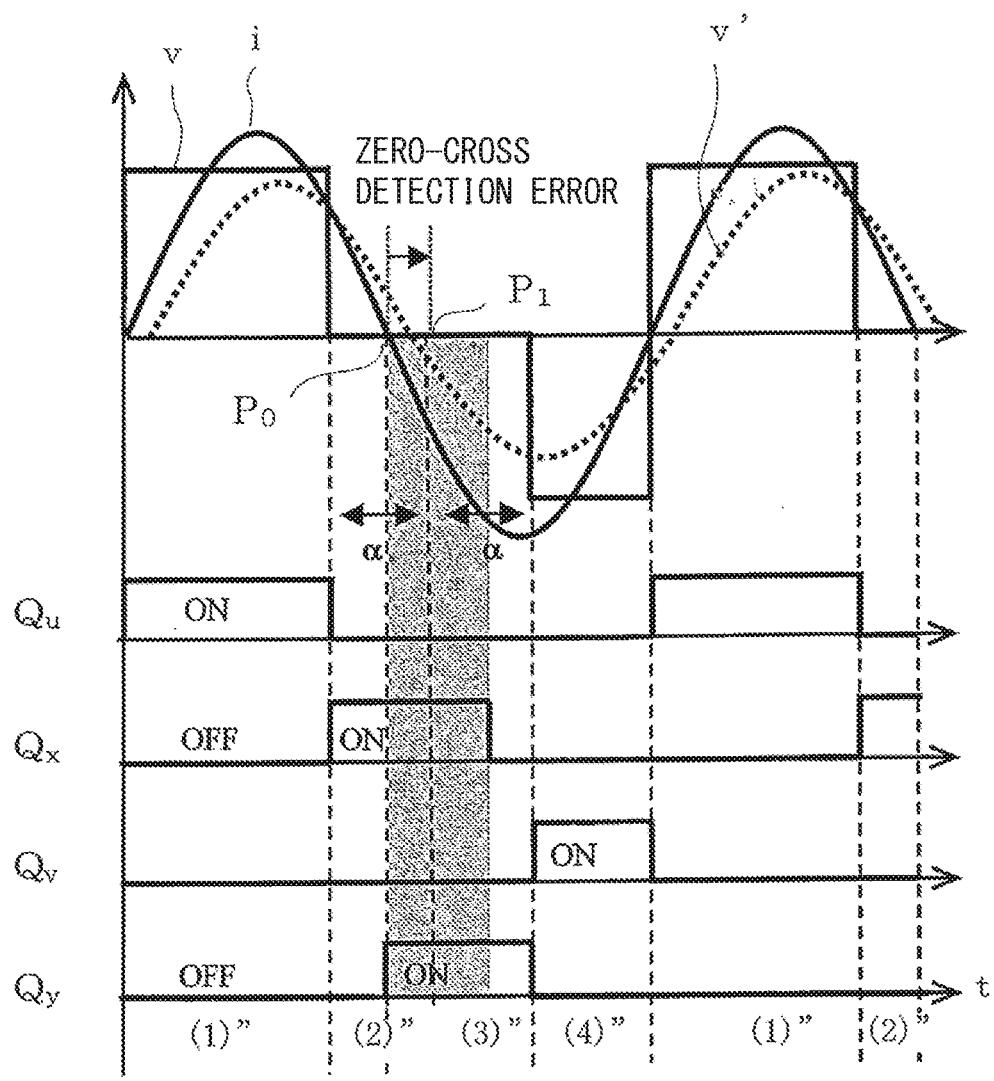
FIG. 36 illustrates an operation waveform diagram according to a fourteenth embodiment of the present invention.

FIG. 36 illustrates an operation waveform of the fourteenth embodiment. FIG. 36 illustrates a current i which flows through the power receiving coil 120 of FIG. 1, a voltage v between AC terminals of the bridge circuit, a fundamental wave component v' of the voltage v, and driving signals of switches $Q_u$, $Q_x$, $Q_v$, and $Q_y$.

Switches $Q_u$, $Q_x$, $Q_v$, and $Q_y$ perform a switching operation with a constant frequency synchronized with the current i. $P_0$ illustrates an original zero crossing point of the current i and $P_1$ illustrates a zero crossing point which has been erroneously detected by detector error and the like.

Here, as illustrated in FIG. 36, on-periods of a driving signal of switches $Q_x$ and $Q_y$ are made to partially overlap as illustrated in a shaded area which includes the zero crossing point $P_1$ of the current i. At this time, a voltage v and a route of a current i in each of the time periods (1) "to (4)" in FIG. 36 is similar to those in each of the time periods (1) "to (4)" in FIG. 23.

Further, a current i which flows through the power receiving coil 120 and a current which flows through switches $Q_x$ and $Q_y$ are similar to those that are illustrated in FIG. 29. Therefore, the number of times switching losses are generated becomes two and an increase in the number of times switching losses are generated may be prevented even when detection errors occur at the zero crossing point of the current i.

Next, explanations are given for a fifteenth embodiment of the present invention which corresponds to claim 15. In the fifteenth embodiment, a concept similar to the fourteenth embodiment is applied to the non-contact power supply device illustrated in FIG. 37.

Figure 37:
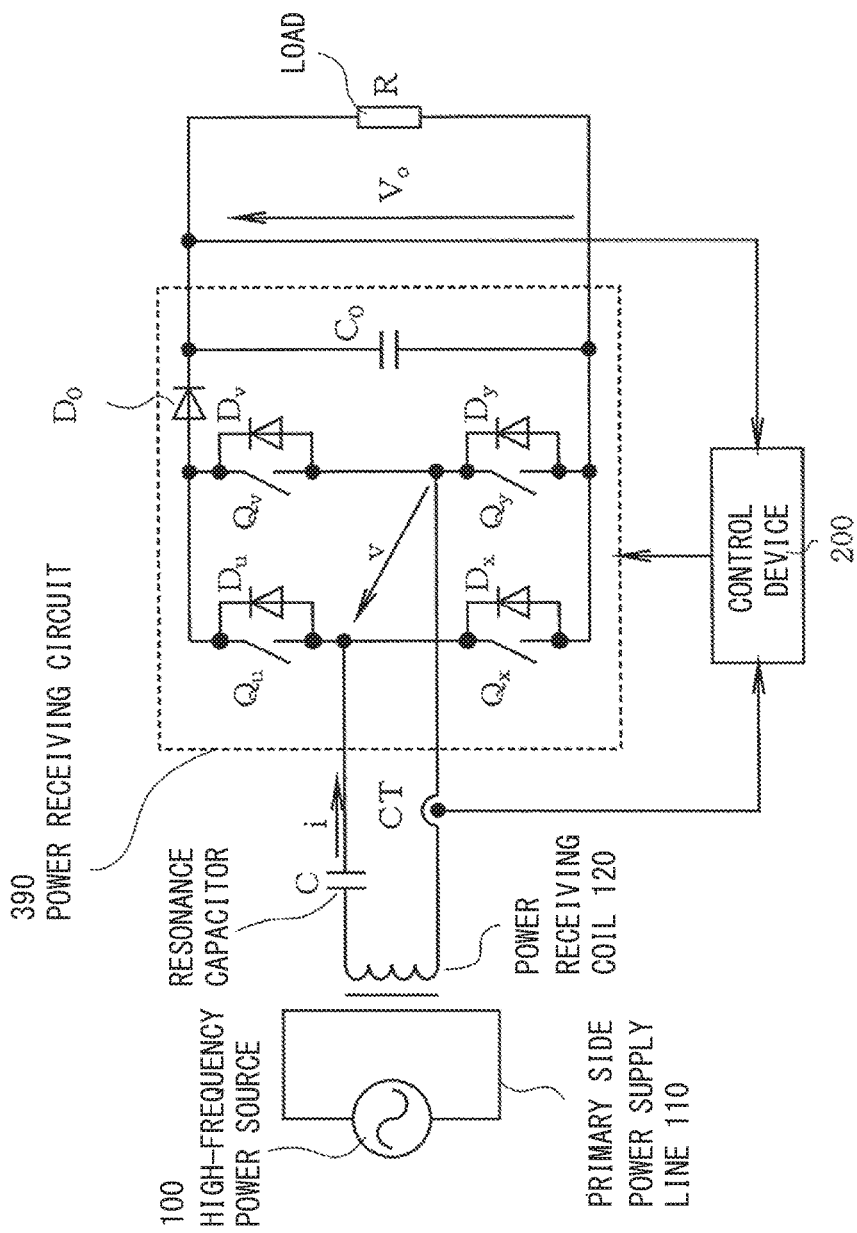
FIG. 37 illustrates a circuit diagram which illustrates an eighth example of a power supply device according to the present invention.

FIG. 37 illustrates a circuit diagram which illustrates an eighth example of a power supply device according to the present invention. The difference in FIG. 1 of the circuit diagram illustrated in FIG. 37 from this lies in the point that in the power receiving circuit 390, a diode $D_0$ is connected between one of the DC terminals (positive-side DC terminal) of a bridge circuit and one end of a smoothing capacitor $C_0$, the diode $D_0$ having the same polarity as that of a series circuit of diodes $D_v$ and $D_y$ (series circuit of $D_u$ and $D_x$).

Figure 38:
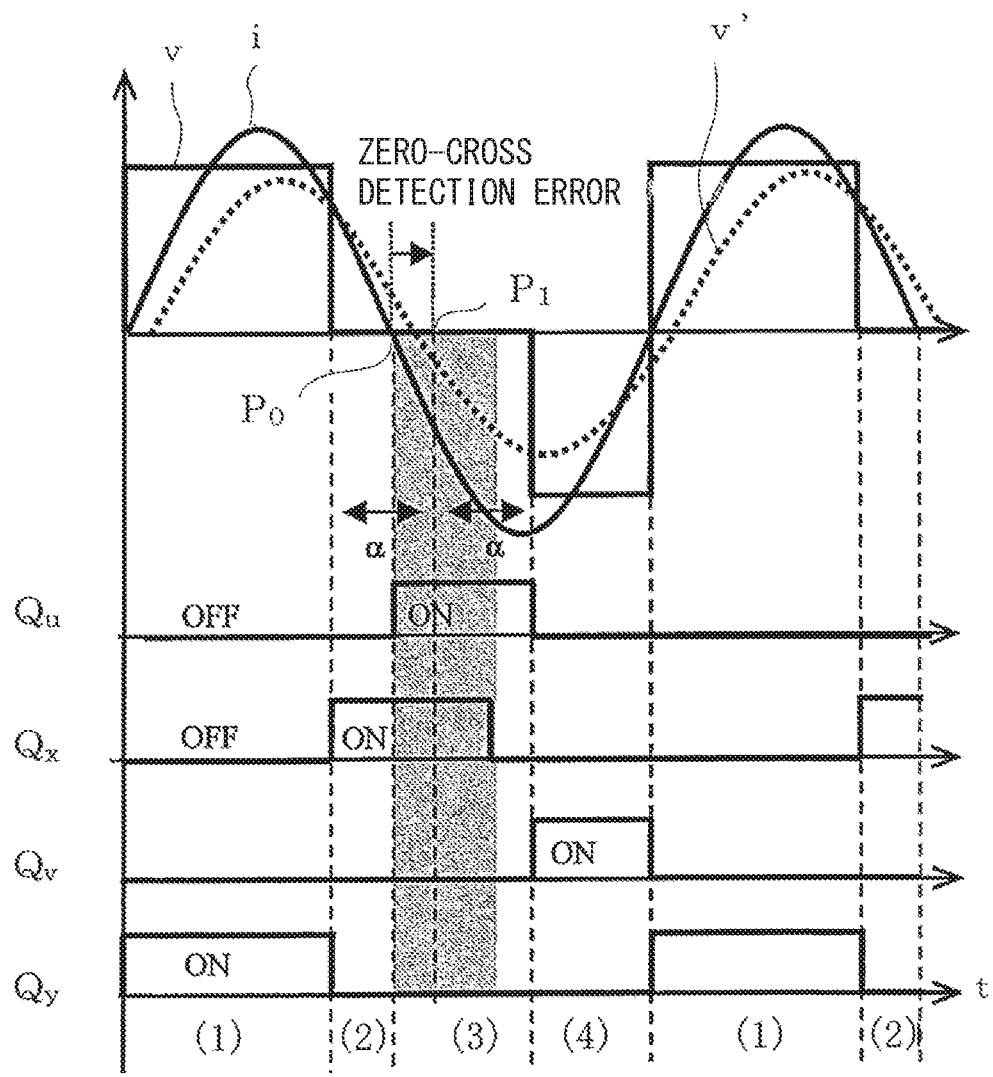
FIG. 38 illustrates an operation waveform diagram according to a fifteenth embodiment of the present invention.

FIG. 38 illustrates an operation waveform diagram of a fifteenth embodiment for the non-contact power supply device illustrated in FIG. 37. FIG. 38 illustrates a current i which flows through the power receiving coil 120 of FIG. 37, a voltage v between AC terminals of the bridge circuit, a fundamental wave component v' of the voltage v, and driving signals of switches $Q_u$, $Q_x$, $Q_v$, and $Q_y$.

Switches $Q_u$, $Q_x$, $Q_v$, and $Q_y$ perform a switching operation with a constant frequency synchronized with the current i. $P_0$ illustrates an original zero crossing point of the current i and $P_1$ illustrates a zero crossing point which has been erroneously detected by detector error and the like.

Here, as illustrated in FIG. 38, on-periods of driving signals of switches $Q_u$ and $Q_x$ are made to partially overlap as illustrated in a shaded area which includes the zero crossing point $P_1$ of the current i. At this time, a voltage v and a route of a current i in each of the time periods (1) to (4) in FIG. 38 are similar to those in each of the time periods (1) to (4) in FIG. 15.

Further, a current i which flows through the power receiving coil 120 and a current which flows through switches $Q_u$ and $Q_x$ are similar to those that are illustrated in FIG. 32. Therefore, the number of times switching losses are generated becomes two and an increase in the number of times switching losses are generated may be prevented even when detection errors occur at the zero crossing point of the current i.

Next, explanations are given for a sixteenth embodiment of the present invention which corresponds to claim 16. In the sixteenth embodiment, a concept similar to the twelfth embodiment is applied to the non-contact power supply device illustrated in FIG. 1.

Figure 39:
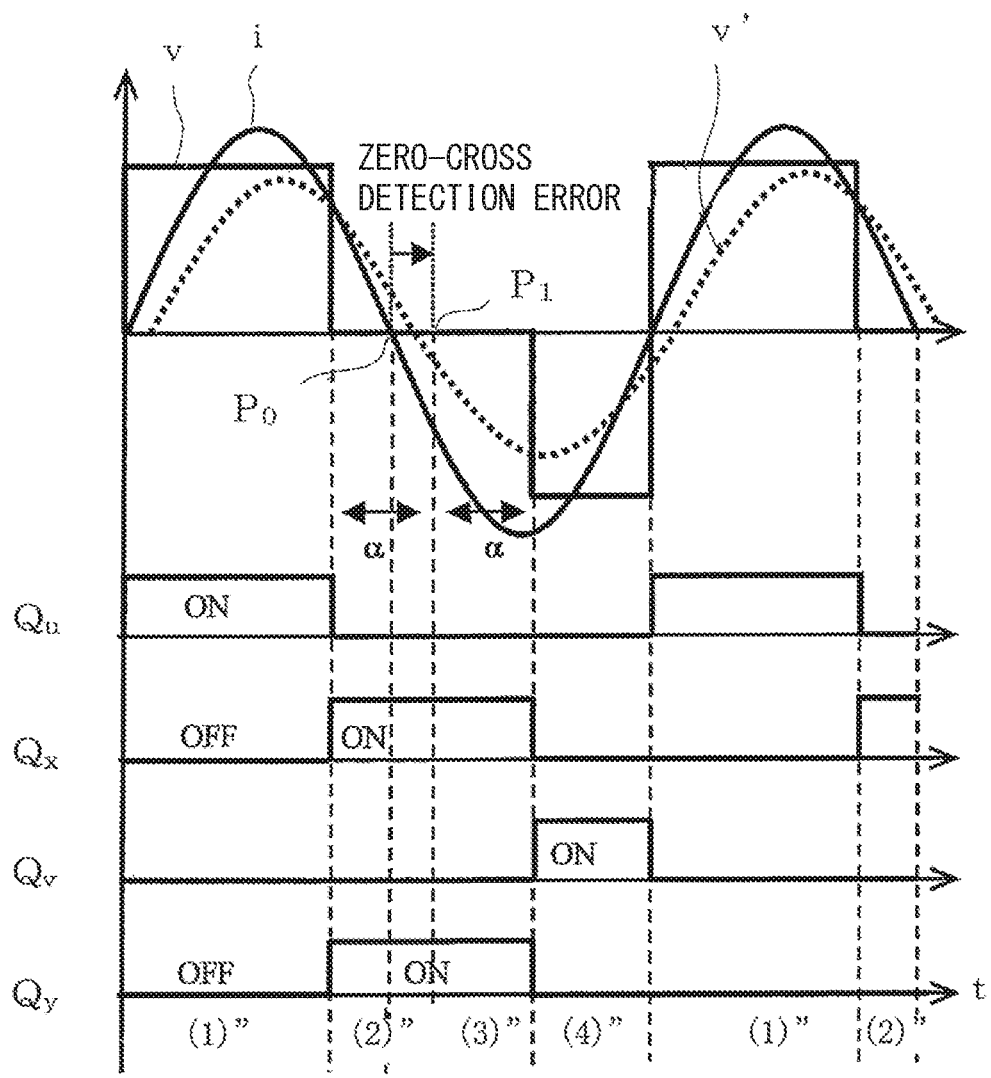
FIG. 39 illustrates an operation waveform diagram according to a sixteenth embodiment of the present invention.

FIG. 39 illustrates an operation waveform diagram of a sixteenth embodiment for the non-contact power supply device illustrated in FIG. 1. FIG. 39 illustrates a current i which flows through the power receiving coil 120 of FIG. 1, a voltage v between AC terminals of the bridge circuit, a fundamental wave component v' of the voltage v, and driving signals of switches $Q_u$, $Q_x$, $Q_v$, and $Q_y$.

Switches $Q_u$, $Q_x$, $Q_v$, and $Q_y$ perform a switching operation with a constant frequency synchronized with the current i. $P_0$ illustrates an original zero crossing point of the current i and $P_1$ illustrates a zero crossing point which has been erroneously detected by detector error and the like.

Here, on-periods of driving signals of switches $Q_x$ and $Q_y$ are defined as a time period α which substantially equals to a period before and after the zero crossing point $P_0$ of the current i and driving signals of switches $Q_x$ and $Q_y$ are defined as the same. A voltage v and a route of a current i in each of the time periods (1)″ to (4)″ in FIG. 39 are similar to those in each of the time periods (1)″ to (4)″ in FIG. 23.

A current i which flows through the power receiving coil 120 and a current which flows through switches $Q_x$ and $Q_y$ at this time are similar to those illustrated in FIG. 29. Therefore, according to the sixteenth embodiment, a similar effect to that of the fourteenth embodiment may be obtained.

Next, explanations are given for a seventeenth embodiment of the present invention which corresponds to claim 17. In the seventeenth embodiment, a concept similar to the thirteenth embodiment is applied to the non-contact power supply device illustrated in FIG. 37.

Figure 40:
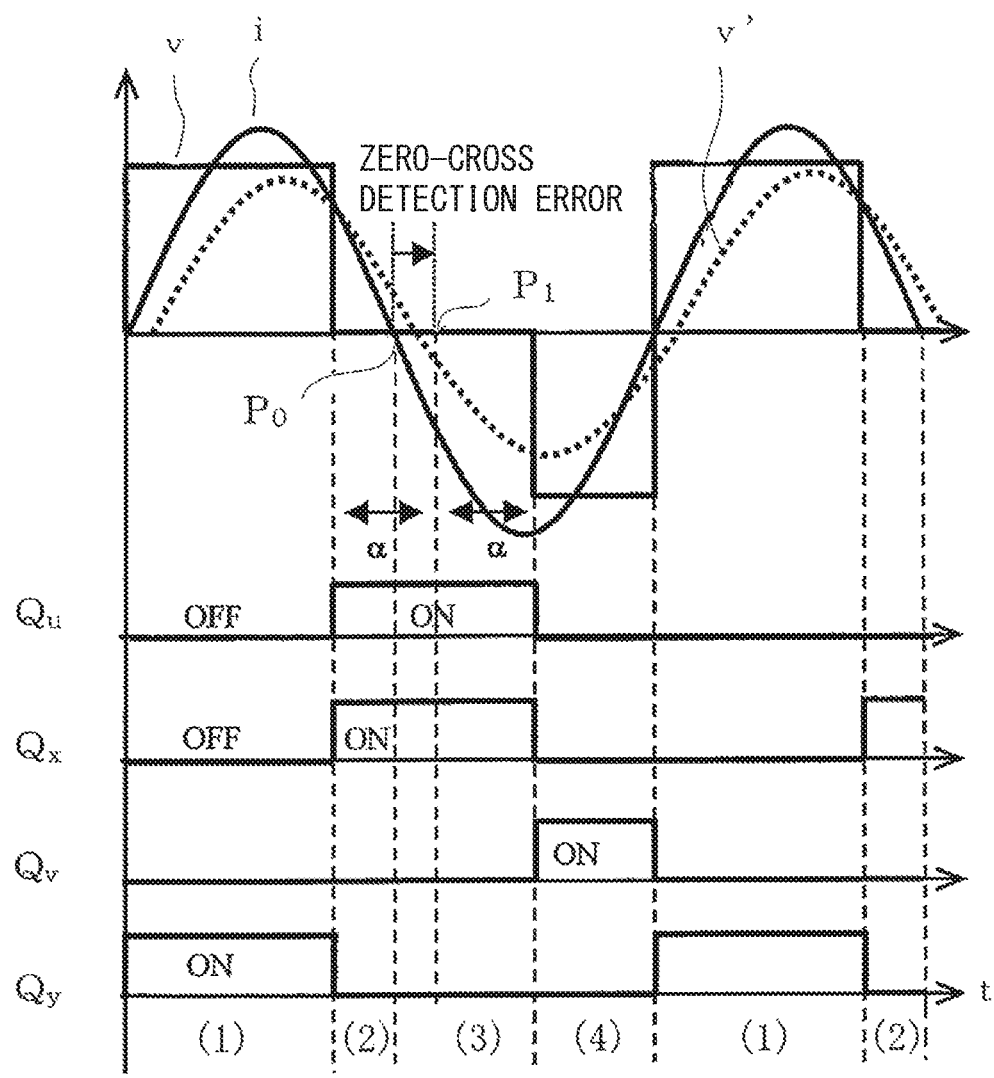
FIG. 40 illustrates an operation waveform diagram according to a seventeenth embodiment of the present invention.

FIG. 40 illustrates an operation waveform of a seventeenth embodiment for the non-contact power supply device illustrated in FIG. 37. FIG. 40 illustrates a current i which flows through the power receiving coil 120 of FIG. 37, a voltage v between AC terminals of the bridge circuit, a fundamental wave component v' of the voltage v, and driving signals of switches $Q_u$, $Q_x$, $Q_v$, and $Q_y$.

Switches $Q_u$, $Q_x$, $Q_v$, and $Q_y$ perform a switching operation with a constant frequency synchronized with the current i. $P_0$ illustrates an original zero crossing point of the current i and $P_1$ illustrates a zero crossing point which has been erroneously detected by detector error and the like.

Here, on-periods of driving signals of switches $Q_u$ and $Q_x$ are defined as a time period α which substantially equals to a period before and after the zero crossing point $P_0$ of the current i and driving signals of switches $Q_u$ and $Q_x$ are defined as the same. A voltage v and a route of a current i in each of the time periods (1) to (4) in FIG. 40 are similar to those in each of the time periods (1) to (4) in FIG. 15.

Further, a current i which flows through the power receiving coil 120 and a current which flows through switches $Q_u$ and $Q_x$ are similar to those illustrated in FIG. 32. Therefore, according to the seventeenth embodiment, a similar effect to that of the fifteenth embodiment may also be obtained.

According to the present invention, a power supply device may be provided, the power supply device being capable of inhibiting losses of an entire device by improving a power factor and being capable of reducing a size and cost of the entire device.

Further, even when detection errors occur at the zero crossing point of an input current, the number of times switching losses are generated may be reduced to inhibit an increase in losses.

What is claimed is:
1. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of switching arm series circuits in which two inverse parallel connection circuits of a semiconductor switch and a diode are connected in series are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive voltage or a negative voltage in which the output voltage is a peak value during a time period other than the prescribed time periods.

2. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of switching arm series circuits in which two inverse parallel connection circuits of a semiconductor switch and a diode are connected in series are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a positive voltage or a negative voltage in which the output voltage is a peak value only during a prescribed time period before and after two zero crossing points in one cycle of the input current and such that the voltage becomes a zero voltage during a time period other than the prescribed time periods.

3. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of switching arm series circuits in which two inverse parallel connection circuits of a semiconductor switch and a diode are connected in series are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods.

4. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive voltage or a negative voltage in which the output voltage is a peak value during a time period other than the prescribed time periods.

5. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a positive voltage or a negative voltage in which the output voltage is a peak value only during a prescribed time period before and after two zero crossing points in one cycle of the input current and such that the voltage becomes a zero voltage during a time period other than the prescribed time periods.

6. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods.

7. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of DC circuits in which an inverse parallel connection circuit of a semiconductor switch and a diode is connected in series with a diode are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after two zero crossing points in one cycle of the input current and such that the voltage becomes a positive voltage or a negative voltage in which the output voltage is a peak value during a time period other than the prescribed time periods.

8. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of DC circuits in which an inverse parallel connection circuit of a semiconductor switch and a diode is connected in series with a diode are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a positive voltage or a negative voltage in which the output voltage is a peak value only during a prescribed time period before and after two zero crossing points in one cycle of the input current and such that the voltage becomes a zero voltage during a time period other than the prescribed time periods.

9. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of DC circuits in which an inverse parallel connection circuit of a semiconductor switch and a diode is connected in series with and a diode are connected in parallel, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods.

10. The power supply device according to claim 9, wherein
the control unit, when a detection error exists between the one zero crossing point and an original zero crossing point, makes an on-period of each semiconductor switch partially overlap so as to include the one zero crossing point, and switches each semiconductor switch.

11. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, and such that another diode is connected between one DC terminal of the bridge circuit and one end of the smoothing capacitor, the another diode having the same polarity as that of the diode series circuit, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods, the control unit, when a detection error exists between the one zero crossing point and an original zero crossing point, making an on-period of each semiconductor switch partially overlap so as to include the one zero crossing point, and switching each semiconductor switch.

12. The power supply device according to claim 9, wherein
the control unit, when a detection error exists between the one zero crossing point and an original zero crossing point, switches each semiconductor switch so as to turn on each semiconductor switch simultaneously during a prescribed time period which includes the one zero crossing point.

13. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a switching arm series circuit in which two inverse parallel connection circuits of a semiconductor switch and a diode are connected in series and a diode series circuit in which two diodes are connected in series are connected in parallel, and such that another diode is connected between one DC terminal of the bridge circuit and one end of the smoothing capacitor, the another diode having the same polarity as that of the diode series circuit, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods, the control unit, when a detection error exists between the one zero crossing point and an original zero crossing point, switching each semiconductor switch so as to turn on each semiconductor switch simultaneously during a prescribed time period which includes the one zero crossing point.

14. The power supply device according to claim 3, wherein
the control unit, when a detection error exists between the one zero crossing point and an original zero crossing point, makes an on-period of each semiconductor switch partially overlap so as to include the one zero crossing point, and switches each semiconductor switch.

15. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of switching arm series circuits in which two inverse parallel connection circuits of a semiconductor switch and diode are connected in series are connected in parallel and such that another diode is connected between one DC terminal of the bridge circuit and one end of the smoothing capacitor, the another diode having the same polarity as that of the diode series circuit in the switching arm series circuit, wherein the power supply device includes:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods, the control unit, when a detection error exists between the one zero crossing point and an original zero crossing point, making an on-period of each semiconductor switch partially overlap so as to include the one zero crossing point, and switching each semiconductor switch.

16. The power supply device according to claim 3, wherein
the control unit, when a detection error exists between the one zero crossing point and an original zero crossing point, switches each semiconductor switch so as to turn on each semiconductor switch simultaneously during a prescribed time period so as to include the one zero crossing point.

17. A power supply device comprising:
a coil configured to exchange power by an external magnetic coupling;
a bridge circuit in which one end of the coil is connected to one alternate current (AC) terminal through a resonance capacitor and another end of the coil is connected to another AC terminal; and
a smoothing capacitor configured to be connected between direct current (DC) terminals of the bridge circuit, a load being connected at both ends of the smoothing capacitor, and the bridge circuit being configured such that a plurality of switching arm series circuits in which two inverse parallel connection circuits of a semiconductor switch and a diode are connected in series are connected in parallel and such that another diode is connected between one DC terminal of the bridge circuit and one end of the smoothing capacitor, the another diode having the same polarity as that of the diode series circuit in the switching arm series circuit, wherein the power supply device comprises:
a current detection unit configured to detect a current which flows through the coil as an input current;
a voltage detection unit configured to detect a voltage between the DC terminals as an output voltage; and
a control unit configured to switch the semiconductor switch at a constant cycle such that a voltage between the AC terminals of the bridge circuit becomes a zero voltage only during a prescribed time period before and after one of two zero crossing points in one cycle of the input current and such that the voltage becomes a positive voltage or a negative voltage in which the output voltage is a peak value during a time period other than the prescribed time periods, the control unit, when a detection error exists between the one zero crossing point and an original zero crossing point, switching each semiconductor switch so as to turn on each semiconductor switch simultaneously during a prescribed time period which includes the one zero crossing point.

* * * * *